US012770780B2

(12) United States Patent
Lassalle-Balier et al.

(10) Patent No.: US 12,770,780 B2
(45) Date of Patent: Oct. 20, 2026

(54) POSITION SENSING METHOD AND SYSTEM

(71) Applicant: Allegro MicroSystems, LLC, Manchester, NH (US)

(72) Inventors: Rémy Lassalle-Balier, Bures sur Yvette (FR); Alexander Latham, Harvard, MA (US); Benjamin Geiger, Auburn, NH (US); Mathew Drouin, Hooksett, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 287 days.

(21) Appl. No.: 18/354,903

(22) Filed: Jul. 19, 2023

(65) Prior Publication Data

US 2025/0029780 A1 Jan. 23, 2025

(51) Int. Cl.
*H01F 38/14* (2006.01)
*G01D 5/14* (2006.01)
*H02J 50/80* (2016.01)

(52) U.S. Cl.
CPC ............ *H01F 38/14* (2013.01); *G01D 5/142* (2013.01); *H01F 2038/143* (2013.01)

(58) Field of Classification Search
CPC ... H01F 38/14; H01F 2038/143; G01D 5/142; G01D 3/08; G01D 5/2053; G01L 3/105
See application file for complete search history.

(56) References Cited

U.S. PATENT DOCUMENTS 3,647,963 A 3/1972 Bailey
4,356,732 A 11/1982 Hachtel et al.
4,820,961 A 4/1989 McMullin
4,853,604 A 8/1989 McMullin et al.
5,841,274 A 11/1998 Masreliez et al.
(Continued)

FOREIGN PATENT DOCUMENTS

CN 100445694 C * 12/2008 ........... G01D 5/2053
EP 0289033 A2 11/1988
(Continued)

OTHER PUBLICATIONS

English translation of CN 100445694 C (Year: 2008).*
(Continued)

*Primary Examiner* — Huy Q Phan
*Assistant Examiner* — Haidong Zhang
(74) *Attorney, Agent, or Firm* — Daly, Crowley, Mofford & Durkee, LLP.

(57) ABSTRACT

An apparatus, comprising: a first transmitting coil including at least one first portion and at least one second portion, the first and second portions having different polarities; and a second transmitting coil that is disposed above or below the first transmitting coil, the second transmitting coil including at least one third portion and at least one fourth portion, the third and fourth portions having different polarities, wherein the first and second transmitting coils are configured so that, when the first transmitting coil is not driven and the second transmitting coil is driven, a net magnetic flux through at least one of the first portions is approximately zero, the net magnetic flux being a magnetic flux that is entirely attributable to the second transmitting coil.

29 Claims, 44 Drawing Sheets

(56) References Cited

U.S. PATENT DOCUMENTS

| | | | | |
|---|---|---|---|---|
| 6,999,007 | B2 | 2/2006 | Lin et al. | |
| 7,538,544 | B2 * | 5/2009 | Lee | G01D 5/2053 324/207.17 |
| 8,453,518 | B2 | 6/2013 | Diekmann et al. | |
| 9,983,045 | B2 | 5/2018 | O'Neill | |
| 10,330,499 | B2 | 6/2019 | Elliott et al. | |
| 10,816,366 | B2 | 10/2020 | Weiland et al. | |
| 10,837,847 | B2 | 11/2020 | Smith, Jr. | |
| 10,837,848 | B2 | 11/2020 | Janisch et al. | |
| 10,845,215 | B2 * | 11/2020 | Kluge | G01D 5/2006 |
| 10,866,122 | B2 | 12/2020 | Weiland et al. | |
| 11,079,291 | B2 | 8/2021 | Bertin | |
| 11,112,275 | B2 | 9/2021 | Bertin | |
| 11,326,903 | B1 | 5/2022 | Casu et al. | |
| 11,333,530 | B2 | 5/2022 | Foletto | |
| 11,346,688 | B2 | 5/2022 | Stewart | |
| 11,408,755 | B2 | 8/2022 | Bertin | |
| 11,592,319 | B2 | 2/2023 | Ausserlechner | |
| 11,662,260 | B2 | 5/2023 | Latham et al. | |
| 11,692,887 | B2 | 7/2023 | Witts et al. | |
| 11,733,316 | B2 | 8/2023 | Casu et al. | |
| 2004/0032255 | A1 * | 2/2004 | Berndt | G01D 5/2073 324/207.25 |
| 2006/0250128 | A1 | 11/2006 | Tahara et al. | |
| 2015/0211895 | A1 | 7/2015 | Reitsma et al. | |
| 2017/0160102 | A1 | 6/2017 | Heumann et al. | |
| 2017/0166251 | A1 | 6/2017 | Shao et al. | |
| 2018/0274947 | A1 | 9/2018 | Maniouloux et al. | |
| 2019/0242725 | A1 | 8/2019 | Shaga et al. | |
| 2019/0331541 | A1 | 10/2019 | Janisch et al. | |
| 2020/0109996 | A1 | 4/2020 | Smith, Jr. | |
| 2021/0190545 | A1 | 6/2021 | Utermoehlen et al. | |
| 2022/0239462 | A1 | 7/2022 | Casu et al. | |
| 2022/0357144 | A1 | 11/2022 | Tombez | |
| 2023/0152075 | A1 | 5/2023 | Pichler et al. | |
| 2023/0258515 | A1 | 8/2023 | Ostermann et al. | |
| 2023/0332965 | A1 | 10/2023 | Casu et al. | |
| 2023/0417579 | A1 | 12/2023 | Latham et al. | |

FOREIGN PATENT DOCUMENTS

| | | |
|---|---|---|
| EP | 4394331 | 7/2024 |
| WO | WO 2006/079793 | 8/2006 |
| WO | WO 2022/132229 | 6/2022 |

OTHER PUBLICATIONS

Search Report and Written Opinion dated Oct. 4, 2024 for PCT Application No. PCT/US2024/034944; 15 pages.

Partial Search Report dated Nov. 29, 2024 for European Application No. 24185072.6, 14 pages.

U.S. Appl. No. 18/354,895, filed Jul. 19, 2023, Richards, et al.

Posic Datasheet "IT3402L Triple Channel Linear Encoder Kit", 2021, 4 pages.

PCT International Search Report and Written Opinion dated Sep. 19, 2022 for International Application No. PCT/US2022/033577; 13 Pages.

Office Action dated Mar. 2, 2023, for U.S. Appl. No. 17/466,202; 7 pages.

Response to Office Action dated Mar. 2, 2023, filed on for U.S. Appl. No. 17/466,202; 8 pages.

Notice of Allowance dated Apr. 7, 2023 for U.S. Appl. No. 17/466,202; 9 pages.

Extended European Search Report dated Oct. 23, 2023 for European Application No. 23177829.1-1001; 13 Pages.

Office Action dated Jan. 17, 2025 for U.S. Appl. No. 17/809,382, 32 pages.

Response to Office Action dated Jan. 17, 2025, filed Feb. 10, 2025 for U.S. Appl. No. 17/809,382, 17 pages.

Extended European Search Report dated Mar. 17, 2025 for European Application No. 24185072.6; 15 pages.

Intention to Grant dated Mar. 27, 2025 for European Application No. 23177829.1; 7 pages.

Response to Search Opinion filed on Jul. 3, 2024 for European Application No. 23177829.1, 27 pages.

Ex Parte Quayle dated Aug. 6, 2025 for U.S. Appl. No. 18/394,642, 8 pages.

Response to Extended European Search Report dated Mar. 17, 2025, filed on Oct. 7, 2025 for European Application No. 24185072.6; 26 pages.

Response to Ex Parte Quayle dated Aug. 6, 2025, filed on Aug. 29, 2025 for U.S. Appl. No. 18/394,642, 10 pages.

Notice of Allowance dated Sep. 19, 2025 for U.S. Appl. No. 18/394,642, 9 pages.

Notice of Allowance dated May 21, 2025 for U.S. Appl. No. 17/809,382, 12 pages.

* cited by examiner

POSITION SENSING METHOD AND SYSTEM

BACKGROUND

As is known, sensors are used to perform various functions in a variety of applications. Some sensors include one or more electromagnetic flux sensing elements, such as a Hall effect element, a magnetoresistive element, or a receiving coil to sense an electromagnetic flux associated with proximity or motion of a target object. Sensor integrated circuits are widely used in automobile control systems and other safety-critical applications. There are a variety of specifications that set forth requirements related to permissible sensor quality levels, failure rates, and overall functional safety.

SUMMARY

According to aspects of the disclosure, an apparatus is provided comprising: a first transmitting coil including at least one first portion and at least one second portion, the first and second portions having different polarities; and a second transmitting coil that is disposed above or below the first transmitting coil, the second transmitting coil including at least one third portion and at least one fourth portion, the third and fourth portions having different polarities, wherein the first and second transmitting coils are configured so that, when the first transmitting coil is not driven and the second transmitting coil is driven, a net magnetic flux through at least one of the first portions is approximately zero, the net magnetic flux being a magnetic flux that is entirely attributable to the second transmitting coil.

According to aspects of the disclosure, an apparatus, comprising: a first transmitting coil including at least one first portion and at least one second portion, the first and second portions having different polarities; and a first receiving coil that is disposed above or below the first transmitting coil, the first receiving coil including at least one of a type-1 crushed portion that is configured to change a polarity of the first receiving coil, the type-1 crushed portion being disposed directly above or below a boundary between one of the first portions and one of the second portions.

DETAILED DESCRIPTION

Figure 1:
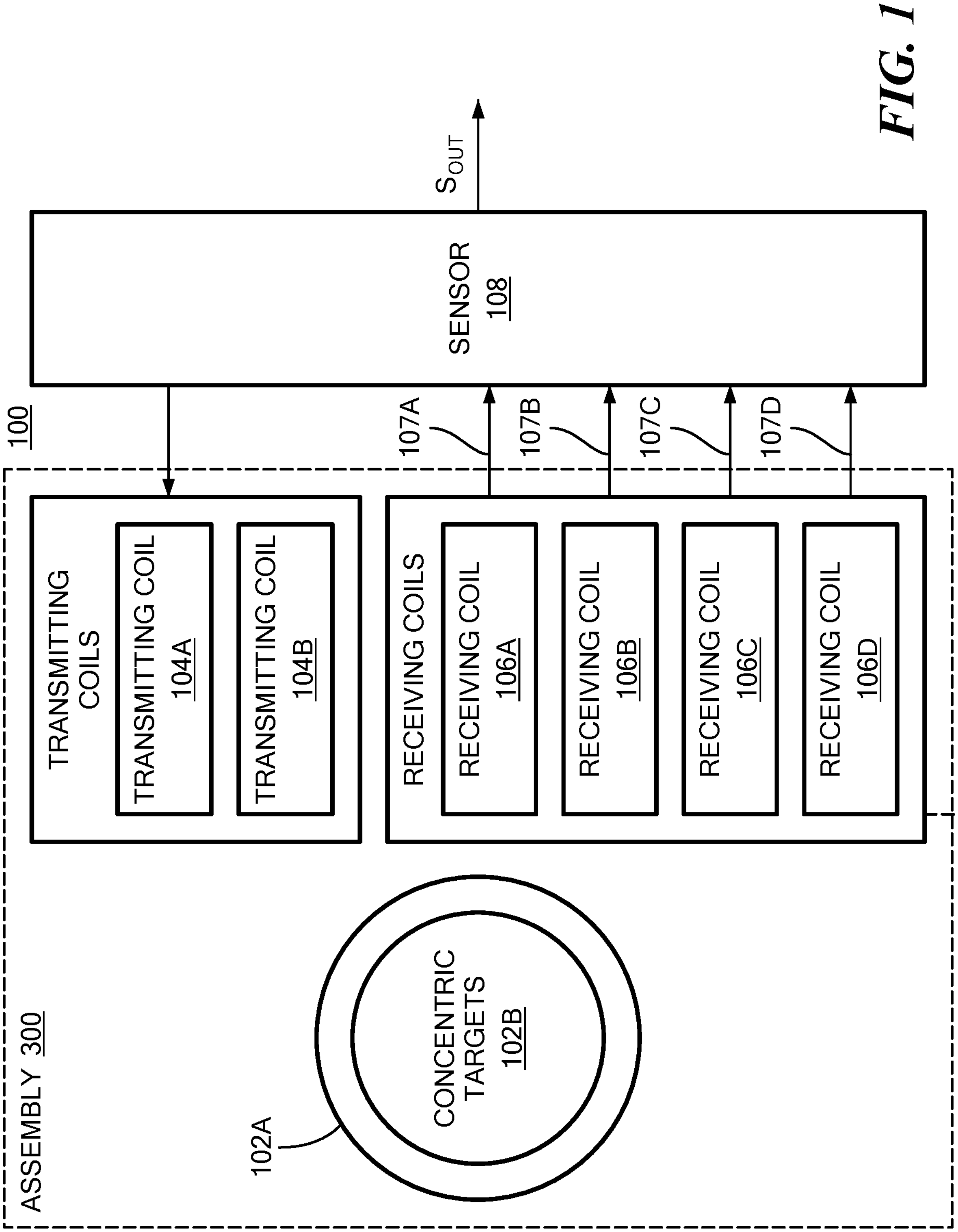
FIG. 1 is a diagram of an example of a system, according to aspects of the disclosure.

FIG. 1 is a diagram of an example of a system 100, according to aspects of the disclosure. The system 100 may include concentric targets 102A and 102B, an assembly 300, and a sensor 108. The assembly 300 may include transmitting coils 104A and 104B and receiving coils 106A, 106B. 106C, and 106D. The transmitting coil 104A may generate a first magnetic field. The first magnetic field may induce first eddy currents in the target 102A. The first eddy currents may result in a first magnetic field (hereinafter "first reflected field") being emitted from the target 102A. The receiving coils 106A and 106B may sense the first reflected field and generate magnetic field signals 107A and 107B in response to the first reflected field. The transmitting coil 104B may generate a second magnetic field. The second magnetic field may induce second eddy currents in the target 102B. The second eddy currents may result in a second magnetic field (hereinafter "second reflected field") being emitted from the target 102B. The receiving coils 106C and 106D may sense the second reflected field and generate magnetic field signals 107C and 107D in response to the second reflected field. The sensor 108 may receive the signals 107A-D and generate an output signal Sout based on the signals 107A-D. In some implementations, each of the targets 102A-B may be coupled to a different shaft of a steering column. In such implementations, the sensor 108 may use the signals 107A-D to determine the respective angular positions of targets 102A-B. The sensor 108 may use the respective angular positions of targets 102A-B to discern the torque that is incident on the steering column. The signal Sout may be provided to an electronic control unit (ECU) and/or other any other suitable type of processing circuitry. The term "torque" as used throughout the disclosure refers to a "twisting force".

Figure 2:
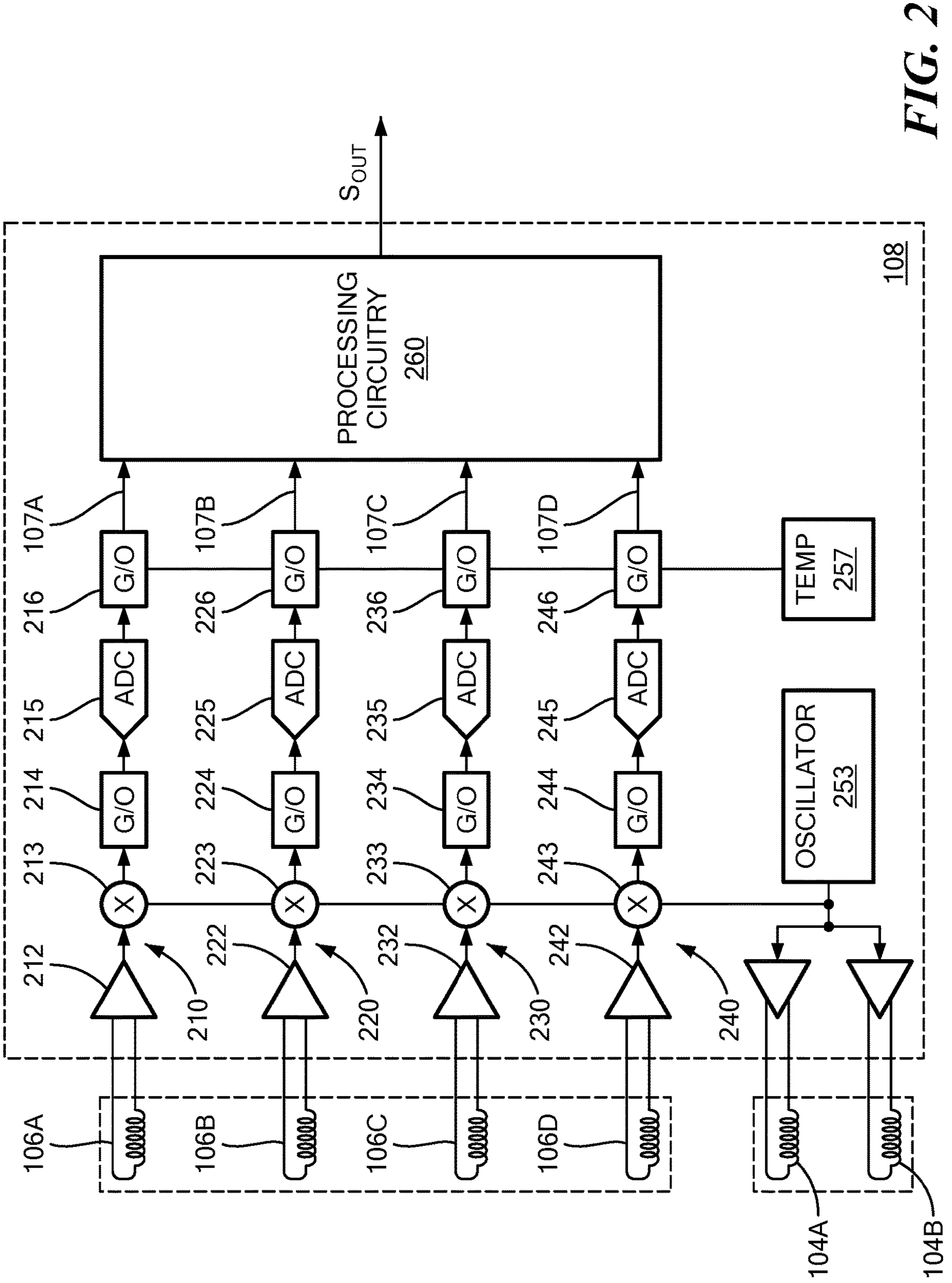
FIG. 2 is a diagram of an example of a sensor, according to aspects of the disclosure.

FIG. 2 is a circuit diagram of the sensor 108, according to aspects of the disclosure. As illustrated, the sensor 108 may include signal paths 210, 220, 230, and 240, a processing circuitry 260, a temperature sensor 257, and an oscillator 253. Each of the signal paths 210-240 may be coupled to a different one of the receiving coils 106A-D. Each of the signal paths 210-240 may be configured to generate a respective one of signals 107A-D based on the magnetic field signal that is output from a corresponding one of the receiving coils 106.

The processing circuitry 260 may be configured to receive the signals 107A-D and generate the signal Sout based on the signals 107A-D. The processing circuitry 260 may include any suitable type of electronic circuitry. By way of example, the processing circuitry 260 may include one or more of digital logic, a field-programmable gate array, a CORDIC processor, a general-purpose processor, a special-purpose processor, and/or application-specific processing circuitry.

The oscillator 253 may be configured to drive the transmitting coils with a signal 259. Although in the example of FIG. 2 the oscillator 253 is configured to drive two different transmitting coils, alternative implementations are possible in which the oscillator 253 is configured to drive only one transmitting coil or a different number of transmitting coils.

Signal path 210 may include an amplifier 212, a demodulator 213, a first gain/offset adjustment circuit 214, an analog-to-digital converter (ADC) 215, and a second gain/offset adjustment circuit 216. In operation, receiving coil 106A may generate a magnetic field signal in response to a reflected magnetic field that is generated by one of the targets 102A-B (shown in FIG. 1). The receiving coil 106A may provide the magnetic field signal to the amplifier 212. The amplifier 212 may amplify the magnetic field signal and provide the amplified signal to the demodulator 213. The demodulator 213 may demodulate the magnetic field signal, based on the signal 259, and provide the demodulated signal to the first gain/offset adjustment circuit 214. The first gain/offset adjustment circuit 214 may adjust the gain and/or offset of the demodulated signal and provide the adjusted signal to the ADC 215. The ADC 215 may digitize the demodulated signal and provide the digitized signal to the second gain/offset adjustment circuit 216. The second gain/offset adjustment circuit 216 may adjust the gain and/or offset of the digitized signal based on a signal provided by temperature sensor 257 and generate the signal 107A as a result.

Signal path 220 may include an amplifier 222, a demodulator 223, a first gain/offset adjustment circuit 224, an analog-to-digital converter (ADC) 225, and a second gain/offset adjustment circuit 226. In operation, receiving coil 106B may generate a magnetic field signal in response to a reflected magnetic field that is generated by one of the targets 102A-B (shown in FIG. 1). The receiving coil 106B may provide the magnetic field signal to the amplifier 222. The amplifier 222 may amplify the magnetic field signal and provide the amplified signal to the demodulator 223. The demodulator 223 may demodulate the magnetic field signal, based on the signal 259, and provide the demodulated signal to the first gain/offset adjustment circuit 224. The first gain/offset adjustment circuit 224 may adjust the gain and/or offset of the demodulated signal and provide the adjusted signal to the ADC 225. The ADC 225 may digitize the demodulated signal and provide the digitized signal to the second gain/offset adjustment circuit 226. The second gain/offset adjustment circuit 226 may adjust the gain and/or offset of the digitized signal based on a signal provided by temperature sensor 257 and generate the signal 107B as a result.

Signal path 230 may include an amplifier 232, a demodulator 233, a first gain/offset adjustment circuit 234, an analog-to-digital converter (ADC) 235, and a second gain/offset adjustment circuit 236. In operation, receiving coil 106C may generate a magnetic field signal in response to a reflected magnetic field that is generated by one of the targets 102A-B (shown in FIG. 1). The receiving coil 106C may provide the magnetic field signal to the amplifier 232. The amplifier 232 may amplify the magnetic field signal and provide the amplified signal to the demodulator 233. The demodulator 233 may demodulate the magnetic field signal, based on the signal 259, and provide the demodulated signal to the first gain/offset adjustment circuit 234. The first gain/offset adjustment circuit 234 may adjust the gain and/or offset of the demodulated signal and provide the adjusted signal to the ADC 235. The ADC 235 may digitize the demodulated signal and provide the digitized signal to the second gain/offset adjustment circuit 236. The second gain/offset adjustment circuit 236 may adjust the gain and/or offset of the digitized signal based on a signal provided by temperature sensor 257 and generate the signal 107C as a result.

Signal path 240 may include an amplifier 242, a demodulator 243, a first gain/offset adjustment circuit 244, an analog-to-digital converter (ADC) 245, and a second gain/offset adjustment circuit 246. In operation, receiving coil 106D may generate a magnetic field signal in response to a reflected magnetic field that is generated by one of the targets 102A-B (shown in FIG. 1). The receiving coil 106D may provide the magnetic field signal to the amplifier 242. The amplifier 242 may amplify the magnetic field signal and provide the amplified signal to the demodulator 243. The demodulator 243 may demodulate the magnetic field signal, based on the signal 259, and provide the demodulated signal to the first gain/offset adjustment circuit 244. The first gain/offset adjustment circuit 244 may adjust the gain and/or offset of the demodulated signal and provide the adjusted signal to the ADC 245. The ADC 245 may digitize the demodulated signal and provide the digitized signal to the second gain/offset adjustment circuit 246. The second gain/offset adjustment circuit 246 may adjust the gain and/or offset of the digitized signal based on a signal provided by temperature sensor 257 and generate the signal 107D as a result.

The processing circuitry 260 may receive signals 107A-D and generate the signal Sout, which is indicative of torque (e.g., twisting force). In some implementations, the processing circuitry 260 may execute any of processes 900, 1000, and 1100, which are discussed further below. FIG. 2 shows one example of a possible sensor architecture. However, the present disclosure is not limited to any specific type of sensor or sensor architecture.

Figure 3A:
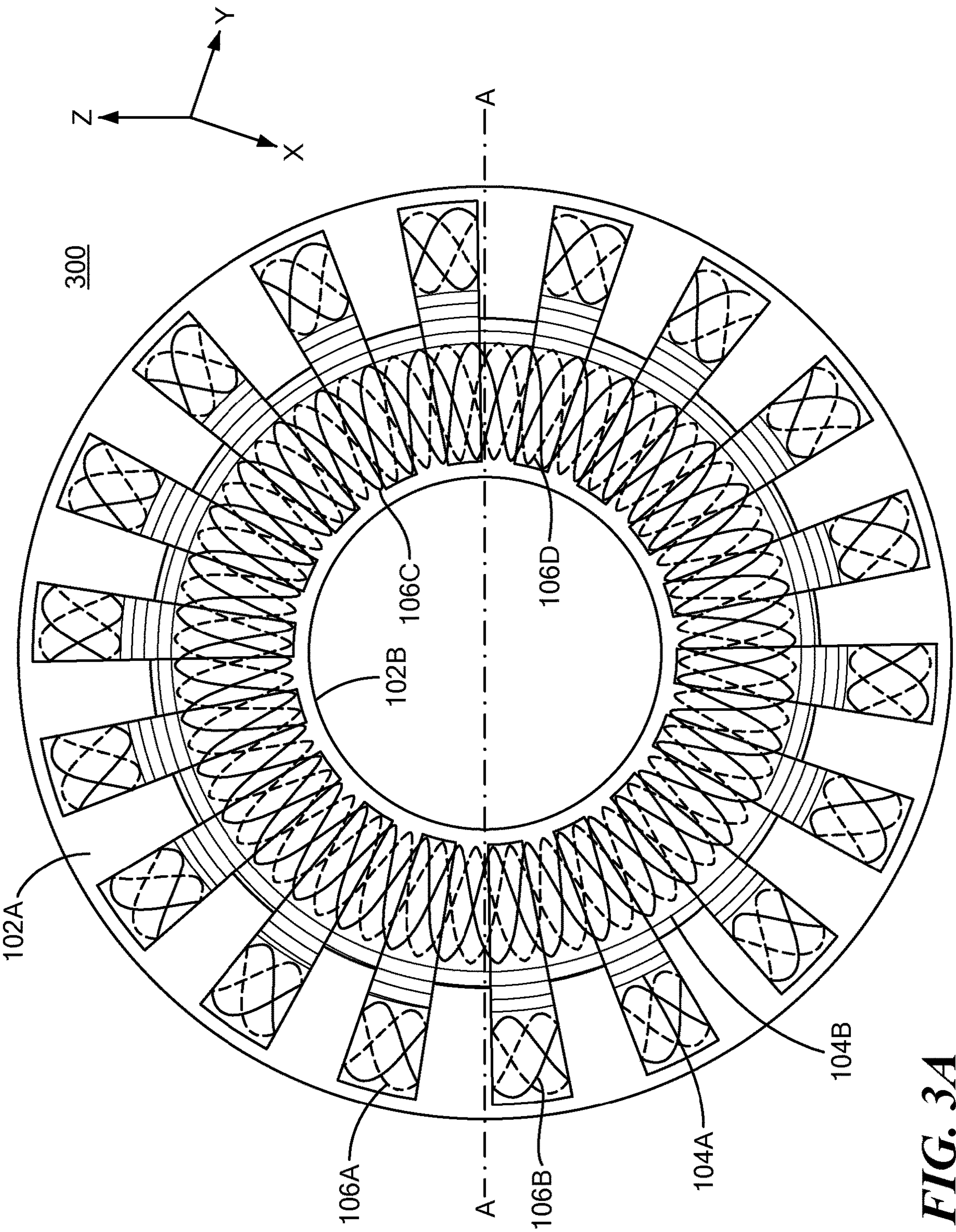
FIG. 3A is a top-down view of an example of an assembly, according to aspects of the disclosure.

FIG. 3A is a diagram of an assembly 300, according to one implementation. As illustrated, the assembly 300 may include targets 102A-B, transmitting coils 104A-B, and receiving coils 106A-D. In one aspect, FIG. 3A illustrates, that the targets 102A-B may be concentric. Receiving coils 106A-B may be stacked over each other and placed above or below target 102A. Receiving coils 106C-D may be stacked over each other and placed above or below target 102B. Transmitting coil 104A may be placed over target 102A and transmitting coil 104B may be placed over target 102B.

Figure 3B:
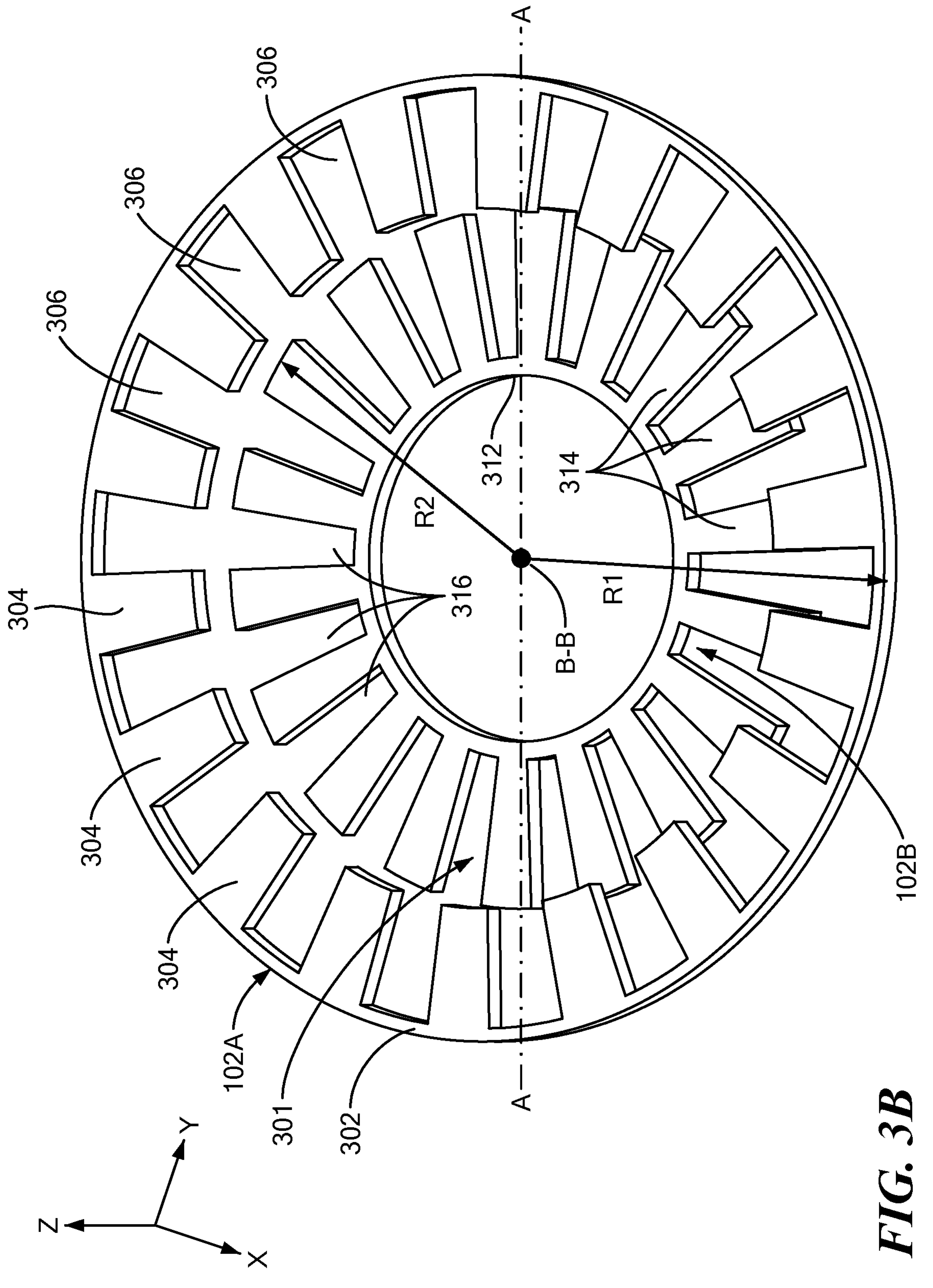
FIG. 3B is a perspective view of an example of a set of targets, according to aspects of the disclosure.

FIG. 3B shows the targets 102A-B in further detail. As illustrated, target 102A may include teeth 304 that are separated by valleys 306 and coupled to a band 302. Target 102B may include teeth 314 that are separated by valleys 316 and coupled to a band 312. Target 102A may have a radius R1 and target 102B may have a radius R2 that is smaller than the radius R1. Although in the example of FIG. 3B targets 102A-B include bands 302 and 312, alternative implementations are possible in which the bands are omitted. In such implementations, the teeth 304 and 314 may be formed on a plastic substrate or a substrate made of another material (e.g., another dielectric material). In some implementations, the targets 102A-B may be formed of metal.

In some implementations, instead of having a band 302, target 102A may include a first substrate that is formed of a dielectric material, and the teeth 304 may be formed on the first substrate. In such implementations, the teeth 304 may be formed of metal and/or any other suitable material. Additionally or alternatively, in some implementations, instead of having a band 312, target 102B may include a second substrate that is formed of a dielectric material, and the teeth 314 may be formed on the second substrate. In such implementations, the teeth 314 may be formed of metal and/or any other suitable material. As can be readily appreciated, in implementations in which target 102A includes a first substrate and target 102B includes a second substrate, the first substrate may be different from the second substrate so that the first substrate is able to move relative to the second substrate when a mechanical link coupling the first substrate to the second substrate is twisted (e.g., torqued, etc.).

Figure 3C:
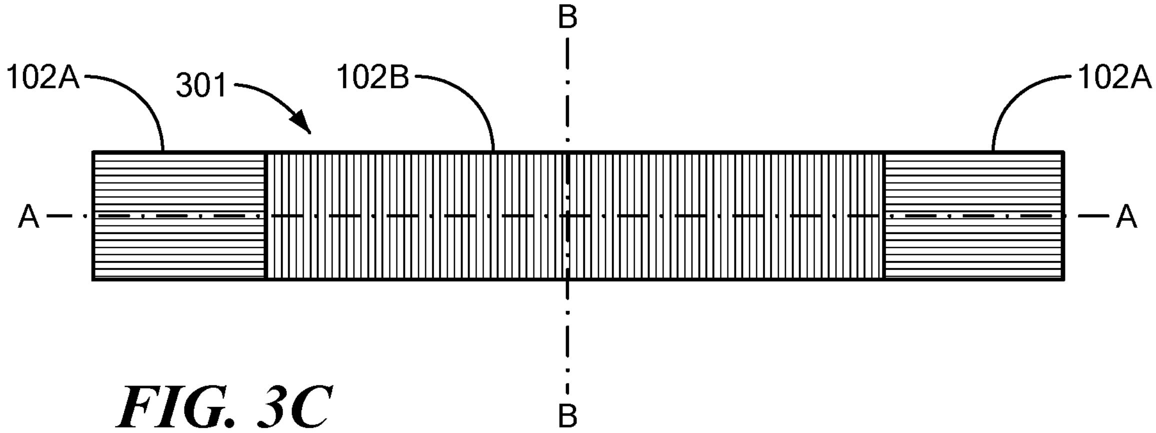
FIG. 3C is a cross-sectional side view of the set of targets of FIG. 3A, according to aspects of the disclosure.

FIG. 3C is a cross-sectional side view of the targets taken along axis A-A. As illustrated, target 102B may be disposed below or above an opening 301 of target 102A. According to the present example, targets 102A-B are concentric. As used herein, the phrase “concentric targets” shall mean that one target is placed in, above, or below an opening that is defined by (or present in) the other target. Although, in the example of FIG. 3C, targets 102A-B are centered with each other, and on axis B-B, the present disclosure is not limited thereto. According to the present example, targets 102A-B are situated in the same plane. However, alternative implementations are possible in which target 102B is situated above or below the opening 301 that is formed in target 102A. In such implementations, target 102A may be offset from target 102B along an axis B-B. According to the present example, bands 312 and 302 each have a circular shape. However, alternative implementations are possible in which any of bands 312 and 302 has a different shape, such as an oval shape or rectangular shape, etc. According to the present example, target 102A has as many teeth as target 102B. However, alternative implementations are possible in which target 102B has a smaller number of teeth than target 102A. In general, if it is desired to detect a torque range of +/−X degrees, one would need a number of teeth N so that 360/N>2*X.

Figure 3D:
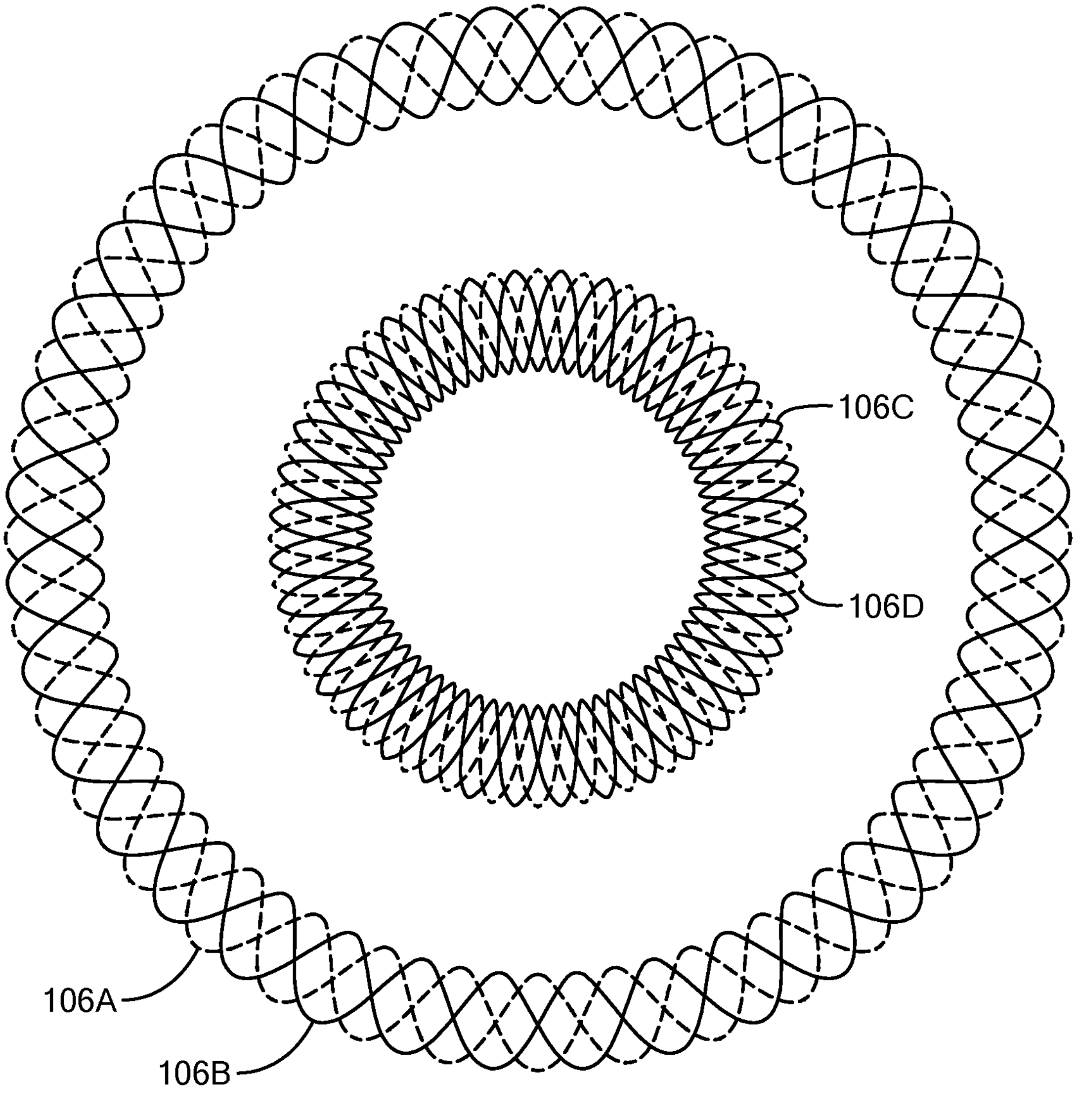
FIG. 3D is a top-down view of a set of receiving coils, according to aspects of the disclosure.

FIG. 3D shows receiving coils 106A-D in further detail. Receiving coil 106A may have a sinusoidal shape, whereas receiving coil 106B may have a co-sinusoidal shape. As a result of this arrangement, signals 107A-B, which are generated by receiving coils 106A-B, respectively, are 90 degrees off-phase from each other, with one signal having a sinusoidal envelope while the other has a co-sinusoidal envelope. Furthermore, receiving coil 106C may have a sinusoidal shape, and receiving coil 106D may have a co-sinusoidal shape. As a result of this arrangement, signals 107C-D, which are generated by receiving coils 106C-D, respectively, may be 90 degrees off-phase from each other, with one signal having a sinusoidal envelope while the other has a co-sinusoidal envelope.

Figure 5A:
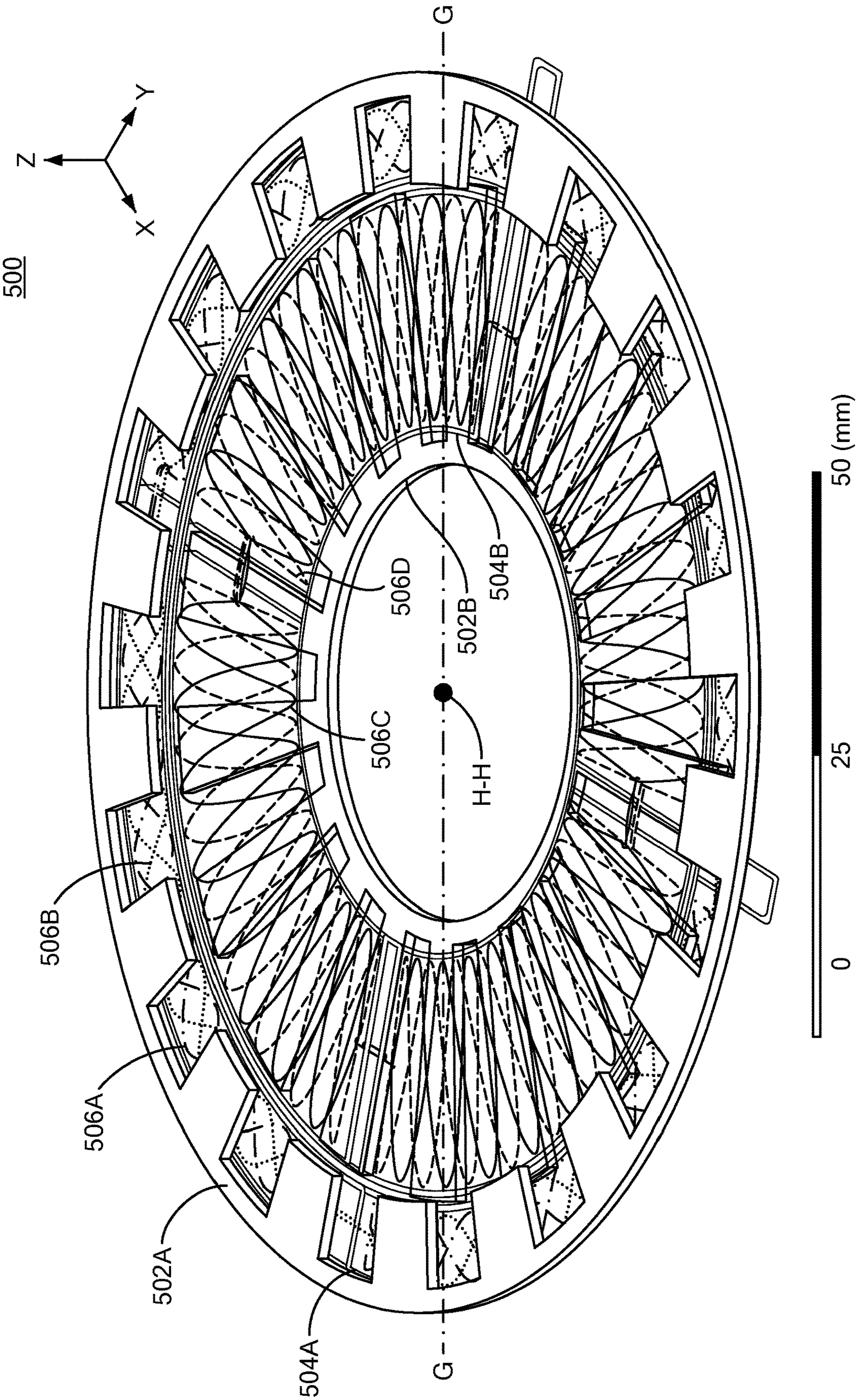
FIG. 5A is a perspective view of an example of a system, according to aspects of the disclosure.
Figure 5N:
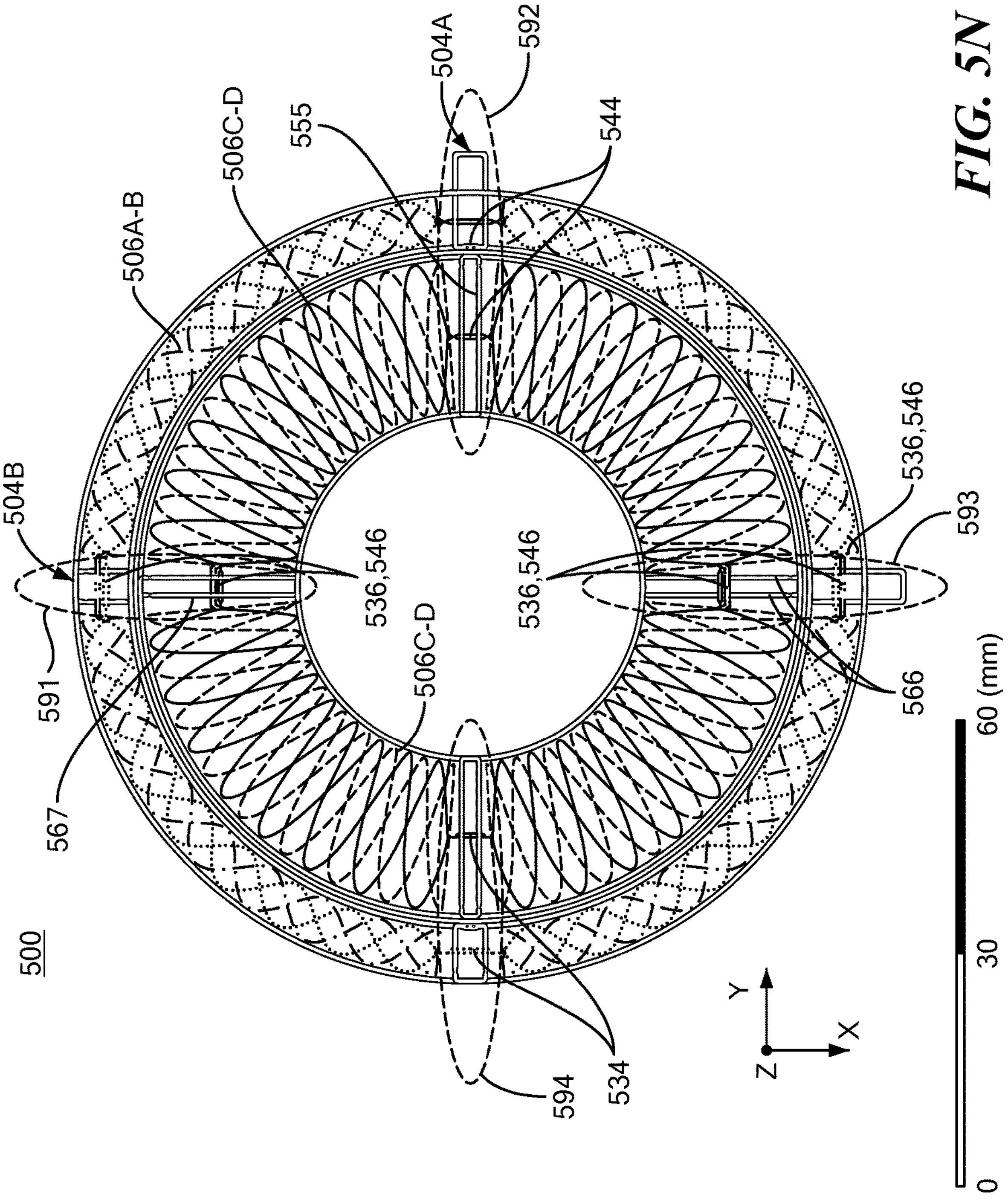
FIG. 5N is a top-down view of the system of FIG. 5A, according to aspects of the disclosure.
Figure 6A:
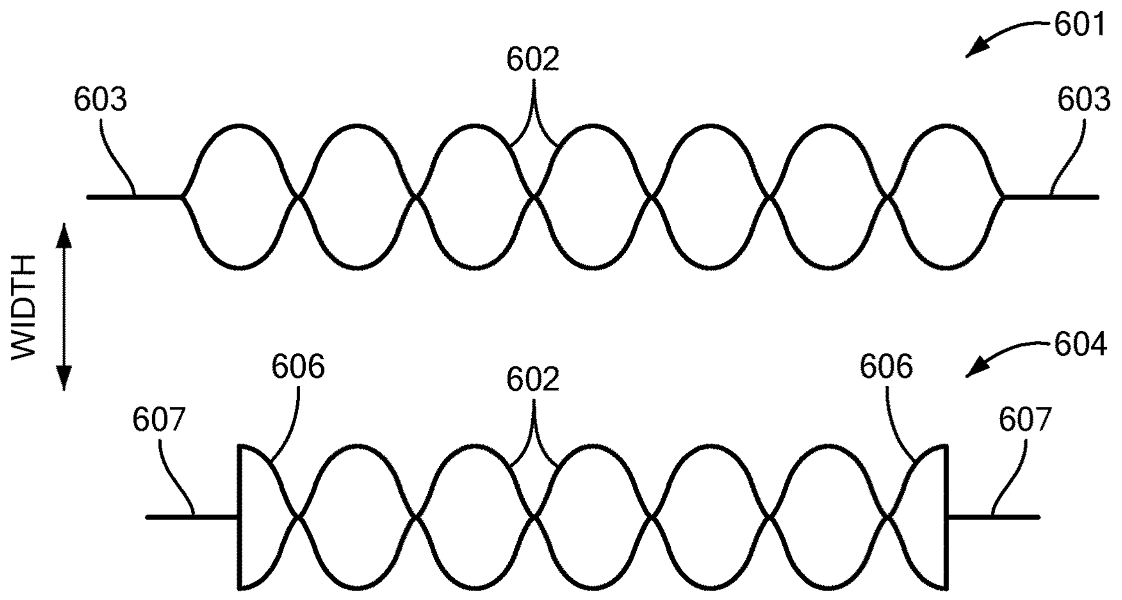
FIG. 6A is a diagram of a set of transmitting coil portions, according to aspects of the disclosure.

Each of receiving coils 106A-D may be formed of a conductive trace or wire that is arranged to wind its way into a plurality of lobes, such as the lobes 602 (shown in FIG. 6A). Each of the receiving coils 106A-D may have a uniform polarity. As used throughout the disclosure, the phrase "coil having a sinusoidal shape" shall mean that the coil has such a shape and/or orientation in space, so that the coil produces a signal having a sinusoidal envelope. As used throughout the disclosure, the phrase "coil having a co-sinusoidal shape" shall mean that the coil has such a shape and/or orientation in space, so that the coil produces a signal having a co-sinusoidal envelope. As can be readily appreciated, a pair of coils that are said to have sinusoidal and co-sinusoidal shapes, respectively, may have identical shapes, but one of the coils may be rotated relative to the other by 90 degrees. On the other hand, as illustrated in FIGS. 5A-N and FIG. 6A, receiving coils that have sinusoidal and co-sinusoidal shapes may have different shapes. Also, in some implementations, a coil that has a sinusoidal shape may be shaped the same as one or more sinusoidal waveforms, and a coil that has a co-sinusoidal shape may be shaped the same as one or more co-sinusoidal waveforms.

Figure 3E:
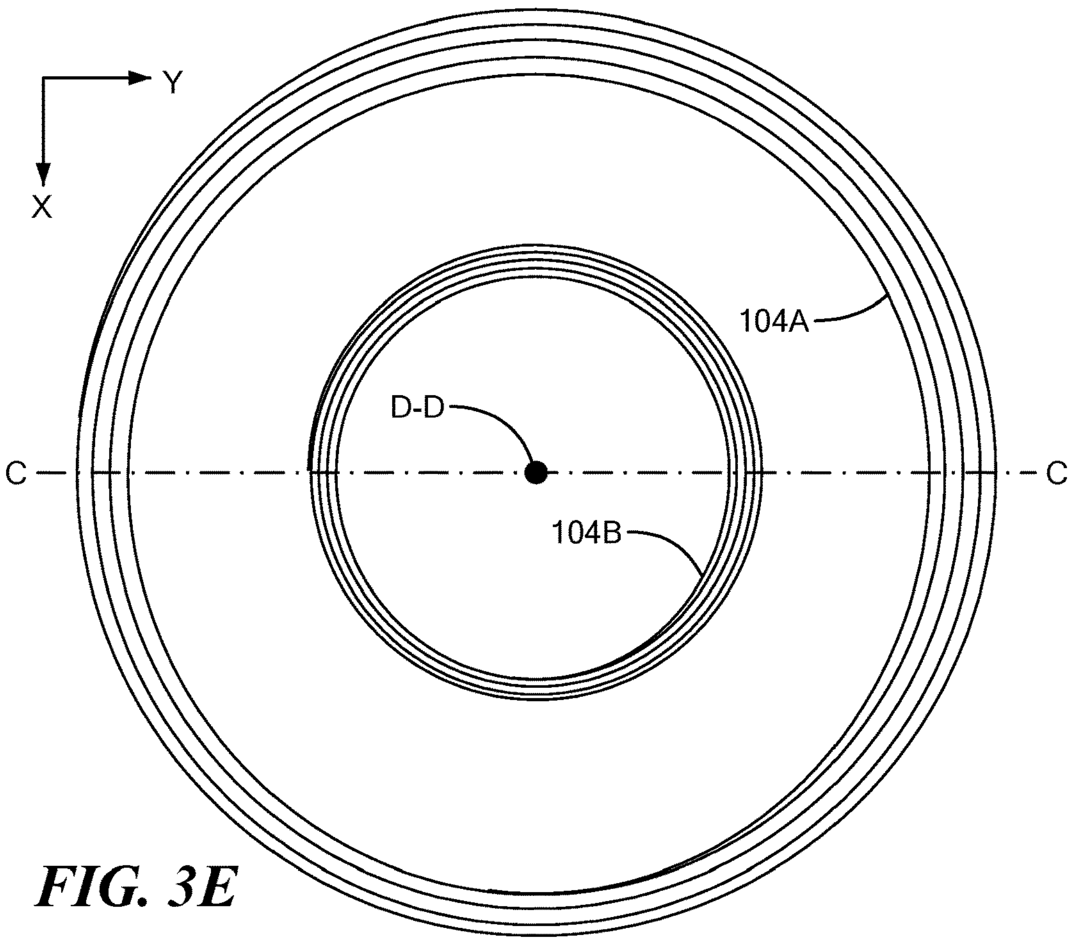
FIG. 3E is a top-down view of a set of transmitting coils, according to aspects of the disclosure.
Figure 3F:
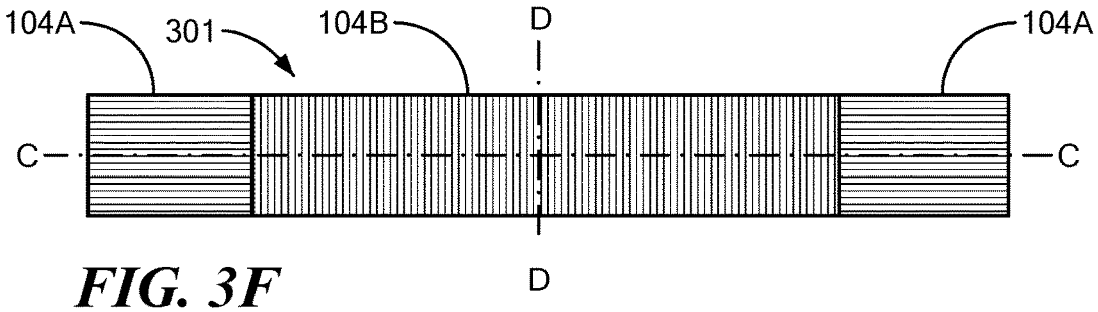
FIG. 3F is a cross-sectional side view of the set of transmitting coils of FIG. 3E, according to aspects of the disclosure.

FIG. 3E shows transmitting coils 104A-B in further detail. FIG. 3F is a cross-sectional side view of transmitting coils 104A-B taken along an axis C-C. Although in the present example, transmitting coils 104A-B are situated in the same plane, alternative implementations are possible in which one of transmitting coils 104A-B is situated above or below the other. In such implementations, one of the transmitting coils 104A-B may be offset from the other along an axis D-D. Transmitting coils 104A-B may each include a respective spiral winding, wherein each of the windings is configured to excite a different one of targets 102A-B. The winding may be connected in parallel or serially depending on the driver maximum current and compliant voltage. As noted above, one of the windings may be disposed over target 102A and the other winding may be disposed over target 102B. In this regard, one of the windings may have a greater radius than the other.

Figure 3G:
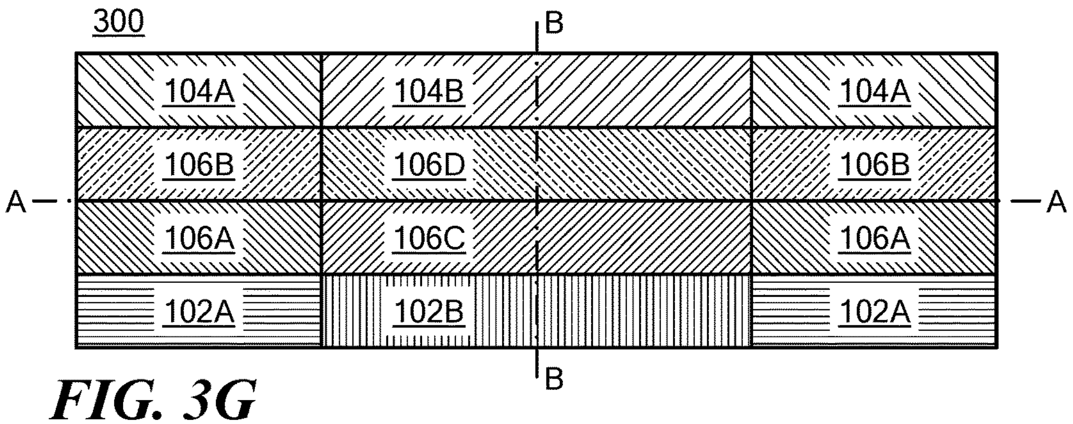
FIG. 3G is a cross-sectional side view of the assembly of FIG. 3A, according to aspects of the disclosure.

FIG. 3G is a cross-sectional side view of assembly 300 taken along the axis A-A. FIG. 3G is provided to illustrate one example of the relative positioning of the elements of assembly 300 along the axis B-B. However, it will be understood that the present disclosure is not limited to any specific relative positioning of the elements of assembly 300. For example, in some implementations, any or all of receiving coils 106A-D may be disposed above, below, or at the same level as receiving coils 104A-D. For instance, in some implementations, the receiving coils may be disposed between transmitting coils 104A-B. As another example, receiving coils 106A-B and 106A-D may be disposed between the targets 102A-D and or transmitting coils 102A-D. Furthermore, each of transmitting coils 104A-B may be disposed in the same plane with one or more of the receiving coils 106A-D.

Figure 4A:
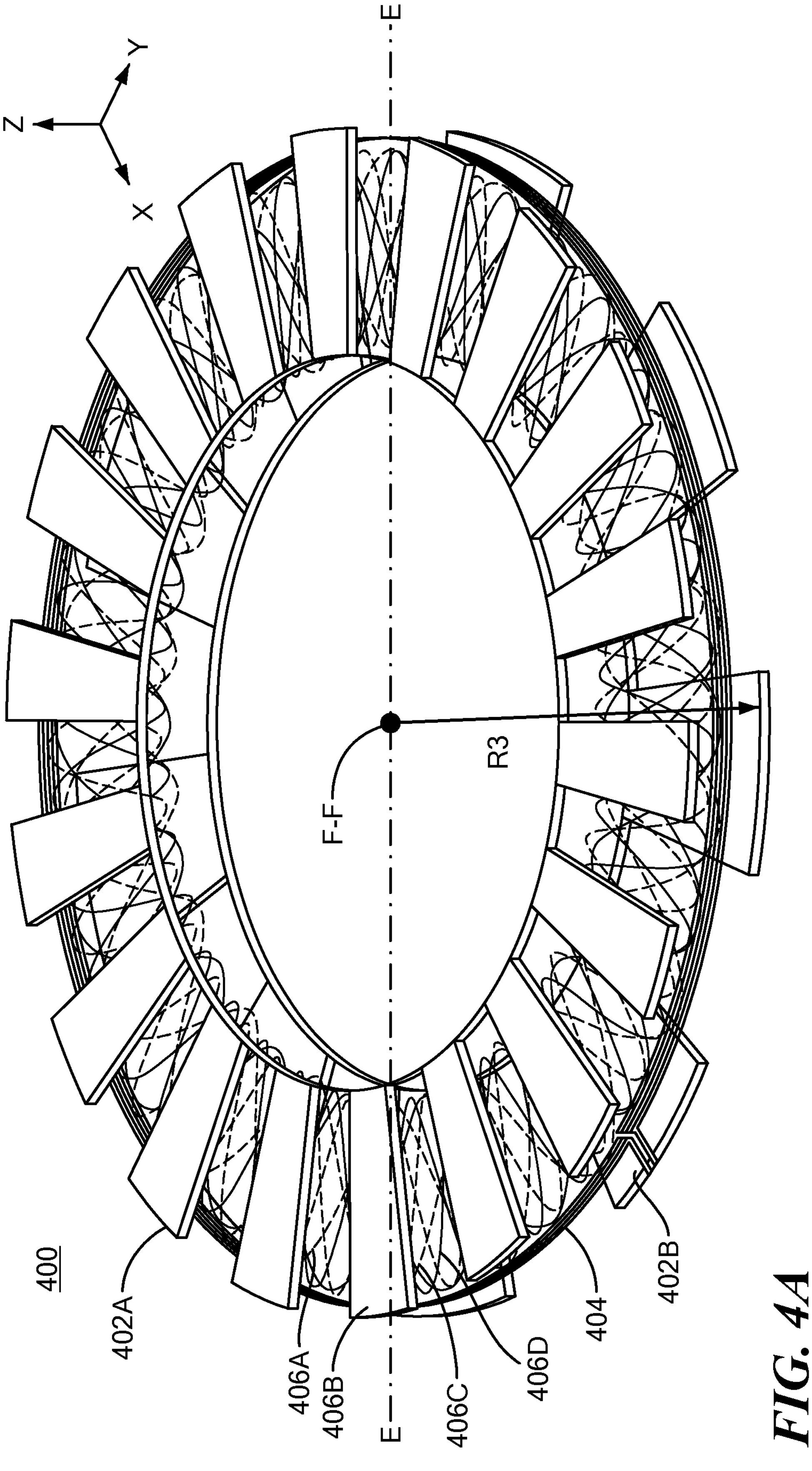
FIG. 4A is a perspective view of an example of an assembly, according to aspects of the disclosure.
Figure 4B:
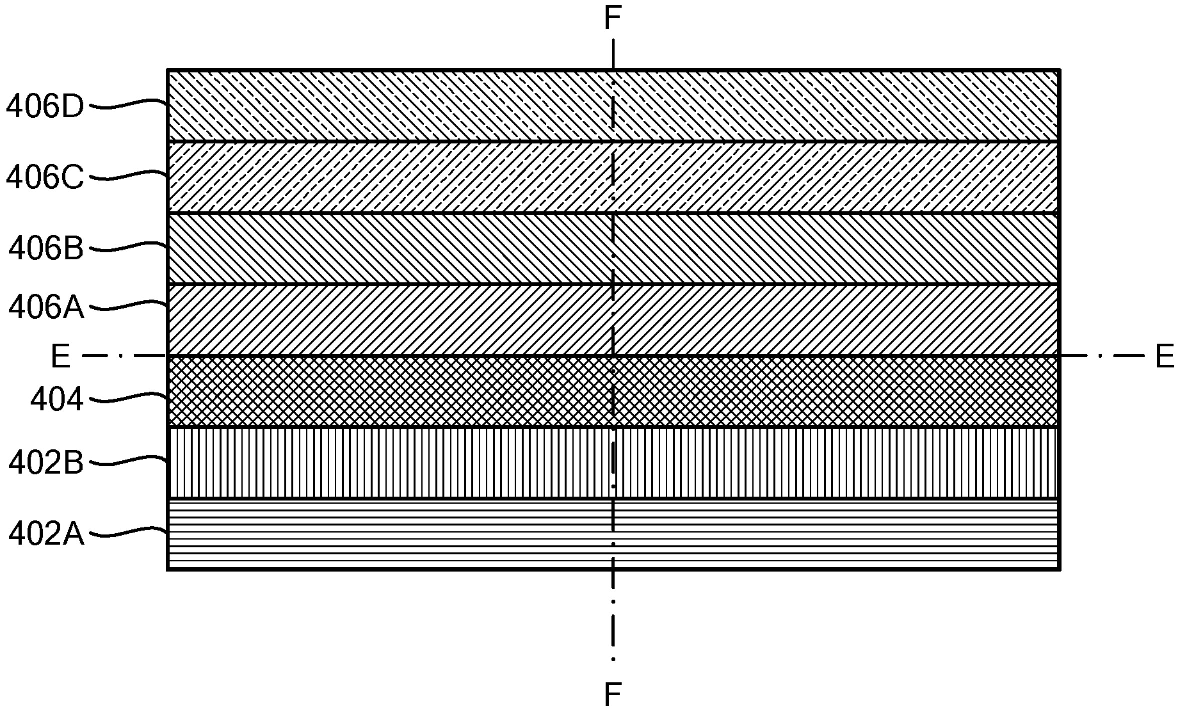
FIG. 4B is a cross-sectional side view of the assembly of FIG. 4A, according to aspects of the disclosure.

FIGS. 4A-F show an example of an assembly 400, according to aspects of the disclosure. As illustrated in FIG. 4A, the assembly 400 may include targets 402A-B, a transmitting coil 404, and receiving coils 406A-D. The targets 402A-B may be stacked over each other along an axis F-F. The transmitting coil 404 may be disposed between the targets 402A-B, or above or below the targets 402A-B. The terms "above" or "below", as used in this example, refer to displacement along the axis F-F. The receiving coils 406A-D may also be stacked. Each of the receiving coils 406A-D may be disposed between the targets 402A-B, or above or below the targets 402A-B. The targets 402A-B may have a radius R3. Although in the example of FIG. 4A, the targets 402A-B have the same radius, alternative implementations are possible in which the targets 402A-B have different radii. FIG. 4B shows a cross-sectional side view of the assembly 400 that is taken along an axis E-E. FIG. 4B shows that the targets 402A-B, the transmitting coil 404, and the receiving coils 406A-D may be stacked over each other, along an axis F-F. Axis F-F may be perpendicular to axis E-E. In a preferred implementation, the transmitting coil 404 and the receiving coils 406A-D may be sandwiched between the targets 402A-B. In other words, targets 402A-B may be disposed on opposite sides of one or more (or all) of transmitting coil 404 and receiving coils 406A-D.

Figure 4C:
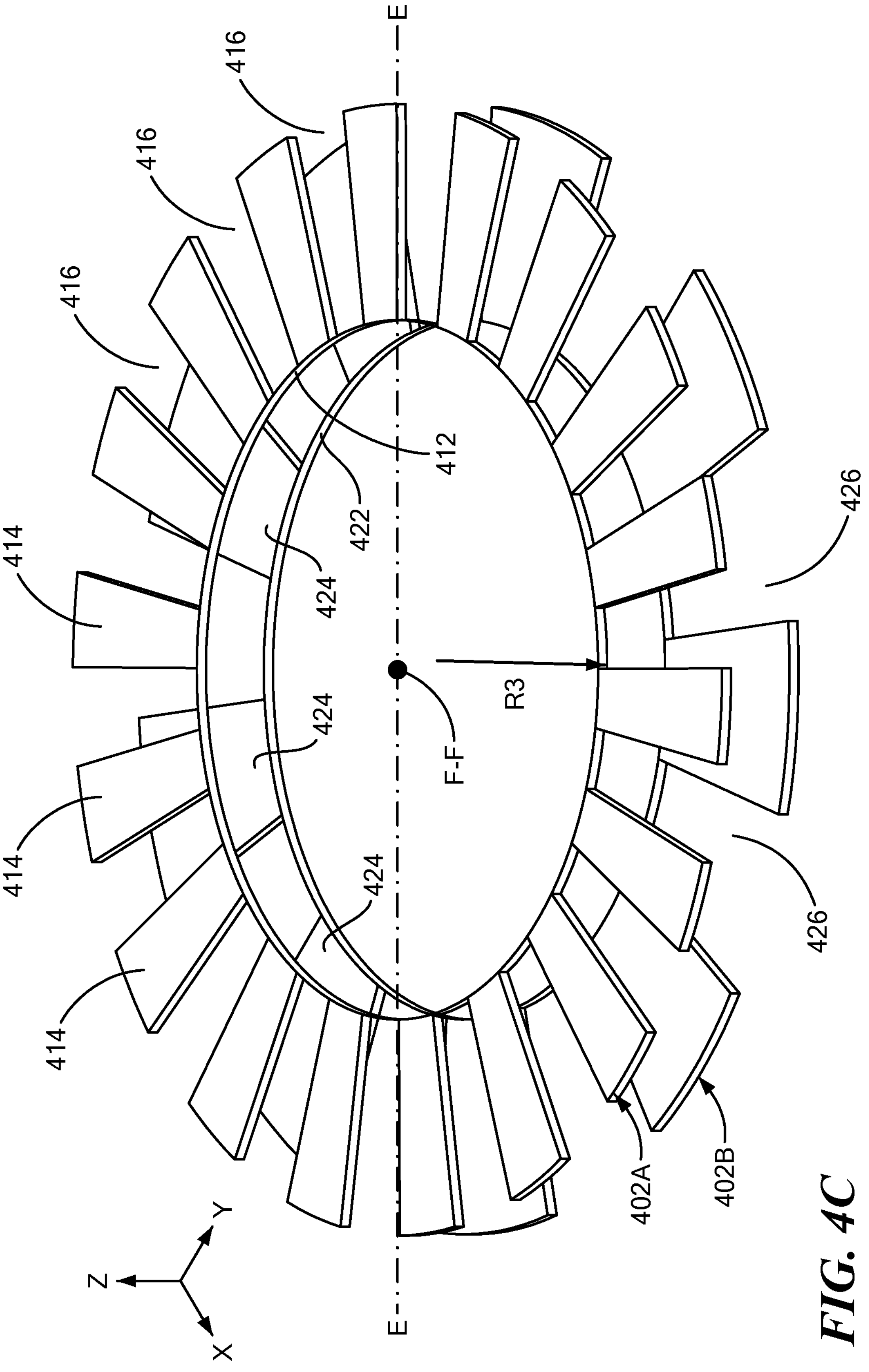
FIG. 4C is a perspective view of a set of targets, according to aspects of the disclosure.

FIG. 4C shows an example of the targets 402A-B, in accordance with one implementation. As illustrated, target 402A may include a band 412 and a plurality of teeth 414 that is coupled to the band 412 and separated by valleys 416. Target 402B may include a band 422 and a plurality of teeth 424 that is coupled to the band 422 and separated by valleys 426. According to the present example, target 402A includes 2N teeth and target 402B includes N teeth, where N is a positive integer greater than 2. Furthermore, as is discussed further below, the number of teeth in target 402A may be any integer multiple of the number of teeth in target 402B.

According to the present example, the bands 412 and 422 have a circular shape and they are centered on axis F-F. However, alternative implementations are possible in which the bands 412 and 422 have a different shape, such as a linear shape, a rectangular shape, an oval shape, or an arch shape. Although, in the example of FIG. 4C, targets 402A-B include bands 412 and 422, alternative implementations are possible in which the bands are omitted. In such implementations, the teeth 414 and 424 may be formed on a plastic substrate or a substrate made of another material (e.g., another dielectric material). In some implementations, the targets 402A-B may be formed of metal.

In some implementations, instead of having a band 412, target 402A may include a first substrate (not shown) that is formed of a dielectric material, and the teeth 414 may be formed on the first substrate. In such implementations, the teeth 414 may be formed of metal and/or any other suitable material. Additionally or alternatively, in some implementations, instead of having a band 422, target 402B may include a second substrate that is formed of a dielectric material, and the teeth 424 may be formed on the second substrate. In such implementations, the teeth 424 may be formed of metal and/or any other suitable material. As can be readily appreciated, in implementations in which target 402A includes a first substrate and target 402B includes a second substrate, the first substrate may be different from the second substrate so that the first substrate is able to move relative to the second substrate when a mechanical link coupling the first substrate to the second substrate is twisted (e.g., torqued, etc.).

Figure 4D:
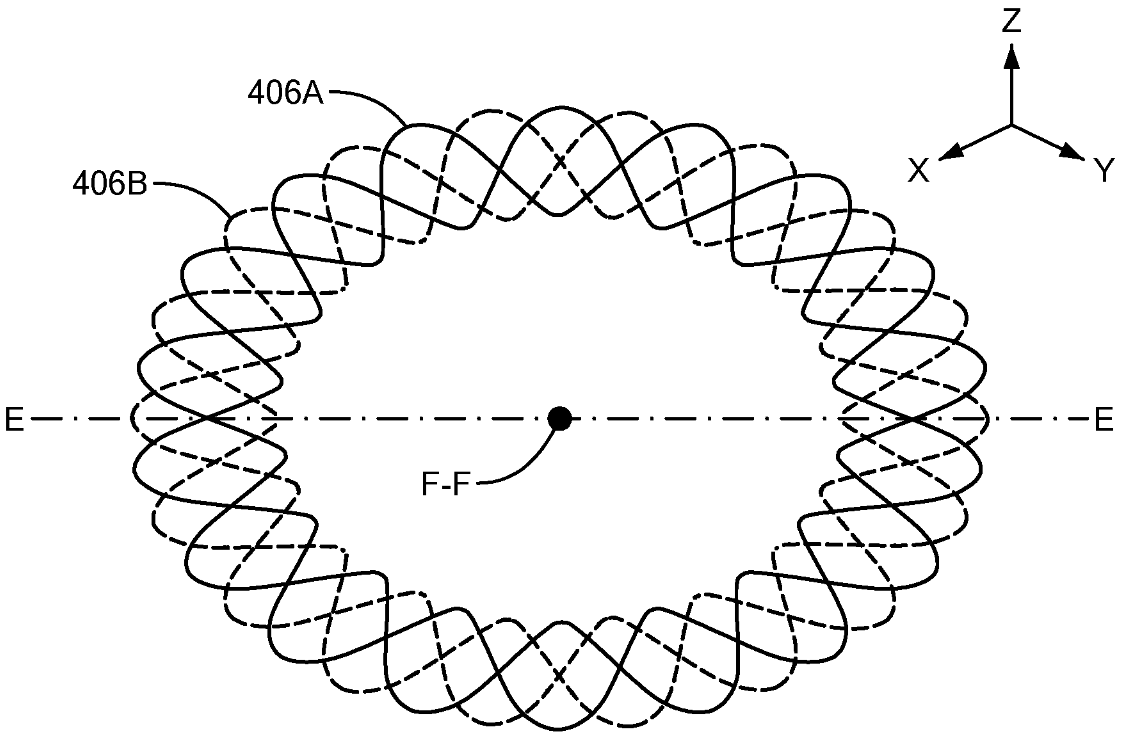
FIG. 4D is a perspective view of an example of a set of receiving coils, according to aspects of the disclosure.
Figure 4E:
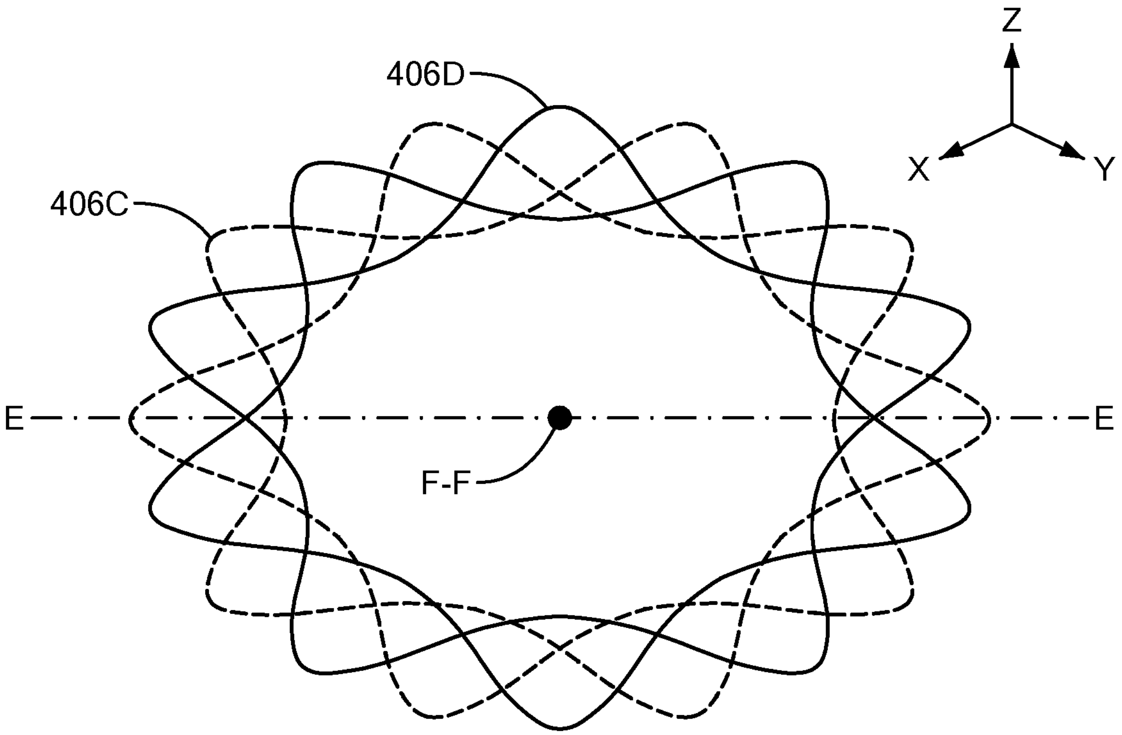
FIG. 4E is a perspective view of an example of a set of receiving coils, according to aspects of the disclosure.

FIGS. 4D-E show an example of the receiving coils 406A-D, in accordance with one implementation. According to the present example, receiving coil 406A has a sinusoidal shape and receiving coil 406B has a co-sinusoidal shape. Receiving coils 406A-B may be arranged to sense a reflected magnetic field that is produced by target 402A and produce respective magnetic field signals in response to the sensed reflected magnetic field. Because receiving coils 406A-B have sinusoidal and co-sinusoidal shapes, respectively, magnetic field signals that are produced by receiving coils 406A-B may be 90 degrees off-phase. In some implementations, receiving coils 406A-B may each have 2N periods, which is the same as the number of teeth that are present in target 402A.

According to the present example, receiving coil 406C has a sinusoidal shape, and receiving coil 406D has a co-sinusoidal shape. Receiving coils 406C-D may be arranged to sense a reflected magnetic field that is produced by target 402B and produce respective magnetic field signals in response to sensed reflected magnetic field. Because receiving coils 406C-D have sinusoidal and co-sinusoidal shapes, respectively, magnetic field signals that are produced by receiving coils 406C-D may be 90 degrees off-phase. In some implementations, receiving coils 406C-D may each have N periods, which is the same number of teeth that are present in target 402B.

According to the present example, receiving coils 406A-D each have a circular shape, and they are centered on axis F-F. However, alternative implementations are possible in which receiving coils 406A-D have a different shape, such as a linear shape, a rectangular shape, or a semi-circular shape. As illustrated in FIG. 4B, receiving coils 406A-D may be stacked over each other along axis F-F. In some implementations, receiving coils 406A-D may be situated above or below the targets 402A-B. Additionally or alternatively, in some implementations, at least two of receiving coils 406A-D may be situated on opposite sides of any of targets 402A-B. Additionally or alternatively, in some implementations, at least one of receiving coils 406A-D may be disposed between targets 402A-B. Stated succinctly, the present disclosure is not limited to any specific position of targets 402A-B relative to receiving coils 406A-D.

Figure 4F:
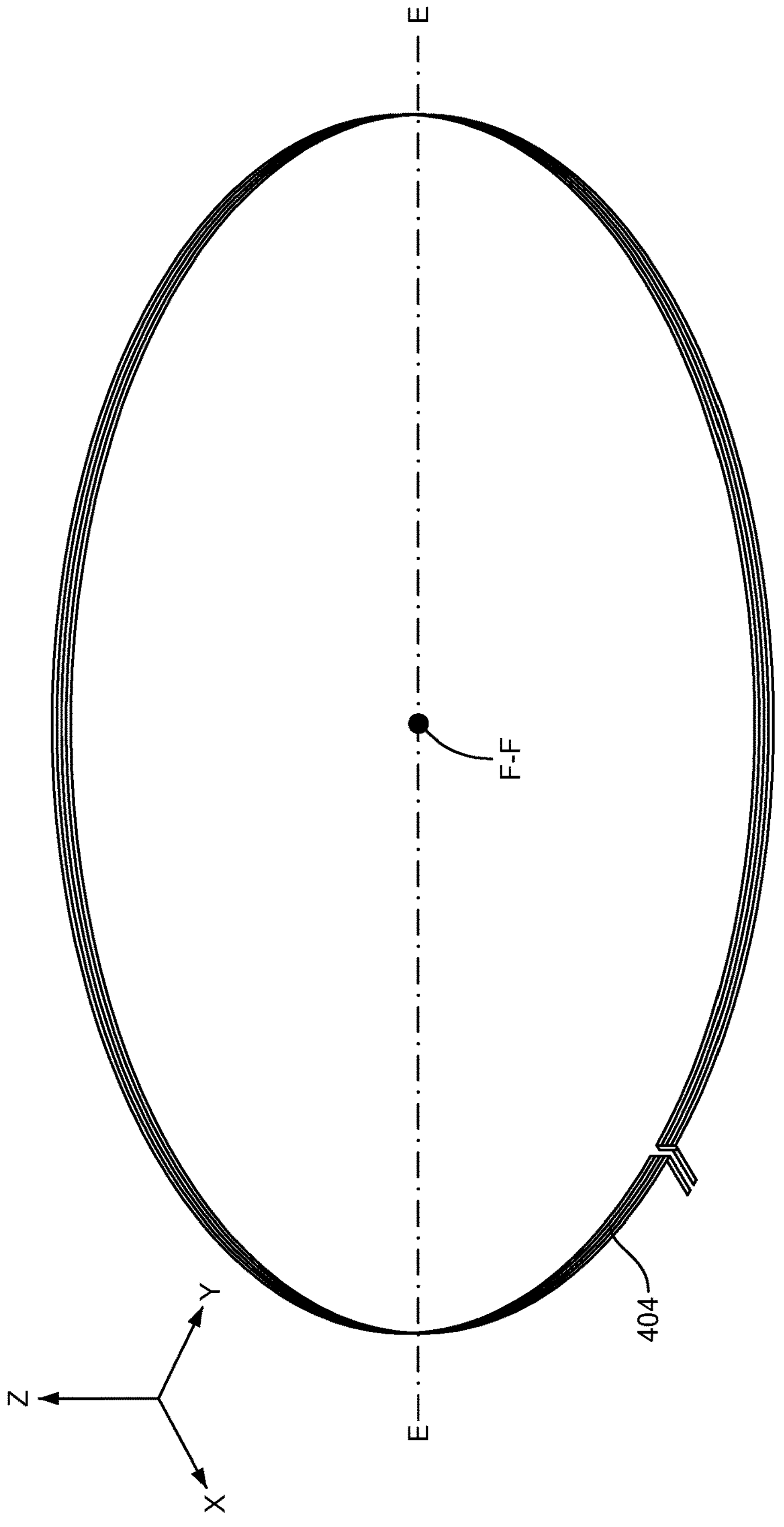
FIG. 4F is a perspective view of an example of a transmitting coil, according to aspects of the disclosure.

FIG. 4F shows the transmitting coil 404, in accordance with one implementation. According to the example of FIG. 4F, the transmitting coil 404 has a circular shape and it is centered on axis F-F. However, alternative implementations are possible in which the transmitting coil has a different shape, such as a linear shape, a rectangular shape, or a semi-circular shape. The transmitting coil 404 may be positioned above or below the targets 402A-B or between them. The transmitting coil 404 may be positioned above or below the receiving coils 406A-D or between any two of receiving coils 406A-D. Stated succinctly, the present disclosure is not limited to any positioning of transmitting coil 404 relative to any of the targets 402A-B and/or receiving coils 406A-D.

FIG. 5A is a perspective view of an example of an assembly 500, according to aspects of the disclosure. As illustrated, the assembly 500 may include targets 502A-B, transmitting coils 504A-B, and receiving coils 506A-D.

Figure 5B:
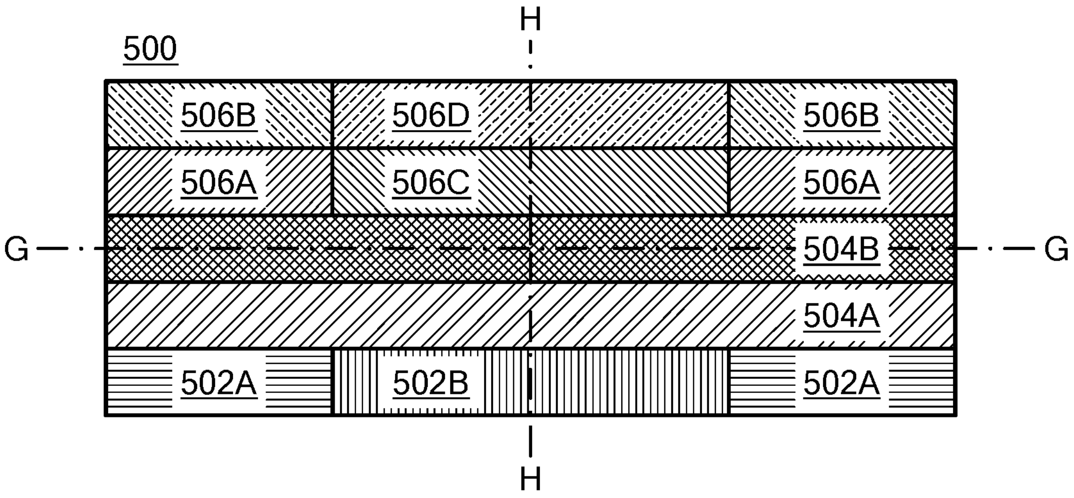
FIG. 5B is a cross-sectional side view of the system of FIG. 5A, according to aspects of the disclosure.

FIG. 5B is a planar side view of the assembly 500 taken along an axis G-G (shown in FIG. 5A). As illustrated, targets 502A-B may be disposed in the same plane. Transmitting coil 504A may be disposed over targets 502A-B and transmitting coil 504B may be disposed over transmitting coil 504A. Receiving coils 506A-B may be disposed over target 502A and receiving coils 506C-D may be disposed over target 502B.

Although, in the present example, targets 502A-B are disposed in the same plane, alternative implementations are possible in which one of the targets 502A-B is disposed in a plane above the other. In some implementations, targets 502A-B may be the same as targets 102A-B. and they may be arranged, relative to each other, in the manner discussed above with respect to FIGS. 3B-C. Although, in the present example, receiving coils 506A and 506C are disposed in the same plane, alternative implementations are possible in which one of receiving coils 506A and 506C is disposed in a plane above the other of receiving coils 506A and 506C. Although, in the present example, receiving coils 506B and 506D are disposed in the same plane, alternative implementations are possible in which one of receiving coils 506B and 506D is disposed above or below the other. Furthermore, alternative implementations are possible in which any of transmitting coils 504A-B is disposed below or between targets 502A-B, or between receiving coils 506A-506C and 506B-506D. Furthermore, alternative implementations are possible in which receiving coils 506A and 506D are disposed above receiving coils 506B and 506D, below targets 502A-B, or between targets 502A-B. Similarly, receiving coils 506B and 506D may be disposed below targets 502A-B, or between targets 502A-B and receiving coils 504A-B. In a preferred implementation, targets 502A-B may be disposed on opposite sides of receiving coils 506A-D and transmitting coils 504A-D. In a preferred implementation, each of transmitting coils 504A-B may be disposed in a same layer as any two of receiving coils 506A-D. Stated succinctly, the present disclosure is not limited to any specific relative positioning of the elements of assembly 500, along an axis H-H.

Figure 5C:
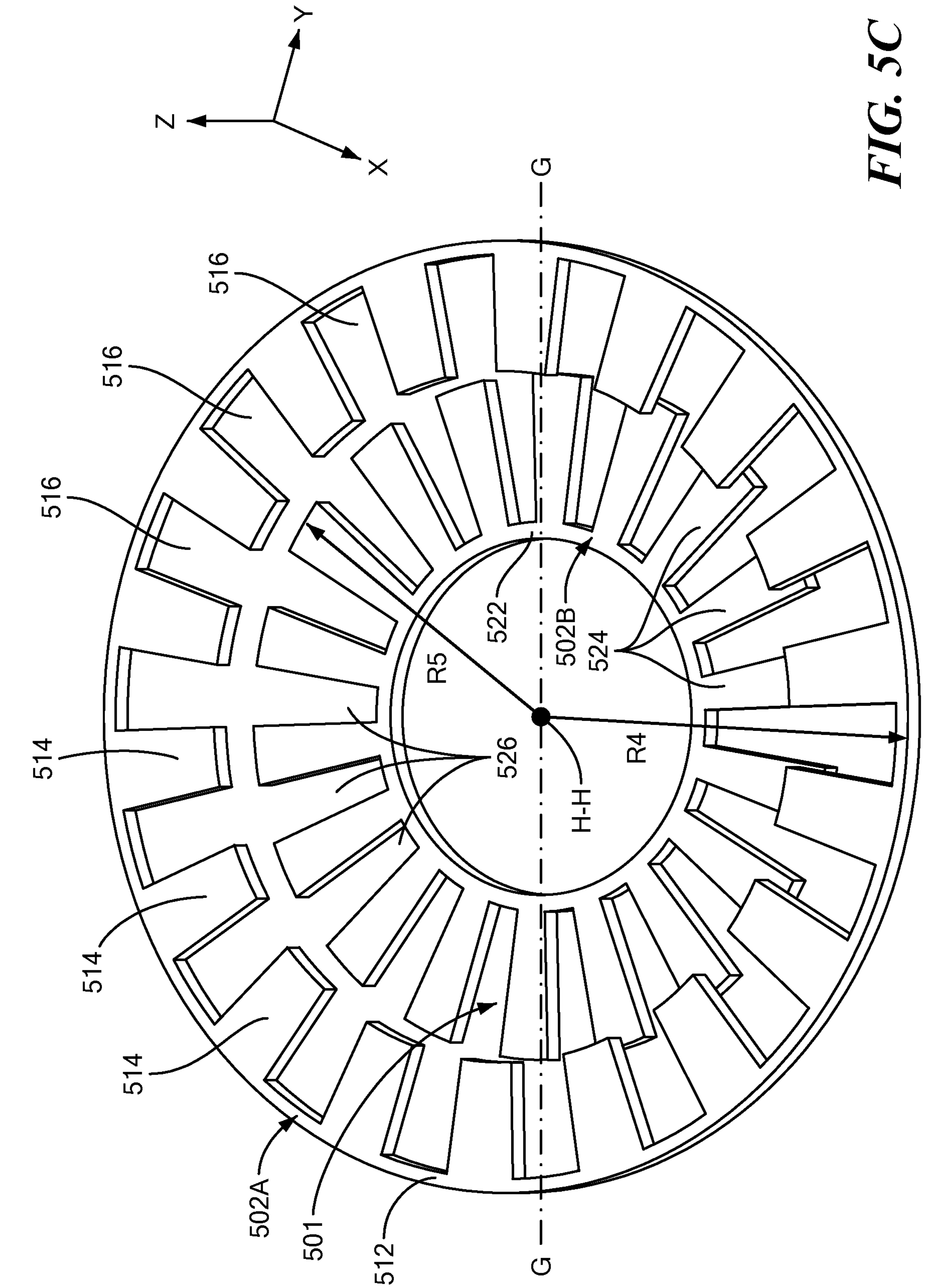
FIG. 5C is a perspective view of an example of a set of targets, according to aspects of the disclosure.

FIG. 5C shows the targets 502A-B in further detail. As illustrated, target 502B may be disposed inside an opening 501 that is formed in target 502A. As illustrated, target 502A may include teeth 514 that are separated by valleys 516 and coupled to a band 512. Target 502B may include teeth 524 that are separated by valleys 526 and coupled to a band 522. Target 502A may have a radius R4 and target 502B may have a radius R5 that is smaller than the radius R4. Although in the example of FIG. 3B targets 502A-B include bands 512 and 522, respectively, alternative implementations are possible in which the bands are omitted. In such implementations, the teeth 524 and 514 may be formed on a plastic substrate or a substrate made of another material (e.g., another dielectric material). In some implementations, the targets 502A-B may be formed of metal. In some implementations, the targets 502A-B may have the same number of teeth.

In some implementations, instead of having a band 512, target 502A may include a first substrate (not shown) that is formed of a dielectric material, and the teeth 514 may be formed on the first substrate. In such implementations, the teeth 514 may be formed of metal and/or any other suitable material. Additionally or alternatively, in some implementations, instead of having a band 522, target 502B may include a second substrate (not shown) that is formed of a dielectric material, and the teeth 524 may be formed on the second substrate. In such implementations, the teeth 524 may be formed of metal and/or any other suitable material. As can be readily appreciated, in implementations in which target 502A includes a first substrate and target 502B includes a second substrate, the first substrate may be different from the second substrate so that the first substrate is able to move relative to the second substrate when a mechanical link coupling the first substrate to the second substrate is twisted (e.g., torqued, etc.).

Figure 5D:
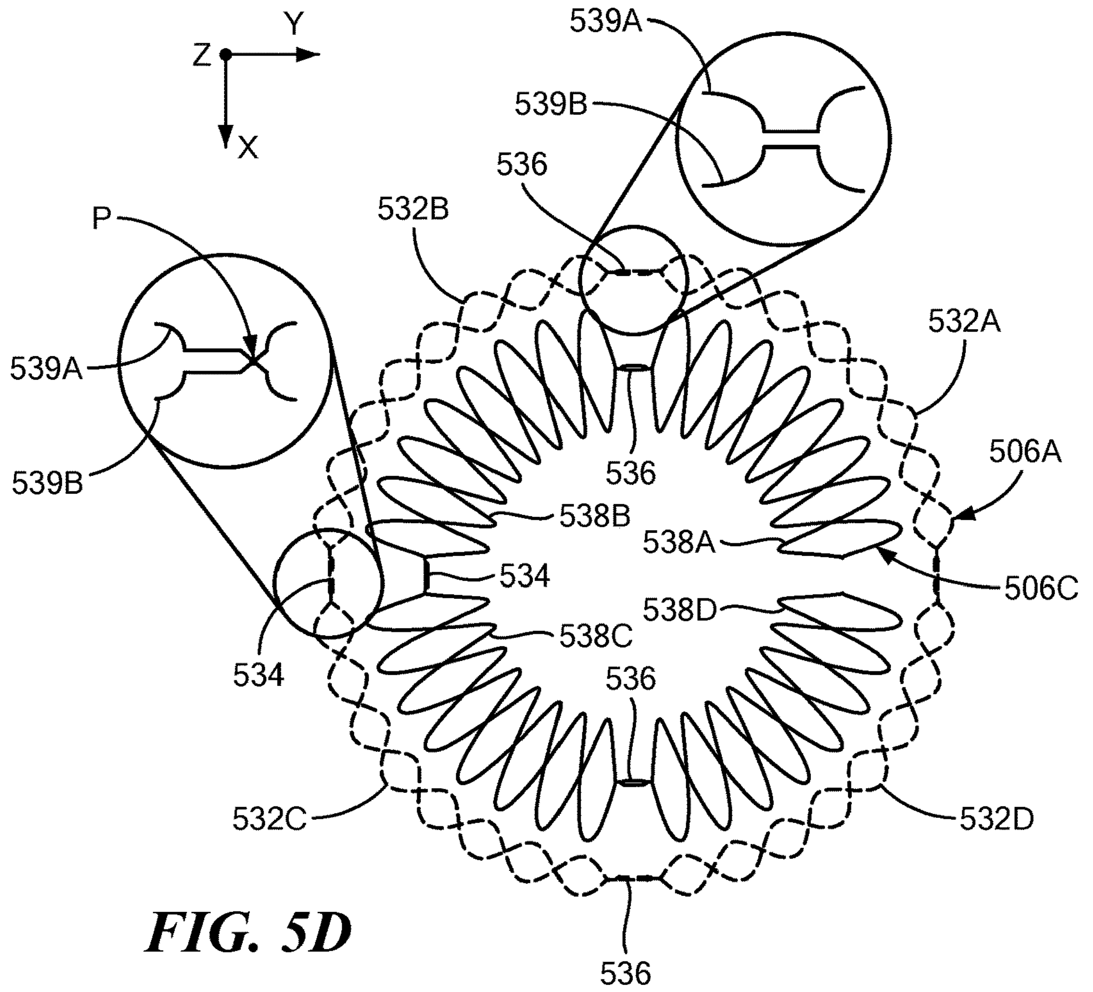
FIG. 5D is a top-down view of a set of receiving coils, according to aspects of the disclosure.

FIG. 5D shows the receiving coils 506A and 506C in further detail. As illustrated, receiving coil 506A may include segments 532A-D. Each of segments 532A-D may have a sinusoidal shape. Segments 532A and 532B may be coupled with a transition portion 536; segments 532B and 532C may be coupled with a transition portion 534; and segments 532C and 532D may be coupled with a transition portion 536. Receiving coil 506C may include segments 538A-C. Each of segments 538A-C may have a sinusoidal shape. Segments 538A-B may be coupled with a transition portion 536; segments 538B-C may be coupled with a transition portion 534; and segments 538C-D may be coupled with a transition portion 536.

Figure 5E:
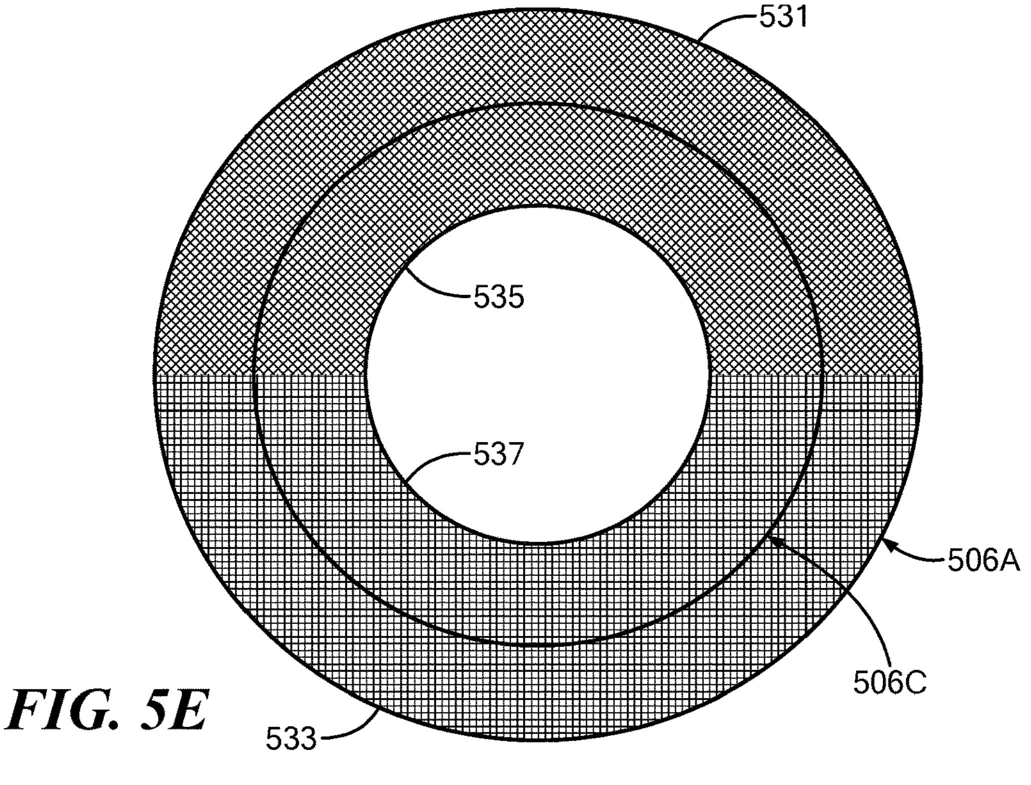
FIG. 5E is a schematic diagram of the set of receiving coils of FIG. 5D, according to aspects of the disclosure.

FIG. 5E is a schematic diagram of receiving coils 506A and 506C. As illustrated receiving coil 506A may include portions 531 and 533, and receiving coil 506C may include portions 537 and 535. Portion 531 may be comprised of segments 532A-B, portion 533 may be comprised of segments 532C-D, portion 535 may be comprised of segments 538A-B, and portion 537 may be comprised of segments 538C-D. According to the present example, portions 531 and 535 have a first polarity and portions 533 and 537 have a second polarity that is opposite (or different) to the first polarity.

Receiving coil 506A may be formed of a wire or conductive trace that is arranged to define the shape shown in FIG. 5D. The switch in polarity between portions 531 and 533 may be achieved through the use of the transition portion 534, which connects segments 532B and 532C. As illustrated, in transition portion 534, sections 539A-B of the wire/conductive trace used to form receiving coil 506A may cross each other at point P. It will be understood that sections 539A-B may not come in electrical contact at point P, in the sense that sections 539A-B do not form a short circuit at point P. By contrast, in transition portions 536, sections 539A-B may approach each other without crossing over, which in turn allows segment 532B to maintain the same polarity as segment 532A, and segment 532D to maintain the same polarity as segment 532C.

Receiving coil 506C may be formed of a wire or conductive trace that is arranged to define the shape shown in FIG. 5D. The switch in polarity between portions 535 and 537 may be achieved through the use of the transition portion 534, which connects segment 538B to segment 538C. By contrast, portions 538C-D are coupled with a transition portion 536 and they have the same polarity as a result. Similarly, portions 538A-B are also coupled with a transition portion 536 and they have the same polarity, as well.

The term "polarity of a receiving or transmitting coil portion," as used throughout the disclosure, shall refer to the direction of the flow of current through the coil. For example, in receiving or transmitting coil portions that have the same polarities, electrical current would flow in the same direction (e.g., clockwise or right). By contrast, in receiving or transmitting coil portions, electrical current would flow in opposite (or different) directions (e.g., counterclockwise/clockwise or left/right directions).

Under the nomenclature of the present disclosure, FIG. 5E shows what is referred to as the "polarity pattern" of transmission coils 504A—namely, the spatial arrangement of different transmission coil sections of opposite (or different) polarities. The polarity pattern shown in FIG. 5E is referred to as a "type-1 polarity pattern". On the other hand, the polarity pattern of transmitting coils 104A and 104B (shown in FIG. 3E) is referred to as a "uniform polarity pattern" because each of the transmitting coils 104A-B have the same polarity its entire circumference.

Although, in the example of FIG. 5E, segments 531 and 535 have the same polarity, an alternative implementation is possible in which they have opposite (or different) polarities. In the alternative implementation, segments 537 and 533 would also have the opposite (or different) polarities. Under the nomenclature of the present disclosure, the polarity pattern of the alternative implementation is referred to as a "type-2 polarity pattern." As discussed above, any desired polarity pattern of receiving coils 506A and 506C may be achieved depending on which ones of transition portions 534 or 536 are used to connect different segments of the receiving coils 506A and 506C.

Figure 5F:
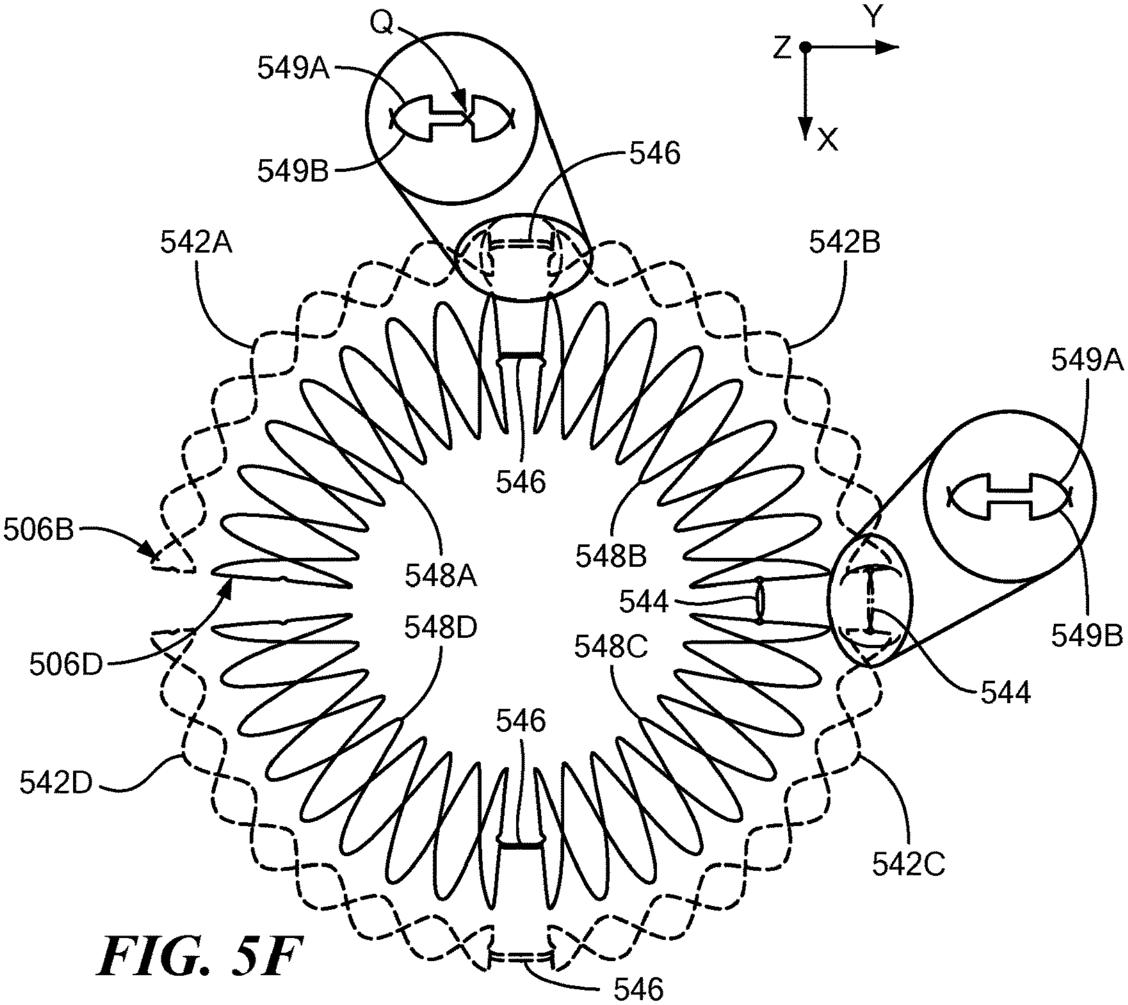
FIG. 5F is a top-down view of a set of receiving coils, according to aspects of the disclosure.

FIG. 5F shows the receiving coils 506B and 506D in further detail. As illustrated, receiving coil 506B may include segments 542A-D. Each of segments 542A-D may have a co-sinusoidal shape. Segments 542A and 542B may be coupled with a transition portion 546; segments 542B and 542C may be coupled with a transition portion 544; and segments 542C and 542D may be coupled with a transition portion 546. Receiving coil 506D may include segments 548A-D. Each of segments 548A may have a co-sinusoidal shape. Segments 548A-B may be coupled with a transition portion 546; segments 548B-C may be coupled with a transition portion 544; and segments 548C-D may be coupled with a transition portion 546.

Figure 5G:
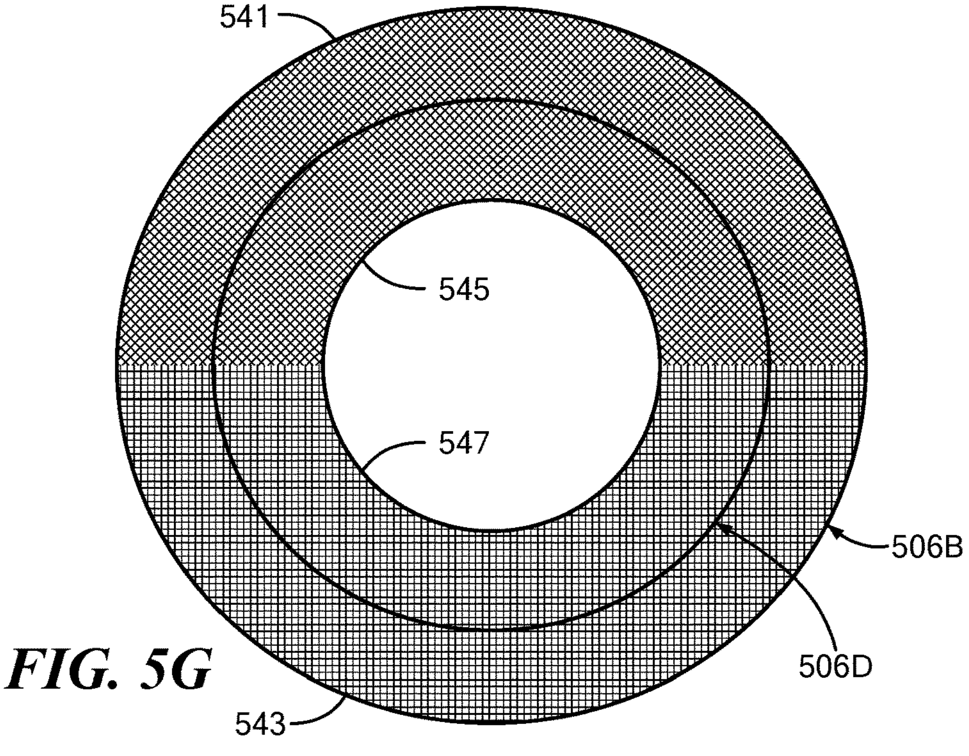
FIG. 5G is a schematic diagram of the set of receiving coils of FIG. 5F, according to aspects of the disclosure.

FIG. 5G shows the polarity pattern of receiving coils 506B and 506D. As illustrated receiving coil 506B may include portions 541 and 543, and receiving coil 506D may include portions 547 and 545. Portion 541 may be comprised of segments 542A and 542B, portion 543 may be comprised of segments 542C-D, portion 545 may be comprised of segments 548A and 548B, and portion 547 may be comprised of segments 548C-D. According to the present example, portions 541 and 545 have a first polarity and portions 543 and 547 have a second polarity that is opposite (or different) to the first polarity.

Receiving coil 506B may be formed of a wire or conductive trace that is arranged to define the shape shown in FIG. 5F. The switch in polarity between portions 541 and 543 may be achieved through the use of transition portions 544 that couple segment 542B with segment 542C, and segment 548B with segment 548C. As illustrated, sections 549A-B may approach each other without crossing-over. By contrast, in transition portion 546, sections 549A-B of the wire/conductive trace used to form receiving coil 506B may cross each other at point Q. It will be understood that sections 549A-B may not come in electrical contact at point Q, in the sense that sections 549A-B do not form a short circuit at point Q.

Receiving coil 506B may be formed of a wire or conductive trace that is arranged to define the shape shown in FIG. 5F. The switch in polarity between portions 545 and 547 may be achieved through the use of the transition portions 546 that couple segment 548A with segment 548B, and segment 548C with segment 548D, respectively. By contrast, portions 548B-C are coupled with a transition portion 544 and they have the same polarity as a result.

Figure 5H:
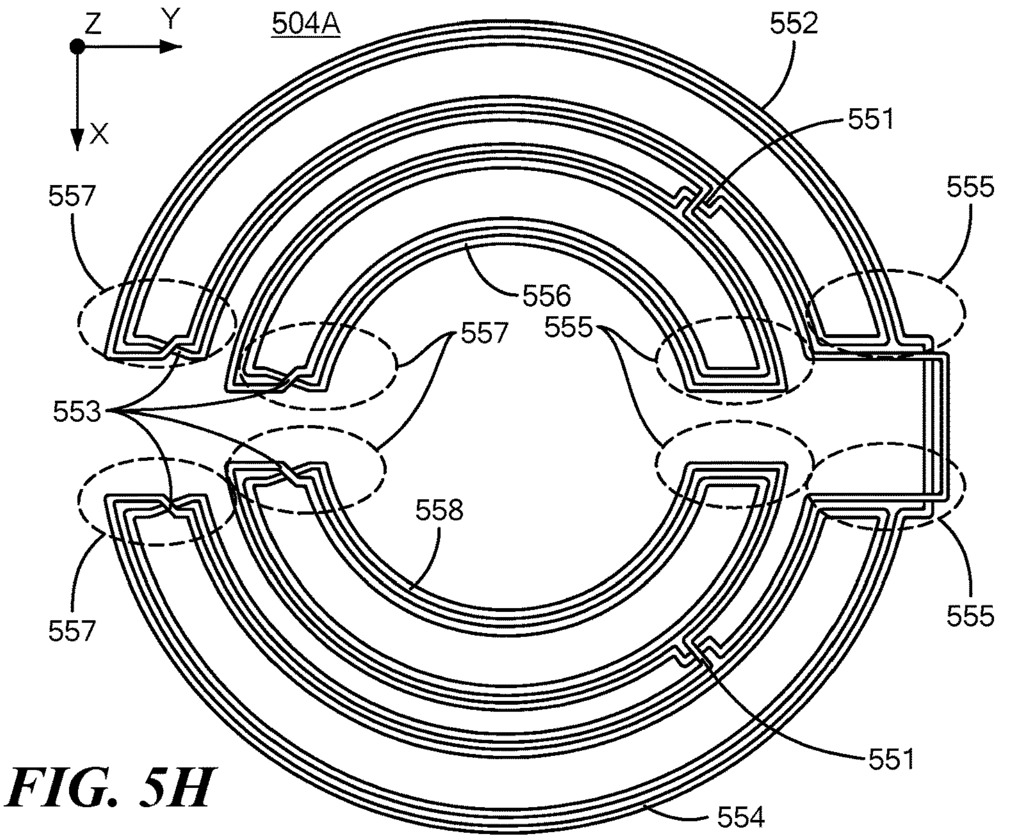
FIG. 5H is a top-down view of a transmitting coil, according to aspects of the disclosure.

FIG. 5H is a diagram of the transmitting coil 504A, according to aspects of the disclosure. As illustrated, the transmitting coil 504A may include segments 552, 554, 556, and 558. Segment 552 may have ends 557 and 555, with end 557 including a cross-over 553. Segment 554 may have ends 557 and 555, with end 557 including a cross-over 553. Segment 556 may include ends 557 and 555, with end 557 including a cross-over 553. Segment 558 may include ends 557 and 555, with end 557 including a cross-over 553. According to the present example, segments 552 and 554 are concentric (or otherwise nested) with segments 556 and 558. Segments 552 and 556 may be coupled via a cross-over 551 which causes segments 552 and 556 to maintain the same polarity. Segments 554 and 558 may be coupled via a cross-over 551 which causes segments 554 and 558 to maintain the same polarity. Each of cross-overs 553 may be a location where different sections of the conductive trace (or wire) used to form transmitting coil 504A intersect without coming in electrical contact or creating a short circuit. Each of cross-overs 551 may be a location where different sections of the conductive trace (or wire) used to form transmitting coil 504A intersect without coming in electrical contact or creating a short circuit.

Figure 5I:
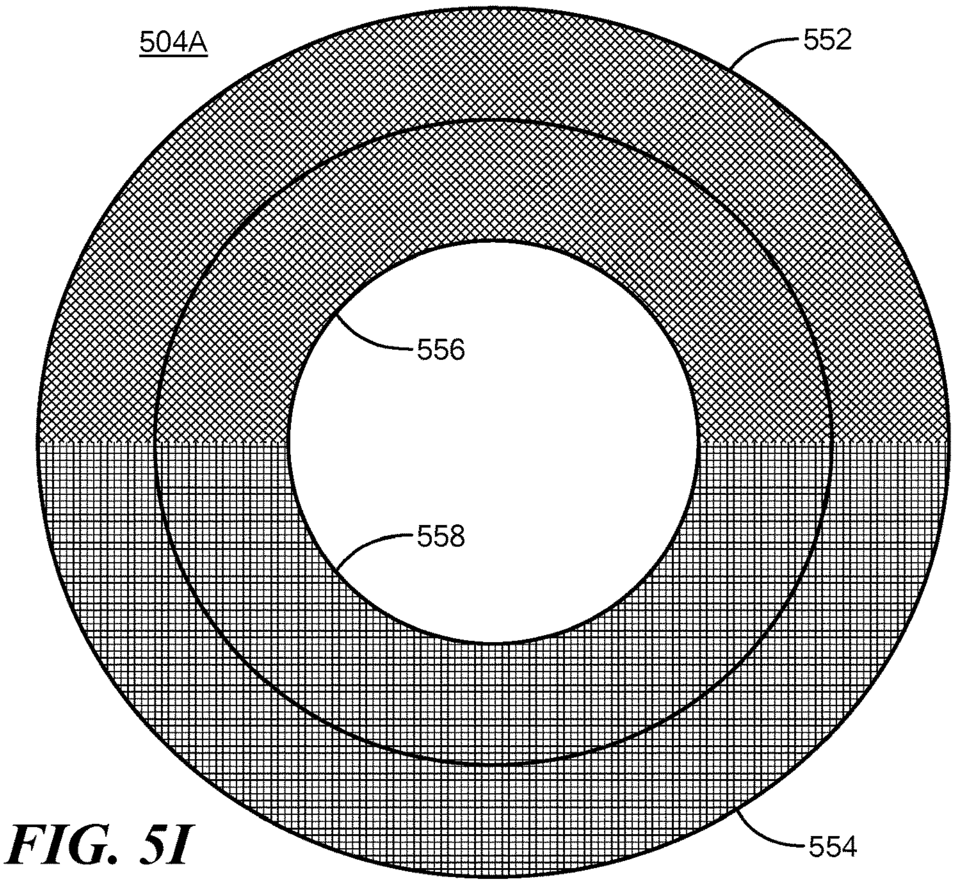
FIG. 5I is a schematic diagram of the transmitting coil of FIG. 5H, according to aspects of the disclosure.

FIG. 5I shows the polarity pattern of the transmitting coil 504A. Specifically, FIG. 5I shows that segments 552 and 556 may have a first polarity, while segments 554 and 558 have a second polarity that is opposite (or different) to the first polarity. In one aspect, FIG. 5I shows that transmitting coil 504A may have a type-1 polarity pattern. In another aspect, FIG. 5I illustrates that transmitting coil 504A may have the same polarity pattern as receiving coils 506A and 506C.

Figure 5J:
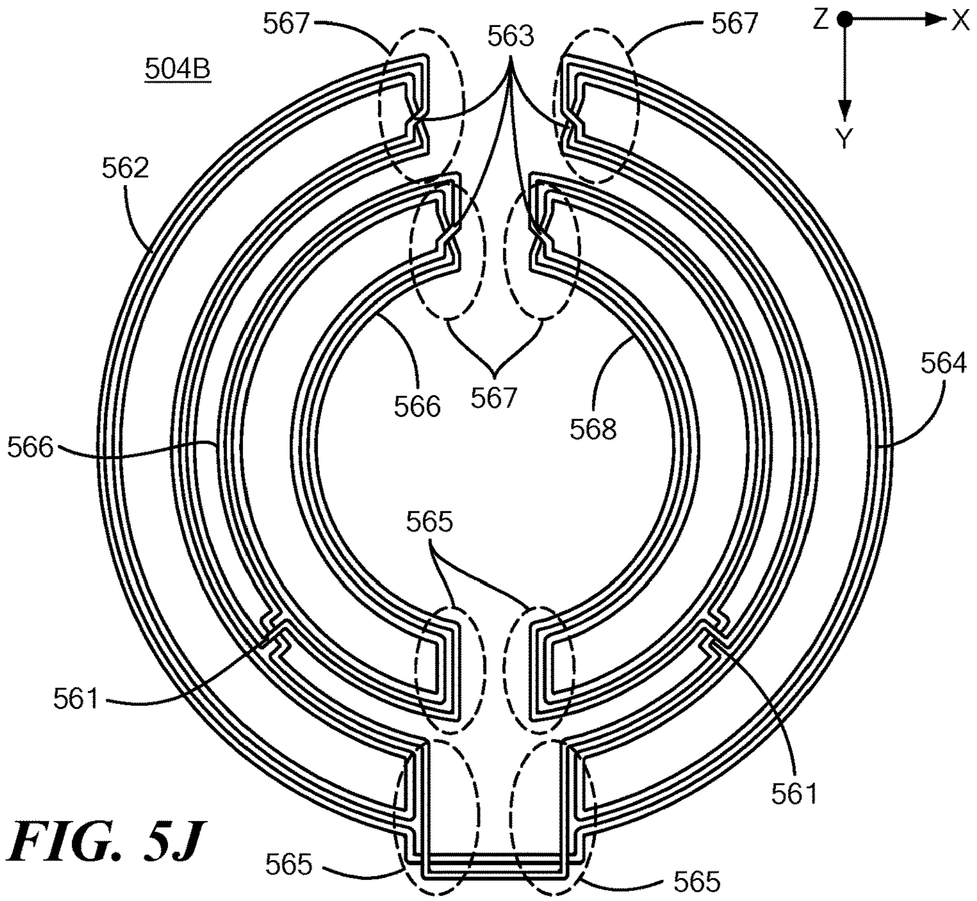
FIG. 5J is a top-down view of a transmitting coil, according to aspects of the disclosure.

FIG. 5J is a diagram of the transmitting coil 504B, according to aspects of the disclosure. Transmitting coil 504B may be identical to transmitting coil 504A, except for being rotated by 90 degrees relative to transmitting coil 504A. As illustrated, the transmitting coil 504B may include segments 562, 564, 566, and 568. Segment 562 may have ends 567 and 565, with end 567 including a cross-over 563. Segment 564 may have ends 567 and 565, with end 567 including a cross-over 563. Segment 566 may include ends 567 and 565, with end 567 including a cross-over 563. Segment 568 may include ends 567 and 565, with end 567 including a cross-over 563. According to the present example, segments 562 and 564 are concentric (or otherwise nested) with segments 566 and 568. Segments 562 and 566 may be coupled via a cross-over 561 which causes segments 562 and 566 to maintain the same polarity. Segments 564 and 568 may be coupled via a cross-over 561, which causes segments 564 and 568 to maintain the same polarity. Each of cross-overs 563 may be a location where different sections of the conductive trace (or wire) used to form transmitting coil 504B intersect without coming in electrical contact or creating a short circuit. Each of cross-overs 561 may be a location where different sections of the conductive trace (or wire) used to form transmitting coil 504B intersect without coming in electrical contact or creating a short circuit.

Figure 5K:
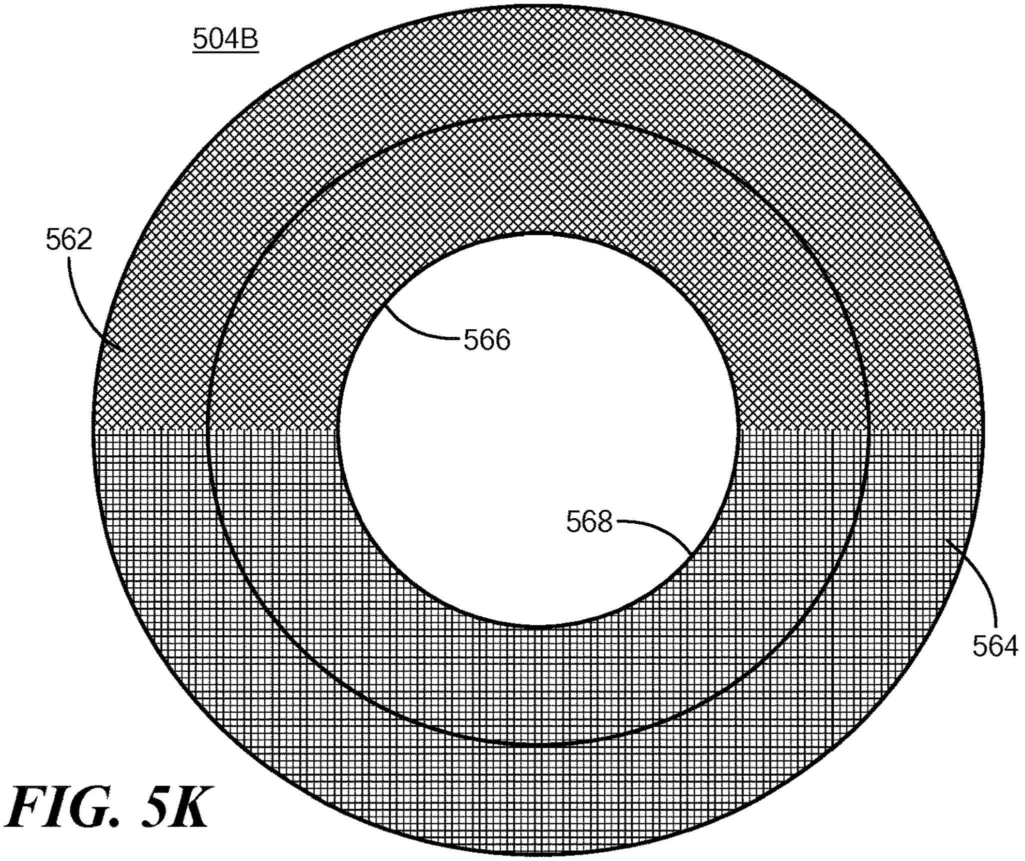
FIG. 5K is a schematic diagram of the transmitting coil of FIG. 5J, according to aspects of the disclosure.

FIG. 5K shows the polarity pattern of the transmitting coil 504B. FIG. 5K shows that transmitting coil 504B may have the same polarity as receiving coils shown in FIG. 5F.

Figure 5L:
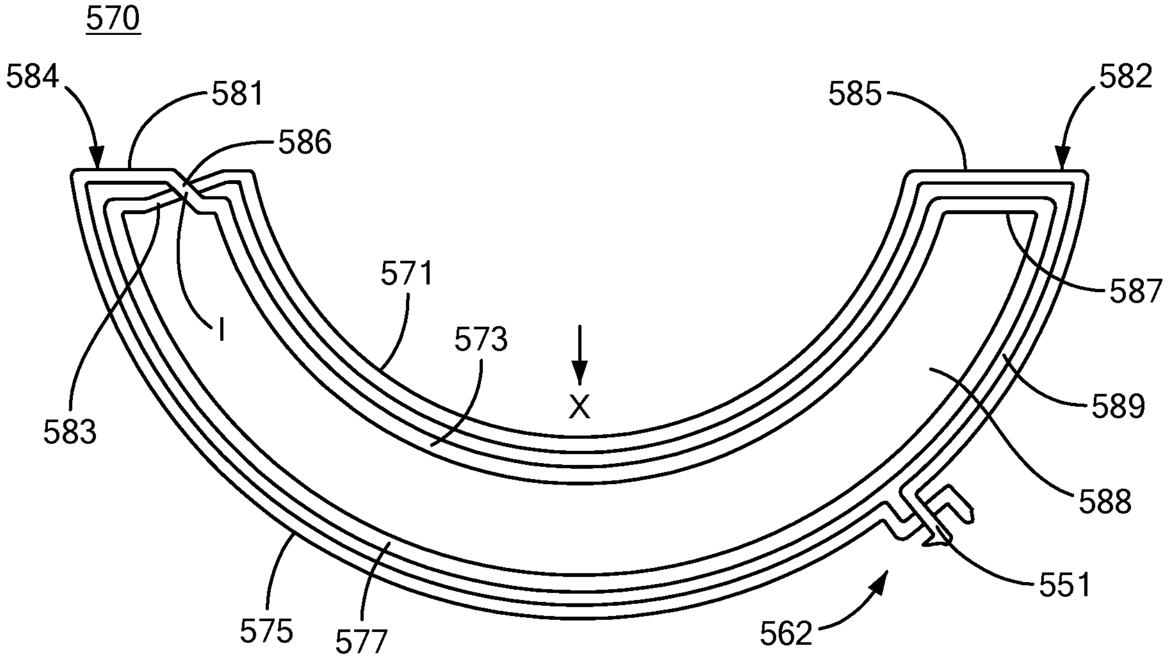
FIG. 5L is a top-down view of a transmitting coil segment, according to aspects of the disclosure.

FIG. 5L is a diagram of a transmitting coil segment 570. Transmitting coil segment 570 may be the same or similar to each of segments 552, 554, 556, 558, 562, 564, 566, and 568, which are discussed above with respect to FIGS. 5H-K. Transmitting coil segment 570 may be formed of a conductive trace (or wire) that is arranged to define the shape shown in FIG. 5L. The conductive trace (or wire) may be formed on any suitable type of substrate. The conductive trace (or wire) may include sections 571 and 573 which are arranged to run substantially in parallel with each other. The conductive trace (or wire) may further include sections 575 and 577 which are also arranged to run substantially in parallel with each other. The conductive trace (or wire) may have ends 584 and 582. End 582 may be formed of sections 585 and 587 of the conductive trace, which are arranged to run transversely to sections 577, 575, 571, and 573. End 584 may be formed of sections 581 and 583 of the conductive trace, which are arranged to run transversely to sections 577, 575, 571, and 573, and which cross over each other to form a crossover 586. According to the present example, sections 581 and 583 cross at point I. However, sections 581 and 583 may be electrically insulated at point I, in the sense that they do not form a short circuit at point I.

Figure 5M:
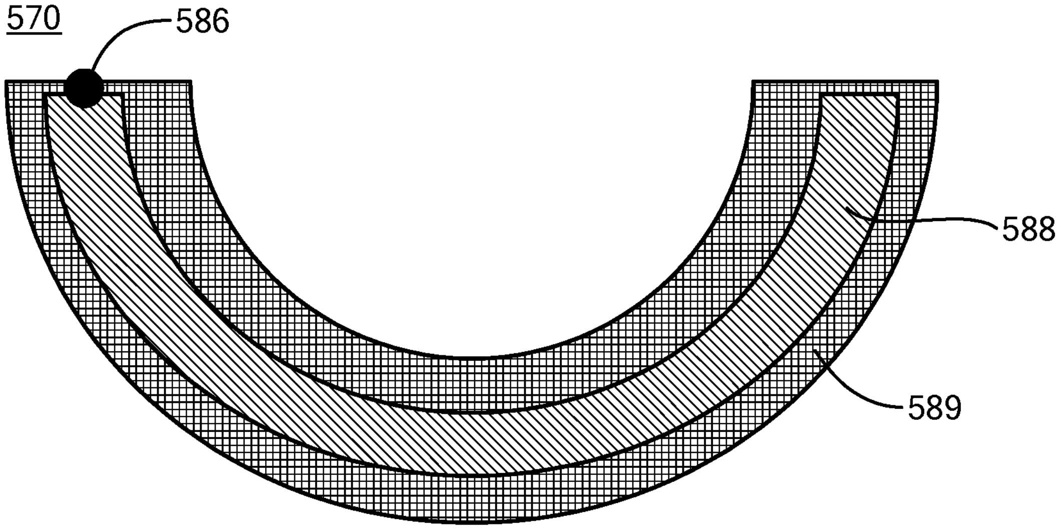
FIG. 5M is a schematic diagram of the transmitting coil segment of FIG. 5L, according to aspects of the disclosure.

According to the present example, sections 571, 573, 575, and 577 are arranged to define a pair of nested shapes. Specifically, sections 573 and 577 may be arranged to define a shape 588 and sections 571 and 575 may be arranged to define a shape 589. FIG. 5M is a schematic diagram of a transmitting coil segment 570. FIG. 5M is provided to illustrate with greater clarity the shapes 588 and 589 which are defined by the conductive trace used to form transmitting coil segment 570. FIG. 5M illustrates that shape 588 may be nested in shape 589. In the present example, the transmitting coils are two-turn coils. However, the present disclosure is not limited to any specific number of turns being present in the transmitting coils.

FIG. 5N is a planar top-down view of the assembly 500. As illustrated, the assembly 500 may include regions 591, 592, 593, and 594. Region 591 may include transition portions 536 and 546 of receiving coils 506A-B, transition portions 536 and 546 of receiving coils 506C-D, and ends 567 of segments 562, 564, 566, and 568 of transmitting coil 504B. Region 592 may include transition portions 544 of receiving coils 506B and 506D, as well as ends 555 of transmitting coil 504A. Region 593 may include transition portions 536 of receiving coils 506A and 506C, transitions 546 of receiving coils 506B and 506D, and ends 565 of segments 562, 564, 566, and 568 of transmitting coil 504B. Region 594 may include transition portions 534 of receiving coils 506A and 506C and ends 557 of segments 552, 554, 556, and 558 of transmitting coil 504A. In one respect, FIG. 5N is provided the alignment between the transitions of the receiving coils in an assembly and the ends of the segments of transmitting coils that are part of the same assembly. Specifically, FIG. 5N illustrates that in an assembly, such as the assembly 500, the ends of different transmitting coil segment may be disposed above or below the transitions between segments of the receiving coils that are part of the same assembly.

This arrangement is advantageous because it reduces the error of measurements that are taken with receiving coils 506A-D. Specifically, the transition portions 534, 536, 544, and 546 may have a smaller width or surface area than the lobes of the receiving coil segments that are connected with them (see also FIG. 6A). This property of transition portions 534, 536, 544, and 546 reduces (or ideally eliminates) the amount of signal that is picked by the receiving coils 506A-D at the locations where the transition portions are situated. Because the transition portions 534, 536, 544, and 546 are disposed directly above or below the ends of the segments of transmitting coils 504A-D, the receiving coils 506A-D would pick up a smaller amount of offset that is associated with the ends of the segments of transmitting coils 504A-D. According to the present disclosure, the ends of the segments of transmitting coils are a source of offset because they are transverse to the other sections of the segments of transmitting coils 504A-D. The offset associated with the ends of the transmitting coils 504A-D may be either emitted directly from the ends or induced in the targets 502A-B by the ends. In some implementations, the length of each of transition portions 534, 536, 544, and 546 may be equal to one-half the period of the receiving coil of which it is part.

In addition, in assembly 500, segment 532B of receiving coil 506A may be disposed directly above or directly below segment 542A of receiving coil 506B, and both segments may have the same polarity. Segment 532D of receiving coil 506A may be disposed directly above or directly below segment 542C of receiving coil 506B, and both segments may have the same polarity. On the other hand, segments 532A and 542B of receiving coils 506A-B may be disposed directly above or directly below each other and may have opposite (or different) polarities. Segments 532C and 542D of receiving coils 506A-B may be disposed directly above or directly below each other and have opposite (or different) polarities.

Receiving coils 506C-D may follow the same pattern. Specifically, segments 538B and 548A of receiving coils 506C-D may be disposed directly above or directly below each other and have the same polarity. Segments 538D and 548C of receiving coils 506C-D may be disposed directly above or directly below each other and have the same polarity. Segments 538A and 548B of receiving coils 506C-D may be disposed directly above or directly below each other and have opposite (or different) polarities. Segments 538C and 548D of receiving coils 506C-D may be disposed directly above or directly below each other and have opposite (or different) polarities. In some implementations, all or some of the receiving coils may be intertwined (or interweaved) in which case they (and their respective segments) would be situated in the same layer.

In FIGS. 5E, 5G, 5I, 5J, and 6C, sections that have the same cross-hatch pattern have the same polarity, and sections that have different cross-hatch patterns have opposite (or different) polarities. For example, in FIGS. 5E and 5G, portions 531 and portions 541 have the same cross-hatch pattern, which is intended to convey that sections 531 and 541 have the same polarity. As another example, in FIGS. 5G and 5I, sections 541 and 554 have different cross-hatch patterns, which is intended to convey that sections 541 and 554 have opposite (or different) polarities.

Under the nomenclature of the present disclosure, receiving coils that are disposed below or above each other, such as receiving coils 506A-B or receiving coils 506C-D, are referred to as "superimposed receiving coils". Similarly, receiving coil segments that are disposed directly above or directly below each other, such as segments 532B and 542A, are referred to as superimposed segments. In one aspect, FIGS. 5A-N illustrate that some superimposed sections in a pair of superimposed coils may have the same polarity, while other superimposed sections in the same pair of superimposed coils may have different polarities. This is advantageous because It decouples the two sets of coils.

Segments 552 and 554 of transmitting coil 504A, and segments 562 and 564 of transmitting coil 504B, may be disposed directly above or directly below target 502A, and they may be configured to excite target 502A. Segments 556 and 558 of transmitting coil 504A, and segments 566 and 568 of transmitting coil 504B, may be disposed directly above or directly below target 502B, and configured to excite target 502B.

The polarities of transmitting coils 504A-B may be staggered. One half of segment 552 of transmitting coil 504A may be disposed directly above or directly below segment 562 of transmitting coil 504B, with which it has the same polarity, and the other half of segment 552 may be disposed directly above or directly below segment 564 of transmitting coil 504B, with which it has opposite (or different) polarities. One half of segment 554 of transmitting coil 504A may be disposed directly above or directly below segment 562 of transmitting coil 504B, with which it has opposite (or different) polarities, and the other half of segment 554 may be disposed directly above or directly below segment 564 of transmitting coil 504B, with which it has the same polarity. One half of segment 556 of transmitting coil 504A may be disposed directly above or directly below segment 566 of transmitting coil 504B, with which it has the same polarity, and the other half of segment 556 may be disposed directly above or directly below segment 568 of transmitting coil 504B, with which it has opposite (or different) polarities. One half of segment 558 of transmitting coil 504A may be disposed directly above or directly below segment 566 of transmitting coil 504B, with which it has opposite (or different) polarities, and the other half of segment 558 may be disposed directly above or directly below segment 568 of transmitting coil 504B, with which it has the same polarity. As used herein, the phrase "one half of a segment of a transmitting coil" means "one half of the surface area of the transmitting coil". As is discussed further below with respect to FIGS. 6I-J, the surface area of a transmitting coil segments may be the area that is enclosed inside the perimeter of the transmitting coil segment.

Under the nomenclature of the present disclosure, different sections of transmitting coils 504A-B that are situated directly above or directly below each other are referred to as "superimposed" transmitting coil sections, and transmitting coils 504A-B are referred to as superimposed transmitting coils. In this regard, FIGS. 5A-K indicates that, in a pair of superimposed transmitting coils, some superimposed transmitting coil sections may have the same polarity, while other superimposed transmitting coil sections may have opposite (or different) polarities. In some implementations, any two transmitting coil sections that are superimposed may have the same surface area. In the present example, the term "transmitting coil section" refers to a portion of a transmitting coil segment (e.g., see transmitting coil segments 552-558 and 562-568). However, alternative implementations are possible in which a transmitting coil section includes an entire transmitting coil segment.

This arrangement is advantageous because it increases the accuracy of measurements taken by using the transmitting coils 504A-B. Specifically, transmitting coils 504A-B may be used in a redundant system, such as any of the systems shown in FIGS. 7A-C. The idea of using both transmitting coils 504A-B in the same system is for one of the coils 504A-B to serve as a backup in the event of a failure of the other one of the coils 504A-B. However, if one of the transmitting coils 504A-B fails, the other one of transmitting coils 504A-B may begin driving the failed transmitting coil (due to inductive coupling), which in turn would reduce the amount of energy that is put by the working transmitting coil into the targets 502A-B, which in turn would reduce the magnetic flux density of the reflected magnetic fields produced by targets 502A-B, which in turn would decrease the signal-to-noise ratio of the signal that is generated by the receiving coils 506A-D. In this regard, superimposing transmitting coil sections of opposite (or different) polarities prevents one of the transmitting coils 504A-B from driving the other in the event of failure, which in turn helps increase the accuracy of measurements that are taken with transmitting coils 504A-B and/or receiving coils 506A-D. In other words, superimposing transmitting coil sections of opposite (or different) polarities reduces the mutual inductance that is exerted by the failed transmitting coil on the transmitting coil that remains functional. As the correlation operation between coil polarity is null, the coupling factor between these coils is null too, so the two transmission coils may be "isolated" from one another.

In the example of FIGS. 5A-K: (i) receiving coils 506A and 506C have a type-1 polarity pattern (shown in FIG. 5E), (ii) receiving coils 506B and 506D have a type-1 polarity pattern; (iii) transmitting coil 504A has a type-1 polarity pattern (shown in FIG. 5I), and (iv) transmitting coil 504B has a type-1 polarity pattern that is rotated by 90 degrees (shown in FIG. 5K). However, an alternative implementation is possible in which: (i) receiving coils 506A and 506C have a type-2 polarity pattern, (ii) receiving coils 506B and 506D have a type-2 polarity pattern that is rotated by 90 degrees relative to the polarity pattern of receiving coils 506; (iii) transmitting coil 504A has a type-2 polarity pattern, and (iv) transmitting coil 504B has a type-2 polarity pattern that is rotated by 90 degrees relative to the polarity pattern of transmitting coil 504A. An example of a type-2 polarity pattern of a transmitting coil is discussed further below with respect to FIG. 6C. When a switch is made from the type-1 polarity pattern to the type-2 polarity pattern, the same coil portions/sections would remain superimposed, but their relative polarities would change.

In some implementations, receiving coils 502A-B may be duplicated or quadrupled for increased redundancy. Similarly, in some implementations, receiving coils 502A-B may be duplicated and phase shifted or quadrupled for increased redundancy (E.g., see FIGS. 7A-C).

FIG. 6A shows an example of receiving coil segments 601 and 604. Segment 601 may have a sinusoidal shape. Segment 601 may be the same or similar to any of receiving coil segments 532A-D and 538A-D, which are discussed above with respect to FIGS. 5D-E. Receiving coil segment 601 may include a plurality of lobes 602. Segment 601 may include respective transition portions 603 that are formed at the ends of segment 601. Although, in the example of FIG. 6A, both ends of segment 601 are coupled to a transition portion 603, alternative implementations are possible in which only one of the ends of segment 602 has a transition portion 603 attached to it. Each transition portion 603 may be the same or similar to one of transition portions 536 and 534, which are discussed above with respect to FIG. 5D. In one aspect, FIG. 6A is provided to illustrate that the lobes 602 may have a greater width (or greater surface area) than the transitions portion 603. It will be understood that segment 601 may include any number of lobes 602. The surface area of a lobe or an end-lobe may be the space that is enclosed between the conductive trace/wire sections that form the lobe or end-lobe. The surface area of a transition portion may be the space that is enclosed between the conductive trace/wire sections that form the transition portion.

Segment 604 may have a co-sinusoidal shape. Segment 604 may be the same or similar to any of receiving coil segments 542A-D and 548A-D, which are discussed above with respect to FIGS. 5F-G. Receiving coil segment 604 may include a plurality of lobes 602, as well as end-lobes 606. Each of end-lobes 606 may have the same shape and dimensions as one-half (or another fraction) of one lobe 602. In addition, segment 604 may include respective transition portions 607 that are coupled to the end-lobes 606 of segment 604. Although, in the example of FIG. 6A, both end-lobes 606 of segment 604 are coupled to a transition portion 607, alternative implementations are possible in which only one of the end-lobes 606 is coupled to a transition portion 607. Each transition portion 607 may be the same or similar to one of transition portions 546 and 544, which are discussed above with respect to FIG. 5F. In one aspect, FIG. 6A is provided to illustrate that lobes 602 and end-lobes 606 may have a greater width (or greater surface area) than transition portions 607. In another aspect, FIG. 6A is provided that a receiving coil segment with a sinusoidal shape will differ from a receiving coil segment that has a co-sinusoidal shape in that the one of the receiving coil segments would have half-lobes at it its ends, and the other would not.

Figure 6B:
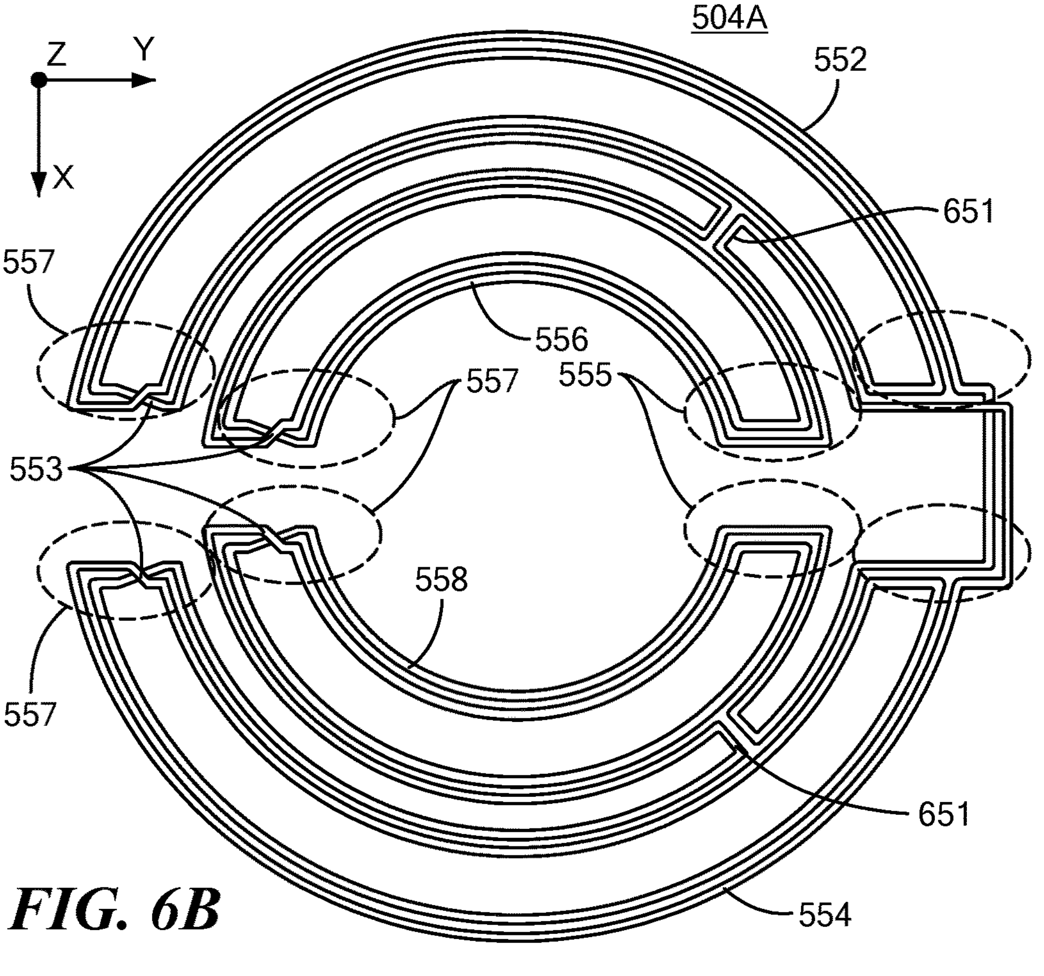
FIG. 6B is a top-down view of a transmitting coil, according to aspects of the disclosure.

FIG. 6B shows an example of transmitting coil 504A, in accordance with another implementation. In the example of FIG. 6B, the cross-overs 551 are replaced with links 651. Specifically, in the example of FIG. 6B, segments 554 and 558 are coupled via a link 651, and segments 552 and 556 are also coupled via a link 651. Unlike the cross-overs 551, in links 651, different sections of the conductive trace/wire that is used to form the transmitting coil 504A do not go over each other, and cause the segments being linked to have opposite polarities (e.g., by switching the direction in which electrical current flows through one of the linked segments relative to the direction of current flow in the other one of the linked segments).

Figure 6C:
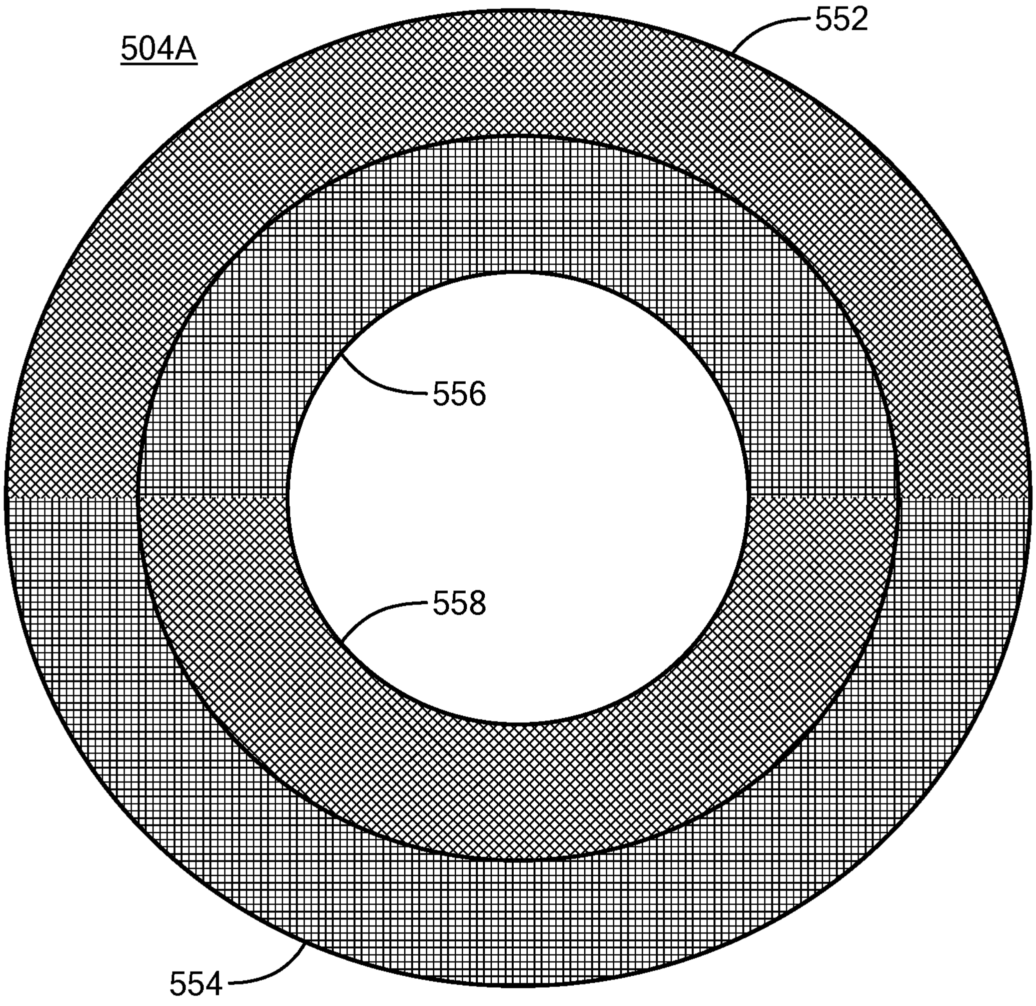
FIG. 6C is a schematic diagram of the transmitting coil of FIG. 5B, according to aspects of the disclosure.

FIG. 6C shows the polarity pattern of transmitting coil 504A, when transmitting coil 504A is configured in the manner shown in FIG. 6B. As illustrated, in the example of FIG. 6C, segments 552 and 556 may have opposite polarities, and segments 558 and 554 may also have opposite polarities. This is in contrast to the polarity pattern shown in FIG. 5I, where adjacent transmitting coil portions have the same polarity. As noted above, the polarity pattern shown in FIG. 6C is referred to as a "type-2 polarity pattern". FIG. 6C is provided to illustrate that the use of links 651, in place of cross-overs 551, to connect adjacent segments of a transmitting coil results in the connected segments having opposite polarities.

Figure 6E:
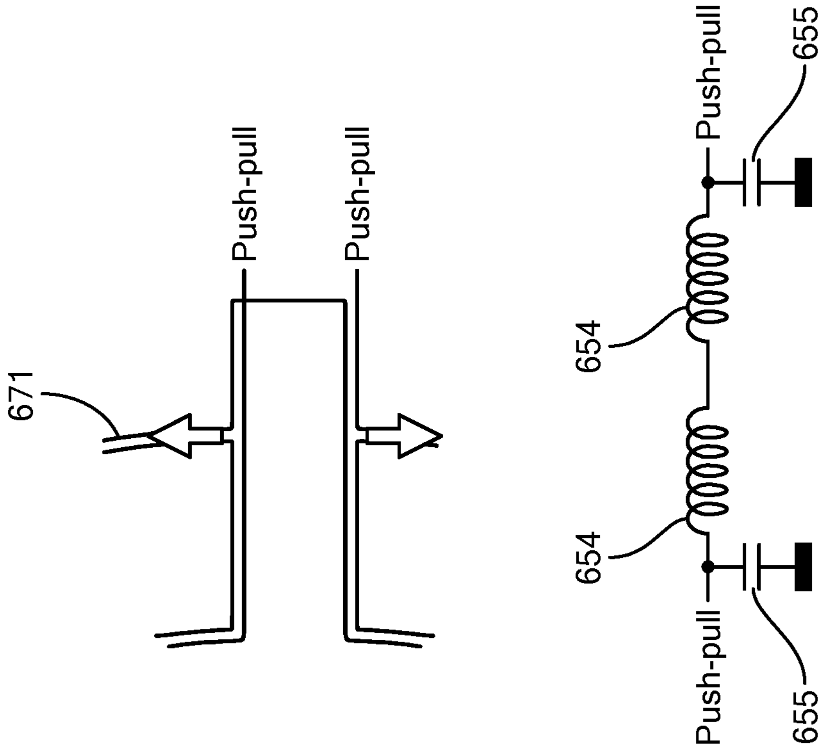
FIG. 6E is a diagram illustrating a method for driving a transmitting coil, according to aspects of the disclosure.
Figure 6D:
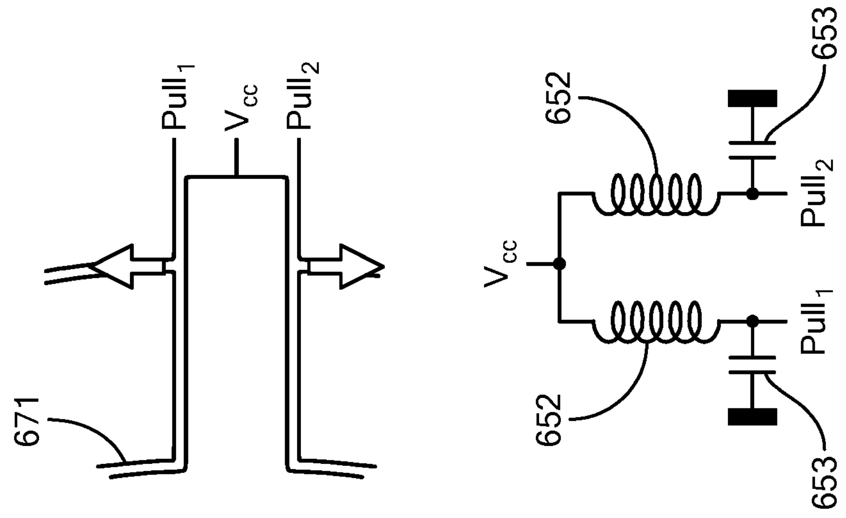
FIG. 6D is a diagram illustrating a method for driving a transmitting coil, according to aspects of the disclosure.

FIG. 6D shows an example of a pull-pull configuration for driving a transmitting coil 671, according to aspects of the disclosure. Transmitting coil 671 may be the same or similar to any of the transmitting coils 504A-B. As illustrated, in a pull-pull configuration, the transmitting coil 671 may be driven with a voltage source Vcc that is coupled in series with a pair of solenoids 652, and a pair of capacitors 653. FIG. 6E shows an example of a push-pull configuration for driving the transmitting coil 671. In the push-pull configuration, the transmitting coil 671 may be powered by using solenoids 654 that are coupled in series in each other, and respective capacitors 655, as shown. In the transmitting coil configuration shown in FIG. 6D, the transmitting coil is powered by a driving circuit coupled to the points labeled "Pull1, Pull2". A voltage source Vcc sets the common-mode voltage of the transmitting coil. The driving circuit alternates between pulling a current from "Pull1" or "Pull2" at the oscillation frequency. In the "Push-pull" configuration shown in FIG. 6E, the transmitting coil is powered by a driving circuit coupled to the points labeled "Push-pull". The driving circuit sets the common mode voltage of the transmitting coil and provides either a voltage or a current at the oscillation frequency between the two "Push-pull" points. When the driving circuit has a current output, capacitors 653, 655 are commonly added in series with the transmitting coil to form a resonant LC network. This resonance reduces the driving current needed to sustain a given oscillation voltage magnitude across the transmitting coil.

Figure 6F:
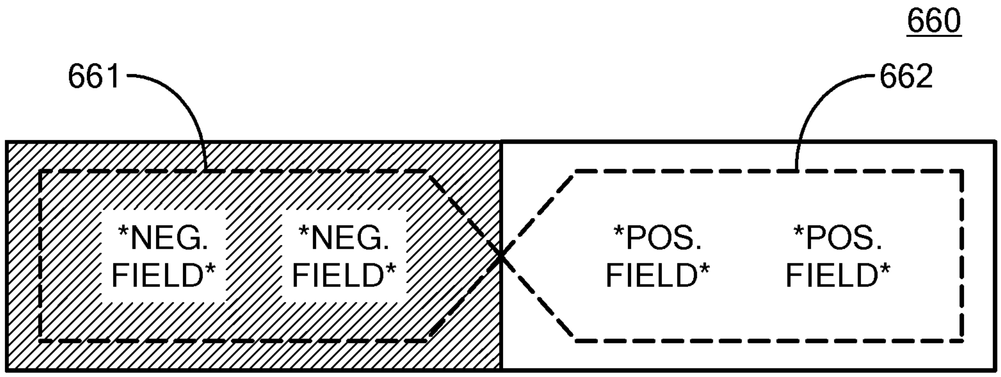
FIG. 6F is a diagram of an example of a transmitting coil, according to aspects of the disclosure.

FIG. 6F is a diagram of an example of a transmitting coil 660, according to aspects of the disclosure. According to the present example, transmitting coil 660 has a square shape. According to the present example, transmitting coil 660 includes lobes 661 and 662. According to the present example, lobe 661 may have a first polarity and may be arranged to generate a negative magnetic field. The lobe 662 may have a second polarity that is opposite to the first polarity and may be arranged to generate a positive magnetic field.

Figure 6G:
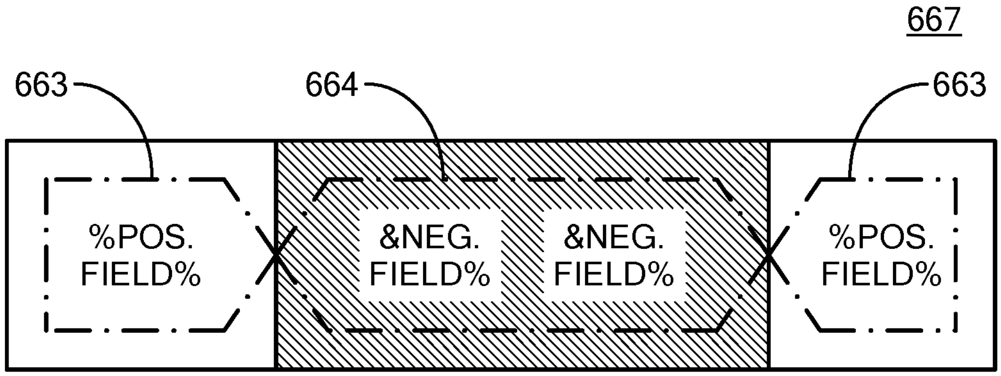
FIG. 6G is a diagram of an example of a transmitting coil, according to aspects of the disclosure.

FIG. 6G is a diagram of an example of a transmitting coil 667. According to the present example, transmitting coil 667 has a phase shifted square shape. According to the present example, transmitting coil 667 includes lobes 663 and 664. Lobes 663 may have the second polarity, and may be arranged to generate a positive magnetic field. Lobe 664 may have the first polarity, and may be arranged to generate a negative magnetic field. According to the present example, each of the transmitting coils 660 and 667 is formed by a conductive trace (or another type of wire) that is arranged to wind its way into a plurality of lobes. However, it will be understood that the present disclosure is not limited to any specific implementation of transmitting coils 660 and 667.

Figure 6H:
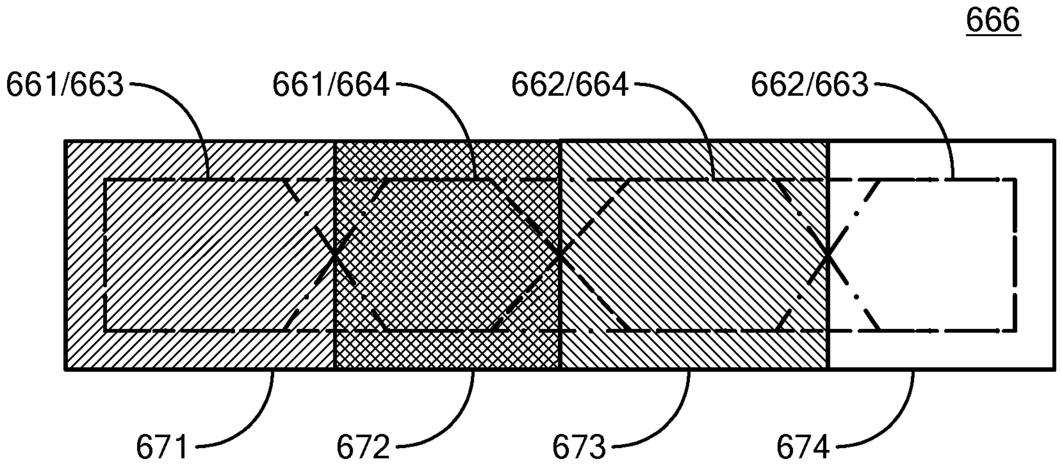
FIG. 6H is a diagram of an example of a transmitting coil assembly, according to aspects of the disclosure.

FIG. 6H shows an example of a transmitting coil assembly 666 that is formed by placing one of transmitting coils 660 and 667 over the other. As illustrated, transmitting coil assembly 666 may include sections 671-674. Section 671 may include one half of lobe 661 and one of lobes 663, with both of them having the same (or similar) surface area. Section 672 may include the other half of lobe 661 and one half of lobe 664, with both of them having the same (or similar) surface area. Section 673 may include one half of lobe 662 and the other half of lobe 664, with both of them having the same (or similar surface area. Section 674 may include the other half of lobe 662 and the other one of lobes 663, with both of them having the same or similar surface area.

Figure 6I:
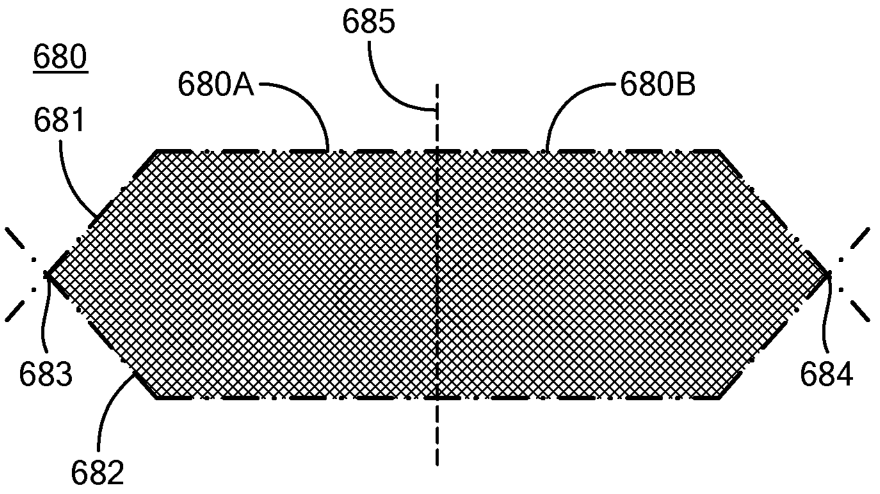
FIG. 6I is a diagram of an example of a transmitting coil lobe, according to aspects of the disclosure.

FIG. 6I shows an example of a lobe 680, according to aspects of the disclosure. Lobe 680 may be the same or similar to lobe 664, which is shown in FIG. 6G. Lobe 680 may be formed by conductive trace sections 681 and 682, which intersect (without coming into electrical contact or forming a short circuit at the intersection) at crossovers 683 and 684. Under the nomenclature of the present disclosure, the area that is surrounded (or at least partially enclosed) by the wire sections(s) that form a lobe is referred to as "the surface area of the lobe". In another aspect, lobe 652 is dissected by line 685 into sections 680A and 680B. The surface area of section 680A is the portion of the surface area of lobe 680 that sits to the left of line 685 (i.e., closer to crossover 683 than crossover 684). The surface area of section 680B is the portion of the surface area of lobe 680 that sits to the right of line 685 (i.e., closer to crossover 684 than crossover 683).

Figure 6J:
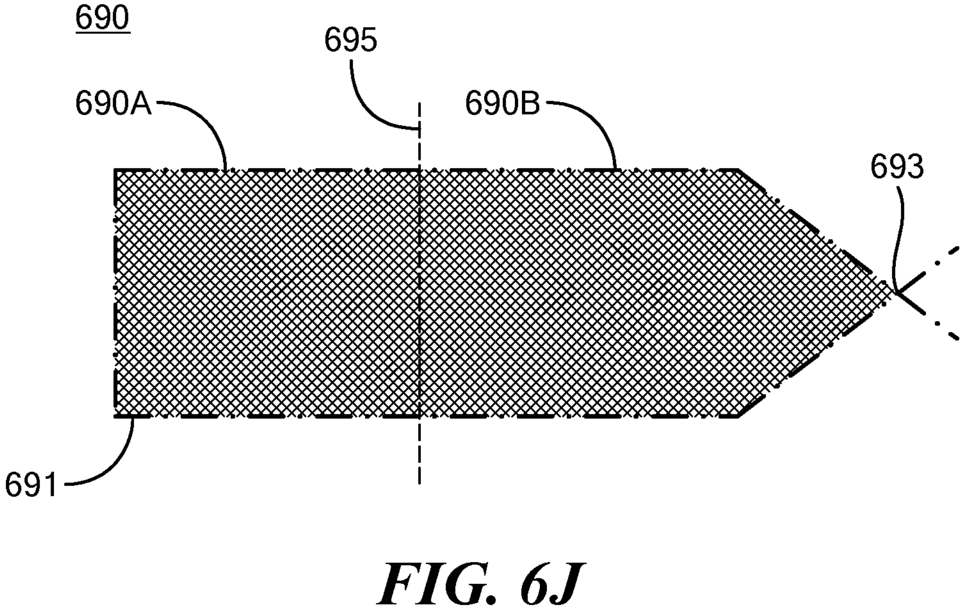
FIG. 6J is a diagram of an example of a transmitting coil lobe, according to aspects of the disclosure.

FIG. 6J shows an example of a lobe 690, according to aspects of the disclosure. The lobe 690 may be formed by winding a conductive trace section 691 into a loop. The ends of section 691 may intersect (without coming into electrical contact or forming a short circuit) at a crossover 693. In FIG. 6J, the surface area of lobe 690 is shown in cross-hatch. The lobe 690 is intersected by line 695 into sections 690A and 690B. The surface area of section 690A is the portion of the surface area of lobe 690 that sits to the left of line 695 (i.e., further away from crossover 693). The surface area of section 690B is the portion of the surface area of lobe 690 that sits to the right of line 685 (i.e., closer to crossover 693).

Figure 6L:
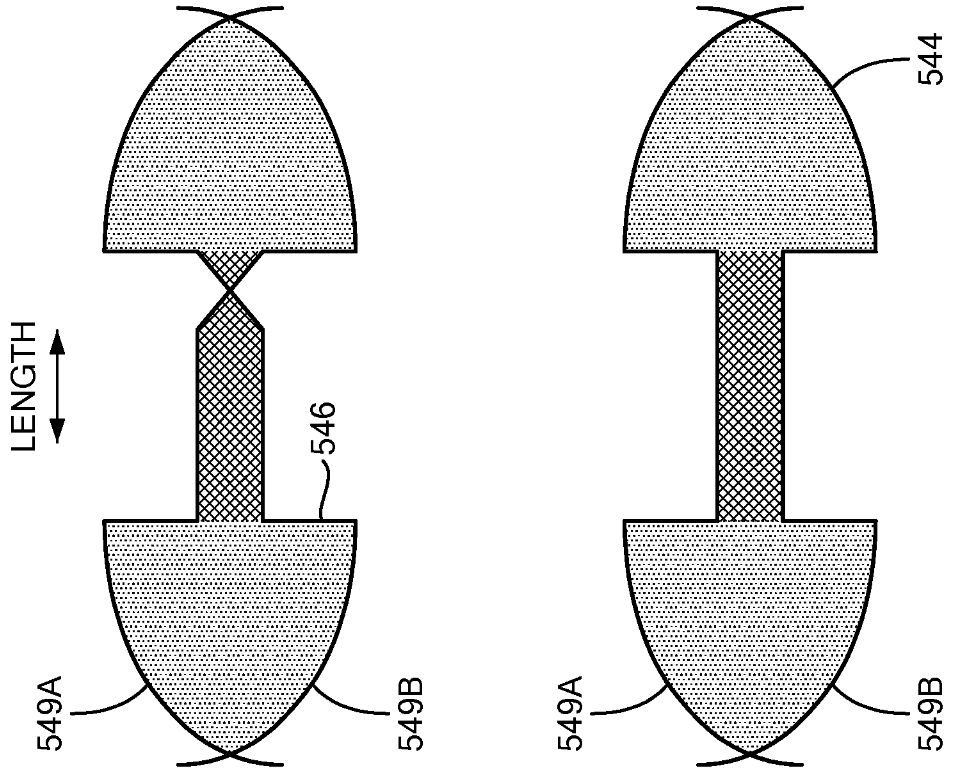
FIG. 6L is a diagram of an example of a set of transition portions, according to aspects of the disclosure.
Figure 6K:
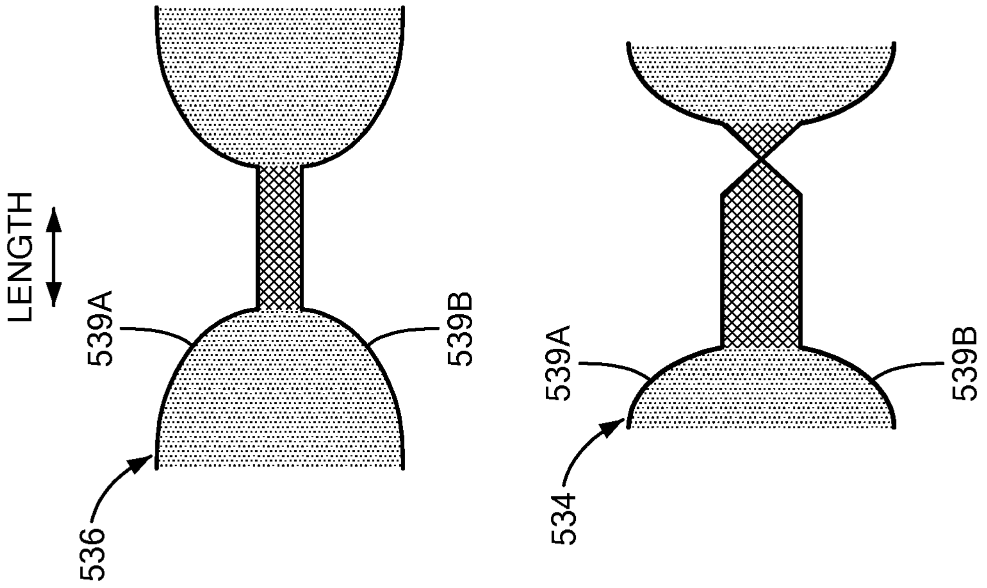
FIG. 6K is a diagram of an example of a set of transition portions, according to aspects of the disclosure.

FIG. 6K shows transition portions 534 and 536 in further detail. The surface area of transition portions 534 and 536 is denoted with cross-hatch, whereas portions of the surface area of lobes (of different receiving coil segments) that are connected by transition portions 534 and 536 are denoted using dotted fill. FIG. 6K is provided to illustrate that the surface area of a transition portions 536 and 534 may be the area that is at least partially enclosed by the conductive trace/wire sections 539A-B that form the transition portion.

FIG. 6L shows transition portions 544 and 546 in further detail. The surface area of transition portions 544 and 546 is denoted with cross-hatch, whereas portions of the surface area of lobes (of different receiving coil segments) that are connected by transition portions 544 and 546 are denoted using dotted fill. FIG. 6L is provided to illustrate that the surface area of a transition portions 546 and 544 may be the area that is at least partially enclosed by the conductive trace/wire sections 549A-B that form the transition portion.

FIG. 6M-R illustrate in further detail some of the design principles behind the assembly 500, which is discussed above with respect to FIGS. 5A-N.

FIGS. 6M-R show schematic diagrams of a primary transmitting coil 612 and a redundant transmitting coil 614. Transmitting coil 612 may include segments 617 and 618 that are coupled by a transition 619. Segment 617 may have a first polarity and segment 618 may have a second polarity that is opposite to the first polarity. Transmitting coil 614 may include segments 621A, 622, and 621B that are coupled by transitions 624 and 623. Segment 622 may have the first polarity and segments 621A-B may have the second polarity.

Figure 6M:
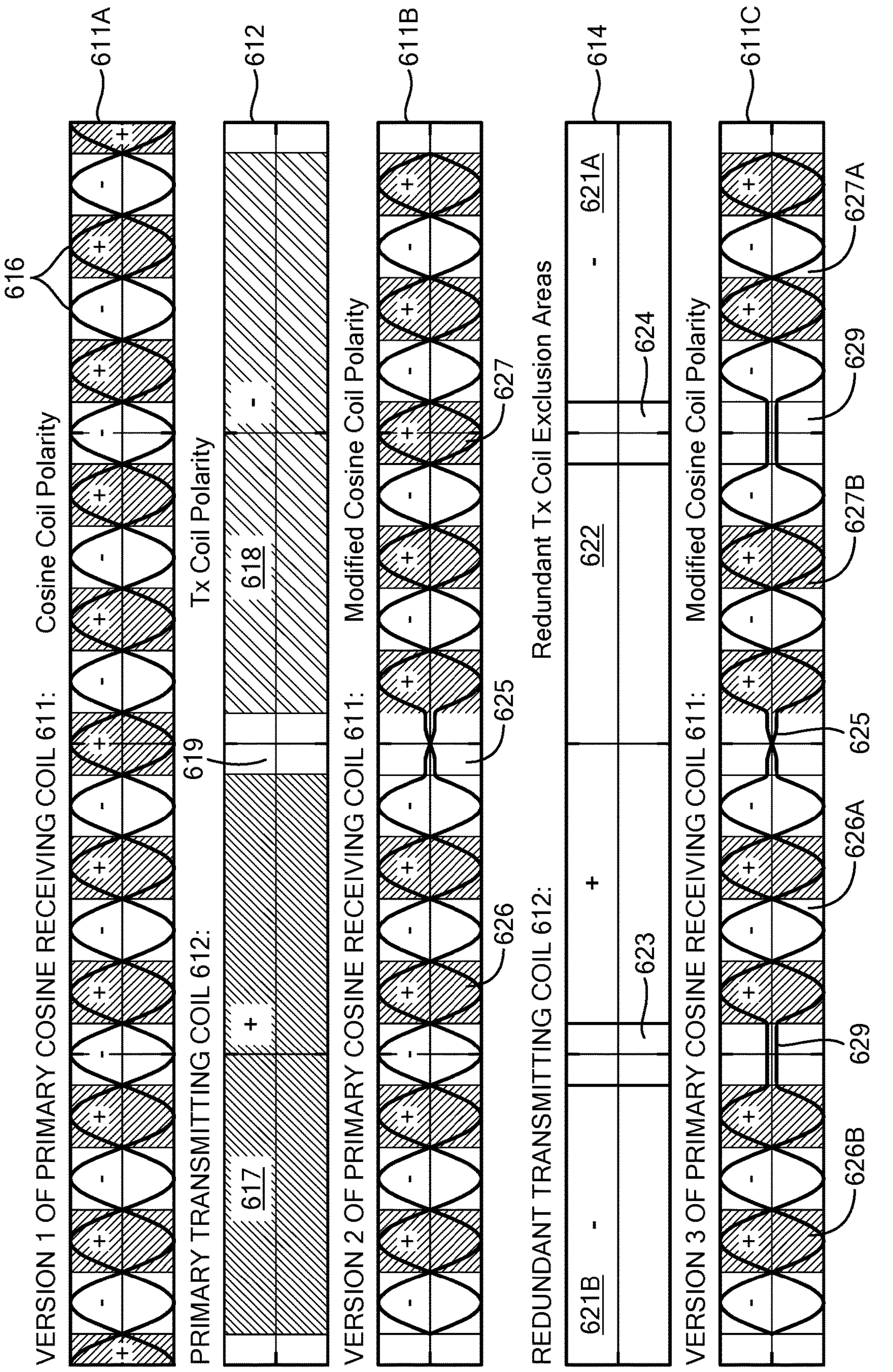
FIG. 6M is a diagram illustrating aspects of a coil assembly, according to aspects of the disclosure.

FIG. 6M further shows examples of different implementations of a primary receiving coil 611. In the present example, transmitting coil 611 has a co-sinusoidal polarity (or co-sinusoidal shape). Plot 611A shows an implementation of transmitting coil 611 in which transmitting coil 611 has a uniform polarity. Plot 611B shows an implementation of the receiving coil 611 in which the receiving coil includes a segments 626 and 627, wherein segment 626 has a first polarity and segment 627 has a second polarity that is opposite to the first polarity. Segments 626 and 627 are coupled to one another by a transition 625. Plot 611C shows an implementation of the receiving coil 611 in which receiving coil 611 is divided into segments 626A, 626B, 627A, and 627B. Segment 626B has the second polarity, segment 626A has the first polarity, segment 627B has the first polarity, and segment 627A has the second polarity. Segments 626B and 626A may be coupled by a transition 629, segments 626A and 627B may be coupled by a transition 625, and segments 627B and 627A may be coupled by another transition 629.

Figure 6N:
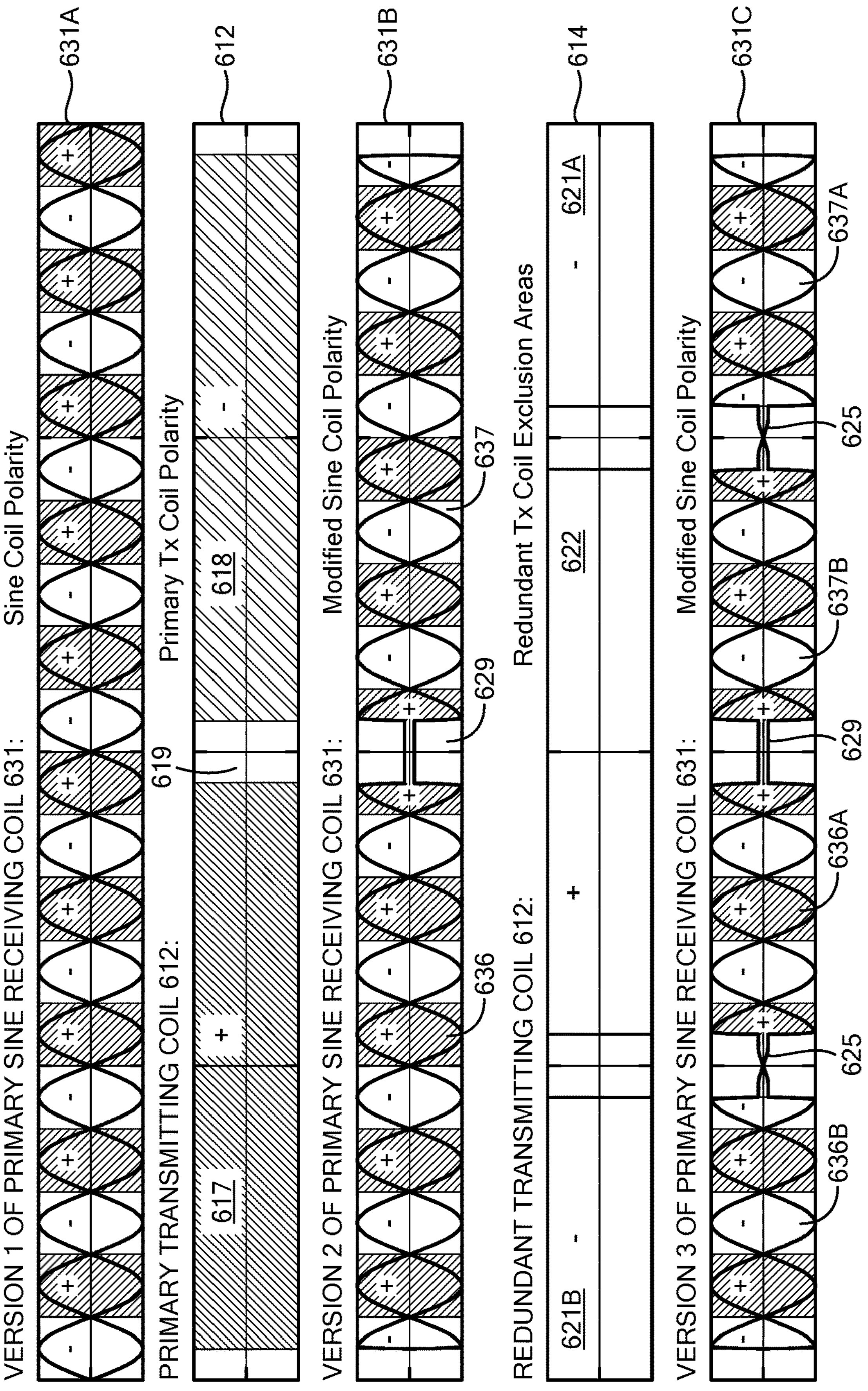
FIG. 6N is a diagram illustrating aspects of a coil assembly, according to aspects of the disclosure.

FIG. 6N shows examples of different implementations of a primary receiving coil 631. In the present example, transmitting coil 631 has a sinusoidal polarity (or sinusoidal shape). Plot 631A shows an implementation of transmitting coil 631 in which transmitting coil 631 has a uniform polarity. Plot 631B shows an implementation of the receiving coil 631 in which the receiving coil includes segments 636 and 637, wherein segment 636 has the first polarity and segment 637 has the second polarity. Segments 636 and 637 are coupled to one another by a transition 629. Plot 631C shows an implementation of the receiving coil 631 in which receiving coil 631 is divided into segments 636A, 636B, 637A, and 637B. Segment 636B has the second polarity, segment 636A has the first polarity, segment 637B has the first polarity, and segment 637A has the second polarity. Segments 636B and 636A may be coupled by a transition 625, segments 636A and 637B may be coupled by a transition 629, and segments 637B and 637A may be coupled by a transition 625.

Figure 6O:
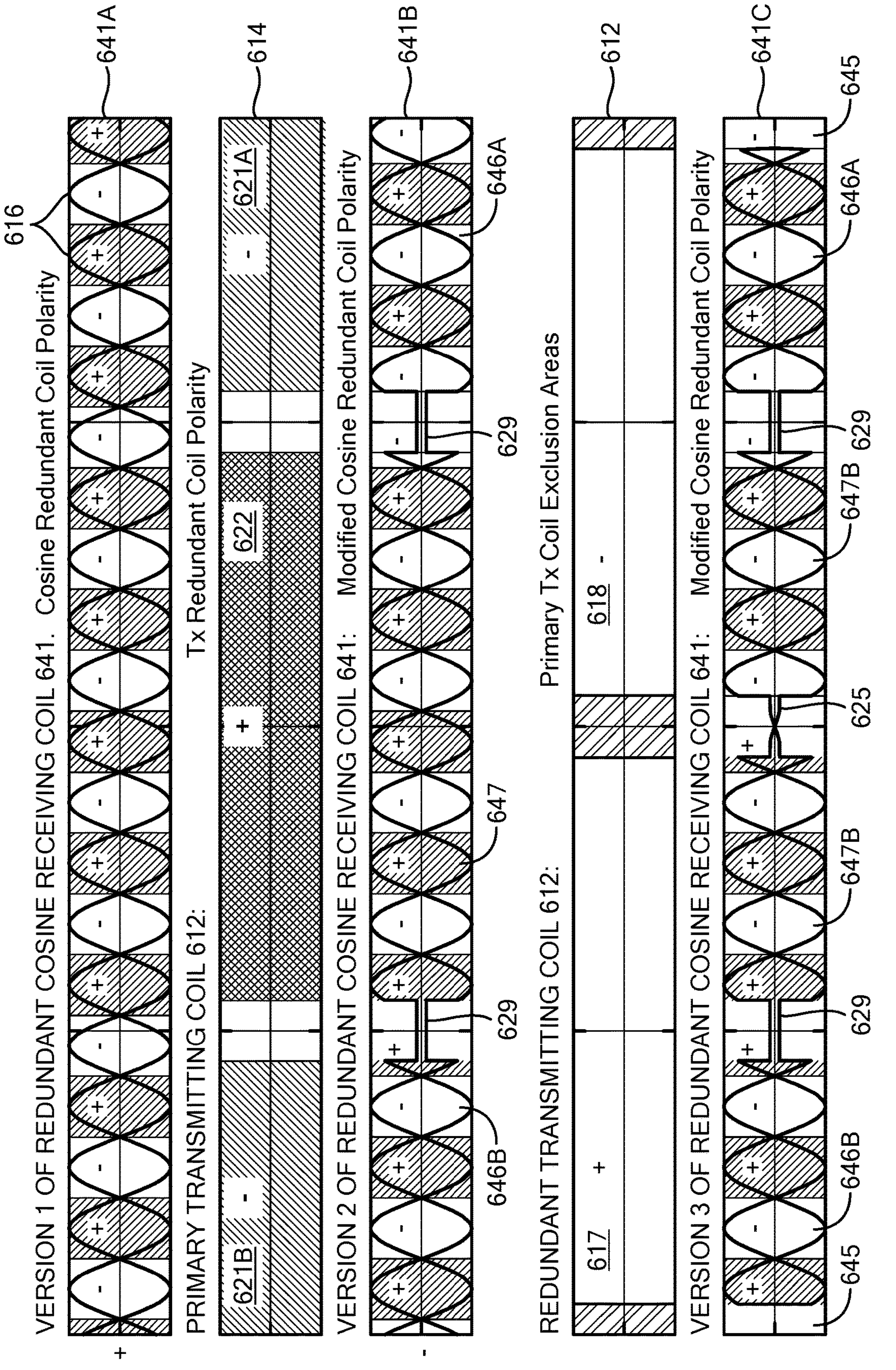
FIG. 6O is a diagram illustrating aspects of a coil assembly, according to aspects of the disclosure.

FIG. 6O shows examples of different implementations of a redundant receiving coil 641. In the present example, transmitting coil 641 has a co-sinusoidal polarity (or co-sinusoidal shape). Plot 641A shows an implementation of transmitting coil 641 in which transmitting coil 641 has a uniform polarity. Plot 641B shows an implementation of the receiving coil 641 in which the receiving coil includes segments 646A, 647, and 646B, wherein segments 646A and 646B have the second polarity and segment 647 has the first polarity. Segments 646A and 647 are coupled via a transition 629 and segments 647 and 646B are coupled via another transition 629. Plot 641C shows an implementation of the receiving coil 641 in which receiving coil 641 is divided into segments 646A, 646B, 647A, and 647B. Segments 646A and 646B have the second polarity and segments 647A and 647B have the first polarity.

Figure 6P:
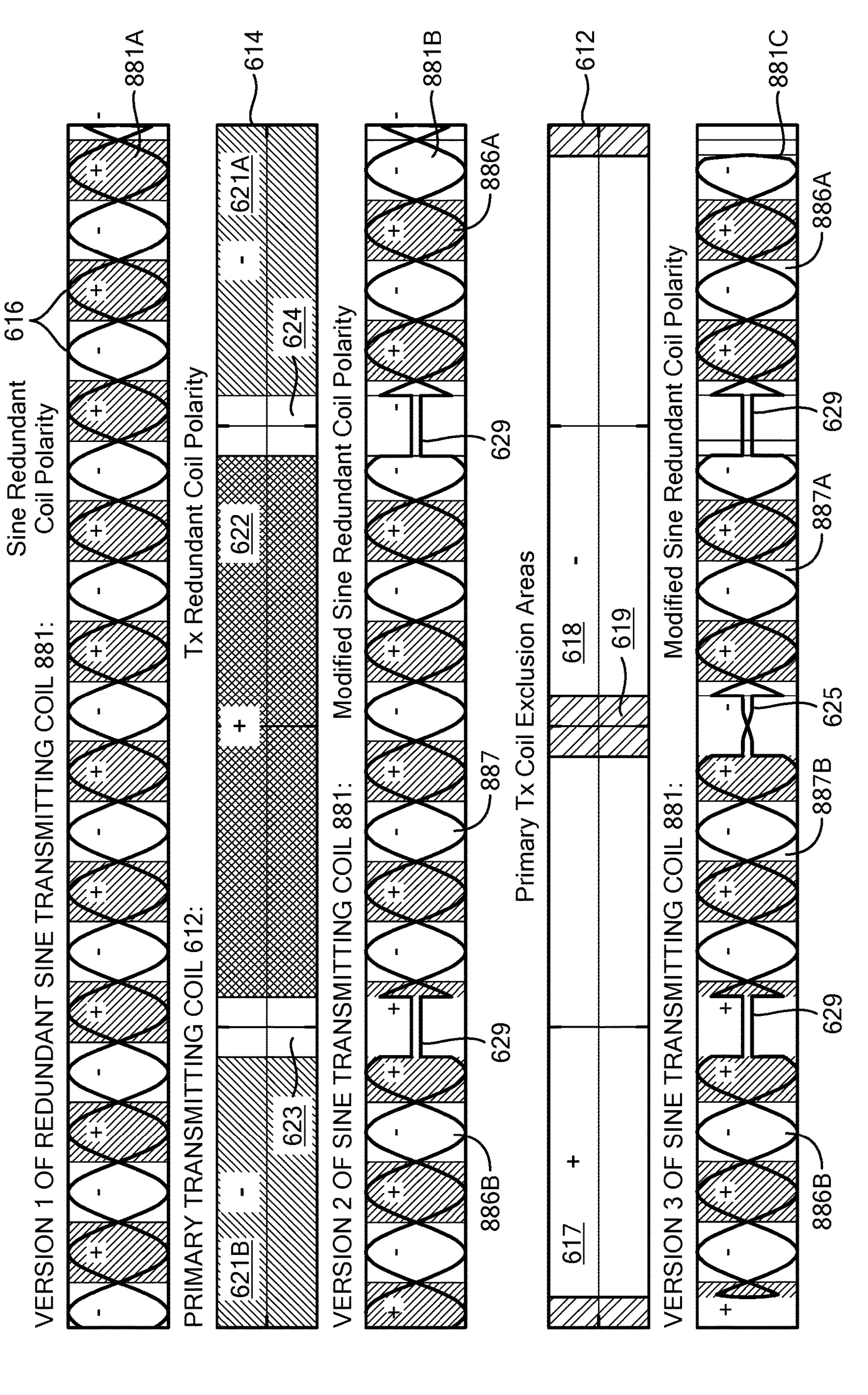
FIG. 6P is a diagram illustrating aspects of a coil assembly, according to aspects of the disclosure.

FIG. 6P shows examples of different implementations of a redundant receiving coil 881. In the present example, transmitting coil 881 has a sinusoidal polarity (or sinusoidal shape). Plot 881A shows an implementation of transmitting coil 881 in which transmitting coil 881 has a uniform polarity. Plot 881B shows an implementation of the receiving coil 881 in which the receiving coil includes segments 886A, 647, and 646B, wherein segments 646A and 646B have the second polarity and segment 887 has the first polarity. Segments 886A and 887 are coupled via a transition 629 and segments 887 and 886B are coupled via another transition 629. Plot 881C shows an implementation of the receiving coil 881 in which receiving coil 881 is divided into segments 886A, 886B, 887A, and 887B. Segments 886A and 886B have the second polarity and segments 887A and 887B have the first polarity.

Figure 6Q:
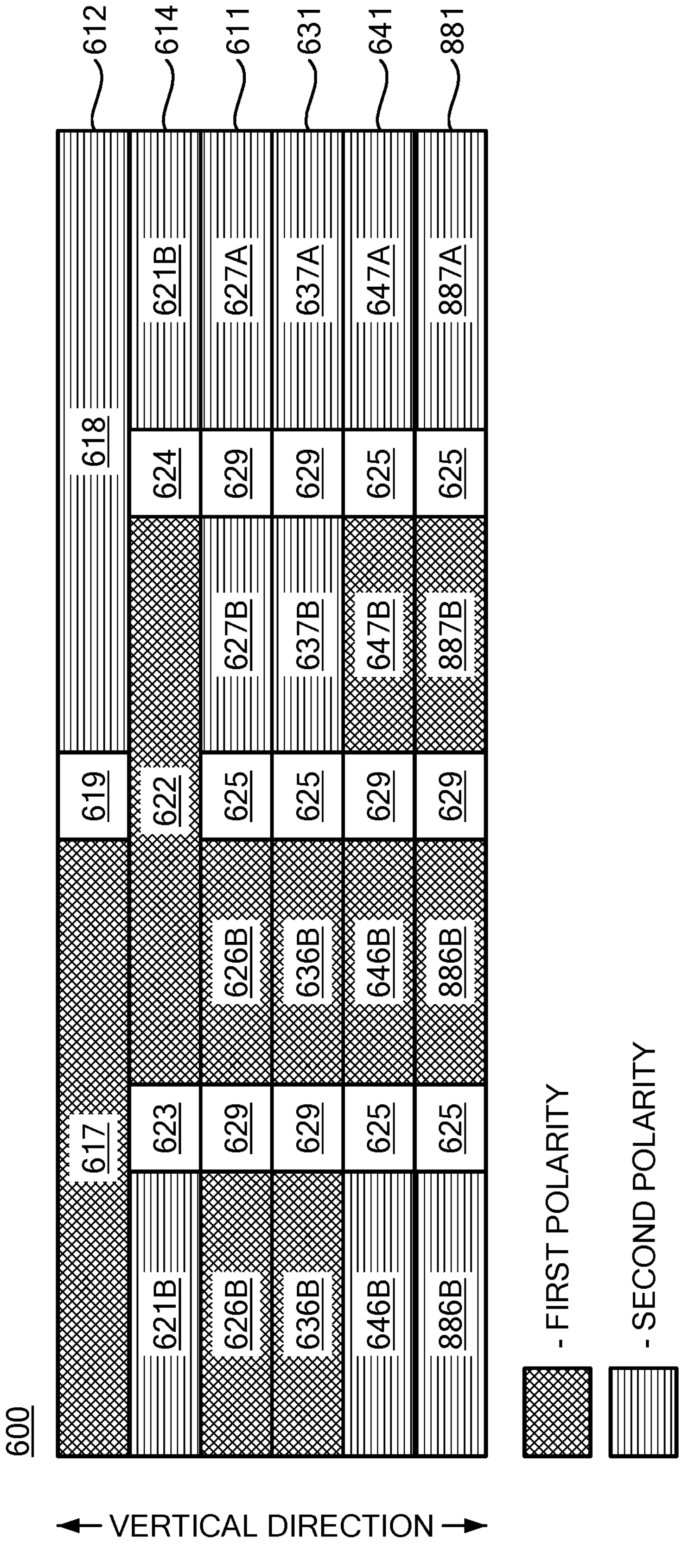
FIG. 6Q is a diagram a coil assembly, according to aspects of the disclosure.

FIG. 6Q is a diagram of a coil assembly 600 that includes primary transmitting coil 612, redundant transmitting coil 614, primary receiving coils 611 and 631, and redundant receiving coils 641 and 681. FIG. 6J illustrates that transmitting coils 612 and 614 and receiving coils 611, 631, 641, and 681 may be stacked in the vertical direction, as well as the alignment between different segments and transitions in receiving coils 611, 631, 641, and 681.

In one aspect, FIG. 6Q illustrates that the polarity of primary receiving coils 611 and 631 may be matched to the polarity of primary transmitting coil 612, meaning that: (i) segments in receiving coils 611 and 631 that have the first polarity are disposed directly below segment 617 of transmitting coil 612, which also has the first polarity; (ii) segments in receiving coils 611 and 631 that have the second polarity are disposed directly below segment 618 of transmitting coil 612 which also has the second polarity, and (iii) transitions in receiving coils 611 and 641 are disposed directly below transition 619 in transmitting coil 612. This arrangement results in close to zero direct coupling between receiving coils 611 and 631 and transmitting coil 612, while ensuring maximized coupling between receiving coils 611 and 641 a reflected signal from a target that is facing receiving coils 611 and 631.

In another, aspect FIG. 6Q illustrates that primary receiving coils 611 and 631 includes exclusions zones (e.g., transitions 629) that are situated directly below the transitions (e.g., transitions 632 and 624) in redundant transmitting coil 614. As noted above, this arrangement prevents receiving coils 611 and 631 from picking up offset from transitions 623 and 624.

In yet another aspect, FIG. 6Q illustrates that the polarity of redundant receiving coils 641 and 681 may be matched to the polarity of redundant transmitting coil 614, meaning that: (i) segments in receiving coils 881 and 641 that have the first polarity are disposed directly below segment 622 of transmitting coil 614, which also has the first polarity; (ii) segments in receiving coils 641 and 881 that have the second polarity are disposed directly below segments 621A-B of transmitting coil 614 which also have the second polarity, and (iii) transitions in receiving coils 641 and 881 are disposed directly below transition 623 and 624 in transmitting coil 614. This arrangement results in close to zero direct coupling between receiving coils 881 and 641 and transmitting coil 642, while ensuring maximized coupling between receiving coils 641 and 881 a reflected signal from a target that is facing receiving coils 881 and 641.

In another, aspect FIG. 6Q illustrates that redundant receiving coils 641 and 881 includes exclusions zones (e.g., transitions 629) that are situated directly below the transitions (e.g., transition 619) in primary transmitting coil 614. As noted above, this arrangement prevents receiving coils 611 and 631 from picking up offset from transitions 623 and 624.

Figure 6R:
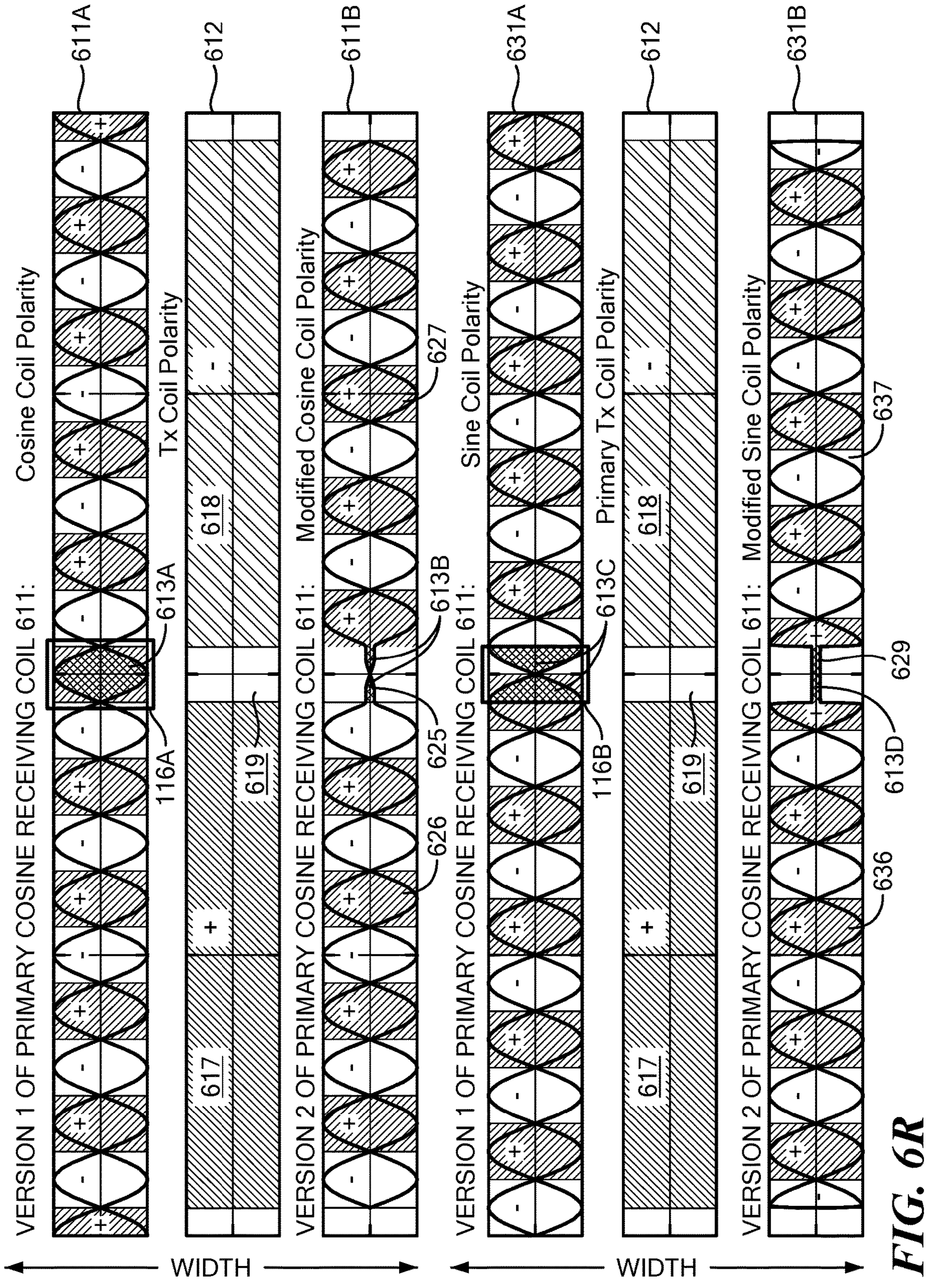
FIG. 6R is a diagram illustrating aspects of a coil assembly, according to aspects of the disclosure.

FIG. 6R illustrates in further detail the mechanism by which different polarities can be imparted on adjacent receiving coil segments. As illustrated, to divide receiving coil 611 into segments 626 and 627 that have different polarities, portion 116A has to be replaced with a transition 625. In portion 116A, the conductive trace used to form the receiving coil crosses over twice, whereas in transition 625, the conductive trace crosses over only once. As another example, to divide receiving coil 631 into segments 636 and 637 of opposite polarities, portion 116B has to be replaced with a transition 629. In portion 116B, the conductive trace used to form the receiving coil crosses over once, whereas in transition 629, the conductive trace does not cross over at all. In other words, to divide a receiving coil into segments of different (or opposite) polarities, a portion of the receiving coil has to be replaced with a transition that has one fewer cross-overs than the portion that is being replaced. Or put differently, the transition has to change the direction of the current flows that pass through the transition.

The surface area of a receiving coil portion or transition is the space that is enclosed between wires (or conductive traces) used to form the receiving coil or transition. The surface area of portion 116A is represented by crosshatch 613A. The surface area of transition 625 is represented by crosshatches 613B. As illustrated, transition 625 may have a considerably smaller surface area (and width) than portion 116A, which causes transition 625 to pick up much less noise from transition 619 than portion 116A would. The surface area of portion 116B is represented by crosshatches 613C and the surface area of transition 629 is represented by crosshatch 613D. As illustrated, transition 629 may have a considerably smaller surface area (and width) than portion 116B, which causes transition 629 to pick up much less noise from transition 619 than portion 116B would.

Figure 6S:
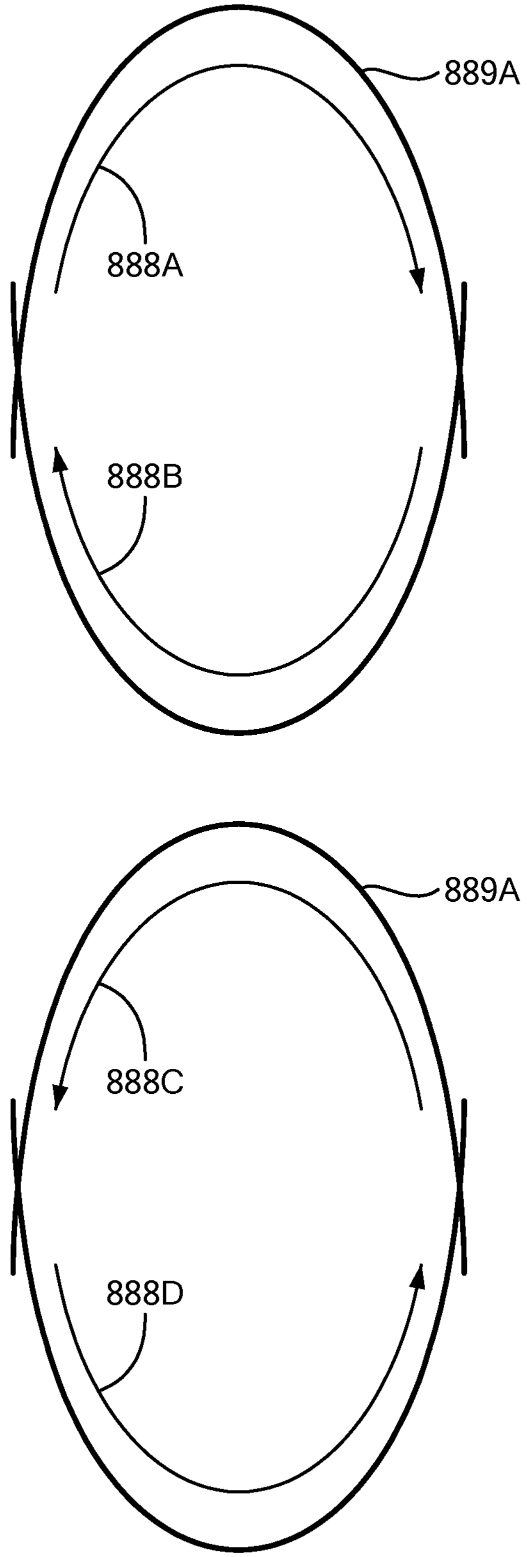
FIG. 6S is a diagram of an example of coil lobes, according to aspects of the disclosure.

FIG. 6S shows an example of receiving coil lobes 889A and 889B that have opposite (or different) polarities. When lobe 889A is energized, electrical current moves through the top portion of lobe 889A in the direction indicated by arrow 888A. When lobe 889A is energized, electrical current moves through the bottom portion of coil lobe 889A in the direction indicated by arrow 888A. When lobe 889B is energized, electrical current moves through the top portion of lobe 889B in the direction indicated by arrow 888C. When lobe 889B is energized, electrical current moves through the bottom portion of coil lobe 889B in the direction indicated by arrow 888D. In other words, when two coil lobes have opposite (or different) polarities, electrical current will flow in opposite directions through the top portions of the lobes and through the bottom portions of the lobes. A transition is said to invert the polarities of receiving coil segments connected with it when the coil lobes that are directly coupled to each end of the transition have opposite polarities. A transition is said to maintain the polarities of receiving coil segments connected with it when the coil lobes that are directly coupled to each end of the transition have the same polarity. The polarities of the lobes 616 of the receiving coils discussed above with respect to FIGS. 6M-P are denoted by respective '+' and '−' signs that are shown in each lobe 616, where the plus and minus signs denote opposite or different polarities.

Figure 7A:
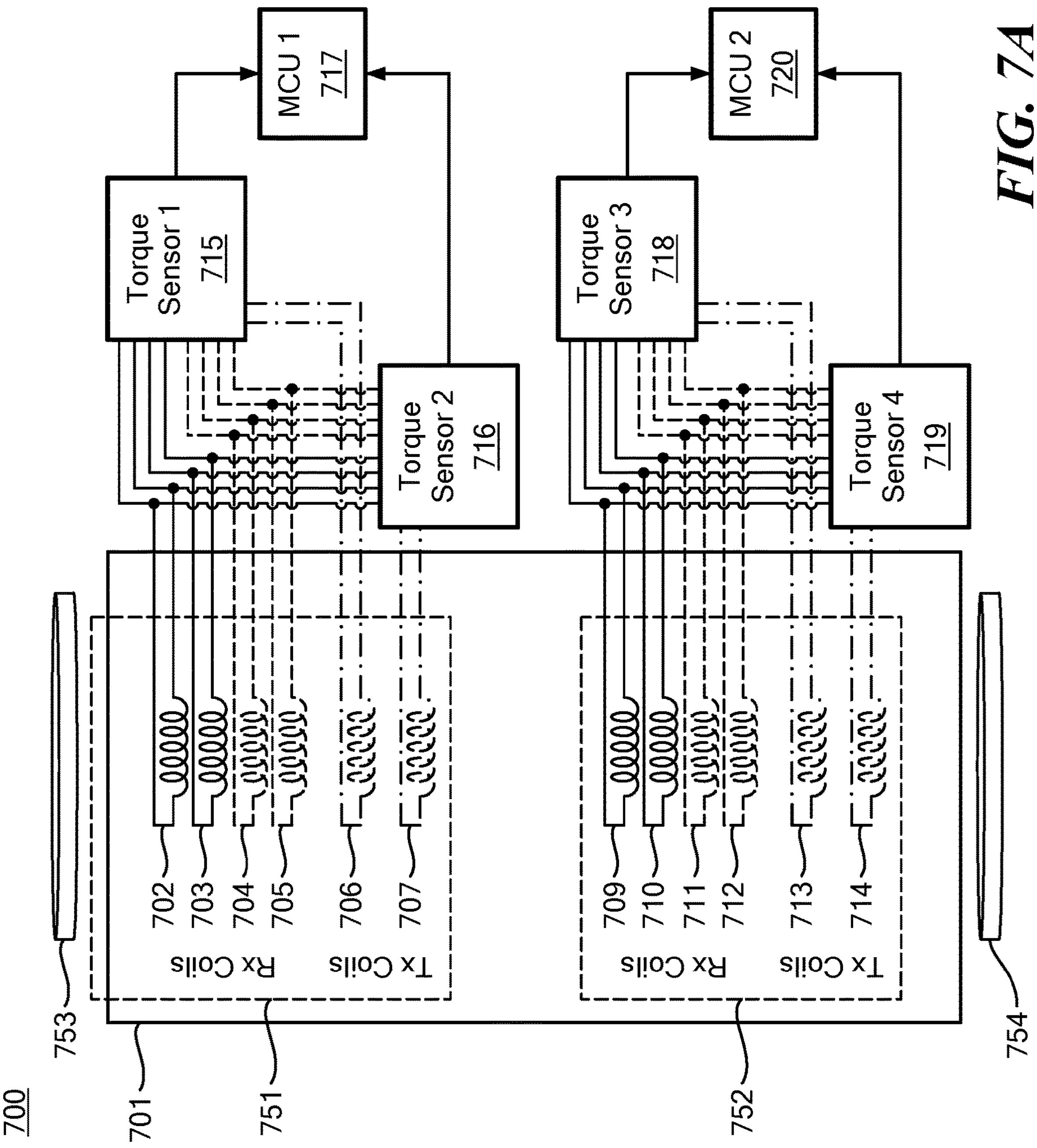
FIG. 7A is a diagram of an example of a system, according to aspects of the disclosure.

FIG. 7A is a diagram of an example of a system 700, according to aspects of the disclosure. As illustrated, system 700A may include targets 753 and 754, coil sets 751 and 752, torque sensors, 715, 716, 718, and 719, and controllers 717 and 720.

In some implementations, targets 753-754 may be the same or similar to targets 402A-B, respectively, both of which are discussed above with respect to FIG. 4A. Additionally or alternatively, in some implementations, targets 753-754 may be the same or similar to targets 502A-B, respectively, both of which are discussed above with respect to FIG. 5A.

Targets 753 and 754 may be coupled to different portions of an element or device and used to measure the torque that is incident on the element or device. The torque that is incident on the element or device is herein referred to as "the torque of targets 753 and 754". In one example, targets 753 and 754 may be coupled to different ends of a steering column and used to measure the torque that is incident on the steering column. Alternatively, targets 753 and 754 may be coupled to different ends of an integral shaft and used to measure the torque that is incident on the shaft. It will be understood that the present disclosure is not limited to any specific use of targets 753 and 754.

Coil set 751 may include receiving coils 702, 703, 704, and 705 and transmitting coils 706 and 707. Each of receiving coils 702, 703, 704, and 705 and each of transmitting coils 706 and 707 may be implemented by using a respective conductive trace that is formed on a substrate 701. However, the present disclosure is not limited to any specific implementation of receiving coils 702, 703, 704, and 705 and transmitting coils 706 and 707.

Receiving coils 702 and 703 may have a sinusoidal shape, and receiving coils 704 and 705 may have a co-sinusoidal shape. In some implementations, receiving coils 702 and 704 may be arranged to sense a reflected magnetic field that is generated by one of the targets 706-707, and receiving coils 703 and 705 may be arranged to sense a reflected magnetic field that is generated by the other one of targets 753-754. Transmitting coils 706-707 may be arranged to excite targets 753-754 and cause them to generate reflected magnetic fields. In some implementations, receiving coils 702-705 may be the same or similar to receiving coils 506A-D, transmitting coils 753-754 may be the same or similar to transmitting coils 504A-B, and targets 753-754 may be the same or similar to targets 502A-B. However, the present disclosure is not limited to any specific configuration for the receiving coils 702-705, transmitting coils 706-707, and targets 753-754.

Coil set 752 may include receiving coils 709, 710, 711, and 712, as well as transmitting coils 713 and 714. Receiving coils 709 and 710 may have a sinusoidal shape, and receiving coils 711 and 712 may have a co-sinusoidal shape. In some implementations, receiving coils 709 and 711 may be arranged to sense a reflected magnetic field that is generated by one of the targets 753-754, and receiving coils 710 and 712 may be arranged to sense a reflected magnetic field that is generated by the other one of targets 753-754. Transmitting coils 713-714 may be arranged to excite targets 753-754 and cause them to generate reflected magnetic fields.

Torque sensor 715 may include any suitable type of torque sensor. In some implementations, torque sensor 715 may be the same or similar to the sensor 108, which is discussed above with respect to FIG. 2. Torque sensor 715 may be configured to drive transmitting coil 706. Torque sensor 715 may be configured to receive signals from receiving coils 702, 703, 704, and 705 and determine the torque of targets 753 and 754 based on the received signals. Torque sensor 715 may be configured to provide an indication of the determined torque to controller 717.

Torque sensor 716 may include any suitable type of torque sensor. In some implementations, torque sensor 716 may be the same or similar to the sensor 108, which is discussed above with respect to FIG. 2. Torque sensor 716 may be configured to drive transmitting coil 707. Torque sensor 716 may be configured to receive signals from receiving coils 702, 703, 704, and 705 and determine the torque of targets 753 and 754 based on the received signals. Torque sensor 716 may be configured to provide an indication of the determined torque to controller 717.

Torque sensor 718 may include any suitable type of torque sensor. In some implementations, torque sensor 718 may be the same or similar to the sensor 108, which is discussed above with respect to FIG. 2. Torque sensor 718 may be configured to drive transmitting coil 713. Torque sensor 718 may be configured to receive signals from receiving coils 709, 710, 711, and 712 and determine the torque of targets 753 and 754 based on the received signals. Torque sensor 718 may be configured to provide an indication of the determined torque to controller 720.

Torque sensor 719 may include any suitable type of torque sensor. In some implementations, torque sensor 718 may be the same or similar to the sensor 108, which is discussed above with respect to FIG. 2. Torque sensor 719 may be configured to drive transmitting coil 714. Torque sensor 719 may be configured to receive signals from receiving coils 709, 710, 711, and 712 and determine the torque of targets 753 and 754 based on the received signals. Torque sensor 719 may be configured to provide an indication of the determined torque to controller 720.

Controller 717 may include any suitable type of processing circuitry, such as a general-purpose processor, an application-specific integrated circuit (ASIC), a field-programmable gate array (FPGA), a coordinate rotation digital computer (CORDIC) processor, etc. In one example, example, controller 717 may be an electronic control unit (ECU). In such implementations, the controller 717 may be arranged to generate one or more control signals based on the torque of targets 753 and 754. The control signals may be used to control other components of a larger system of which controllers 717 and 720 are part.

Controller 720 may be the same or similar to controller 717. In such implementations, the controller 720 may be arranged to generate one or more control signals based on the torque of targets 753 and 754. The function of controller 720 may be duplicative of that of controller 717. Controller 720 may be provided for increased fault-tolerance of the system of which controllers 717 are 720 are part.

Figure 7B:
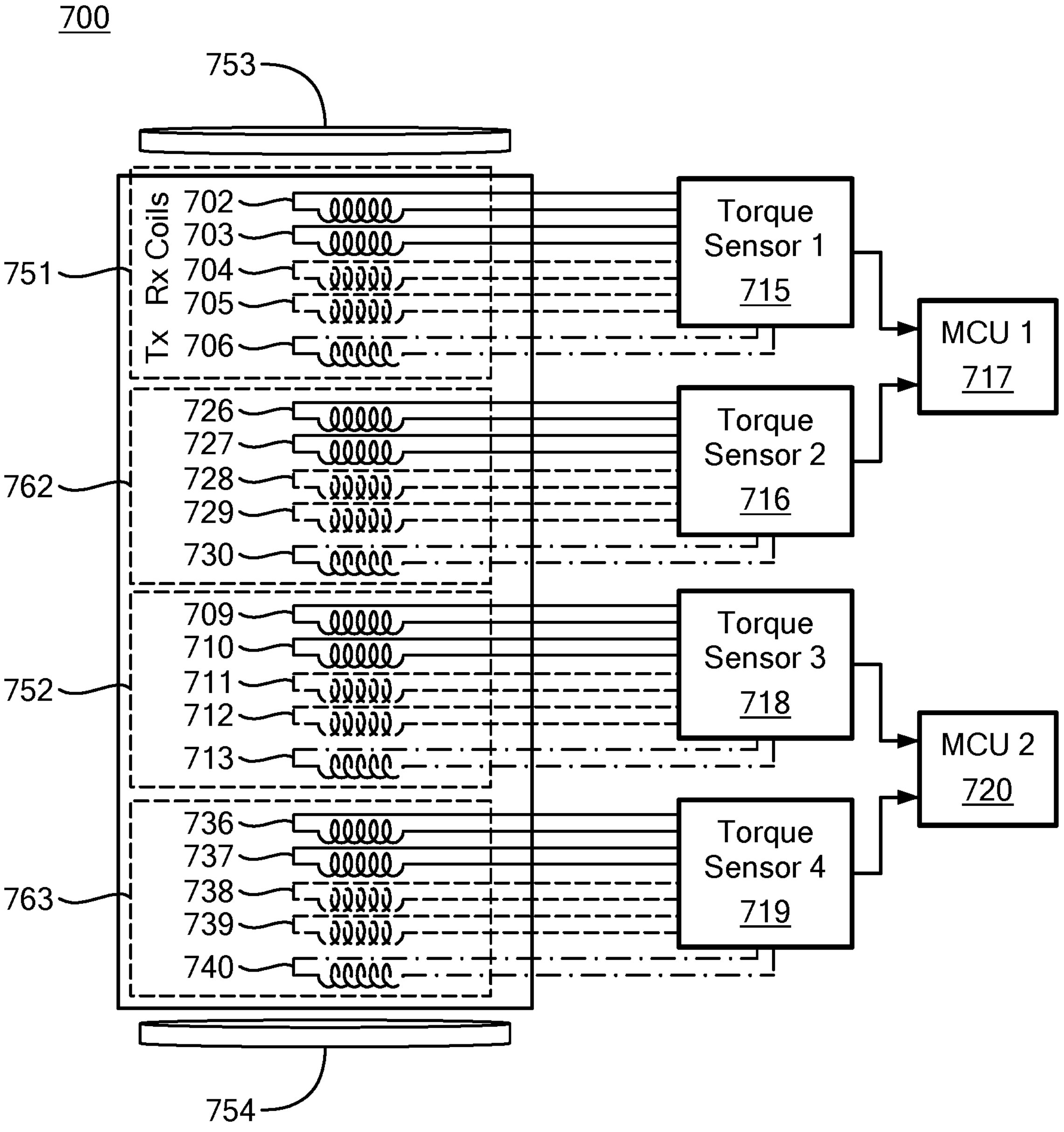
FIG. 7B is a diagram of an example of a system, according to aspects of the disclosure.

FIG. 7B is a diagram of the system 700, according to another implementation. Unlike the implementation shown in FIG. 7A, the implementation of system 700, which is presented in FIG. 7B, omits transmitting coil 707 from coil set 751, such that coil set 751 includes only transmitting coil 706. Furthermore, unlike the implementation shown in FIG. 7A, the implementation of system 700, which is presented in FIG. 7B, omits transmitting coil 714 from coil set 752, such that coil set 752 includes only transmitting coil 713. And still furthermore, unlike the implementation shown in FIG. 7A, the implementation of system 700, which is presented in FIG. 7B, includes additional coil sets 762 and 763, and each of the torque sensors 715-719 is arranged to receive signals from a different set of receiving coils.

Coil set 762 may be the same or similar to coil set 751, and each of the coils in coil set 762 may have the same or similar configuration to a different one of the coils in coil set 751. Coil set 752 may include receiving coils 726, 727, 728, and 729, as well as transmitting coil 730. Receiving coils 726 and 727 may have a sinusoidal shape, and receiving coils 728 and 729 may have a co-sinusoidal shape. In some implementations, receiving coils 726 and 728 may be arranged to sense a reflected magnetic field that is generated by one of the targets 753-754, and receiving coils 727 and 729 may be arranged to sense a reflected magnetic field that is generated by the other one of targets 753-754. Transmitting coil 730 may be arranged to excite both targets 753-754 and cause it to generate a reflected magnetic field.

Coil set 763 may be the same or similar to coil set 752, and each of the coils in coil set 762 may have the same or similar configuration to a different one of the coils in coil set 752. Coil set 763 may include receiving coils 736, 737, 738, and 739, as well as transmitting coil 740. Receiving coils 736 and 737 may have a sinusoidal shape, and receiving coils 738 and 739 may have a co-sinusoidal shape. In some implementations, receiving coils 736 and 738 may be arranged to sense a reflected magnetic field that is generated by one of the targets 753-754, and receiving coils 737 and 739 may be arranged to sense a reflected magnetic field that is generated by the other one of targets 753-754. Transmitting coil 740 may be arranged to excite both targets 753-754 and it to generate a reflected magnetic field.

In the example of FIG. 7B, torque sensor 715 may be configured to operate in the manner discussed above with respect to FIG. 7A. In the example of FIG. 7B, torque sensor 718 may be configured to operate in the manner discussed above with respect to FIG. 7A. In the example of FIG. 7B, torque sensor 716 may be configured to drive transmitting coil 730. In addition, torque sensor 716 may be configured to receive signals from receiving coils 726, 727, 728, and 729 and determine the torque of targets 753 and 754 based on the received signals. Torque sensor 716 may be configured to provide an indication of the determined torque to controller 717. In the example of FIG. 7B, torque sensor 719 may be configured to drive transmitting coil 740. In addition, torque sensor 719 may be configured to receive signals from receiving coils 736, 737, 738, and 739 and determine the torque of targets 753 and 754 based on the received signals. Torque sensor 719 may be configured to provide an indication of the determined torque to controller 720. In the example of FIG. 7B, controllers 717 and 720 may be configured to operate in the manner discussed above with respect to FIG. 7A.

Figure 7C:
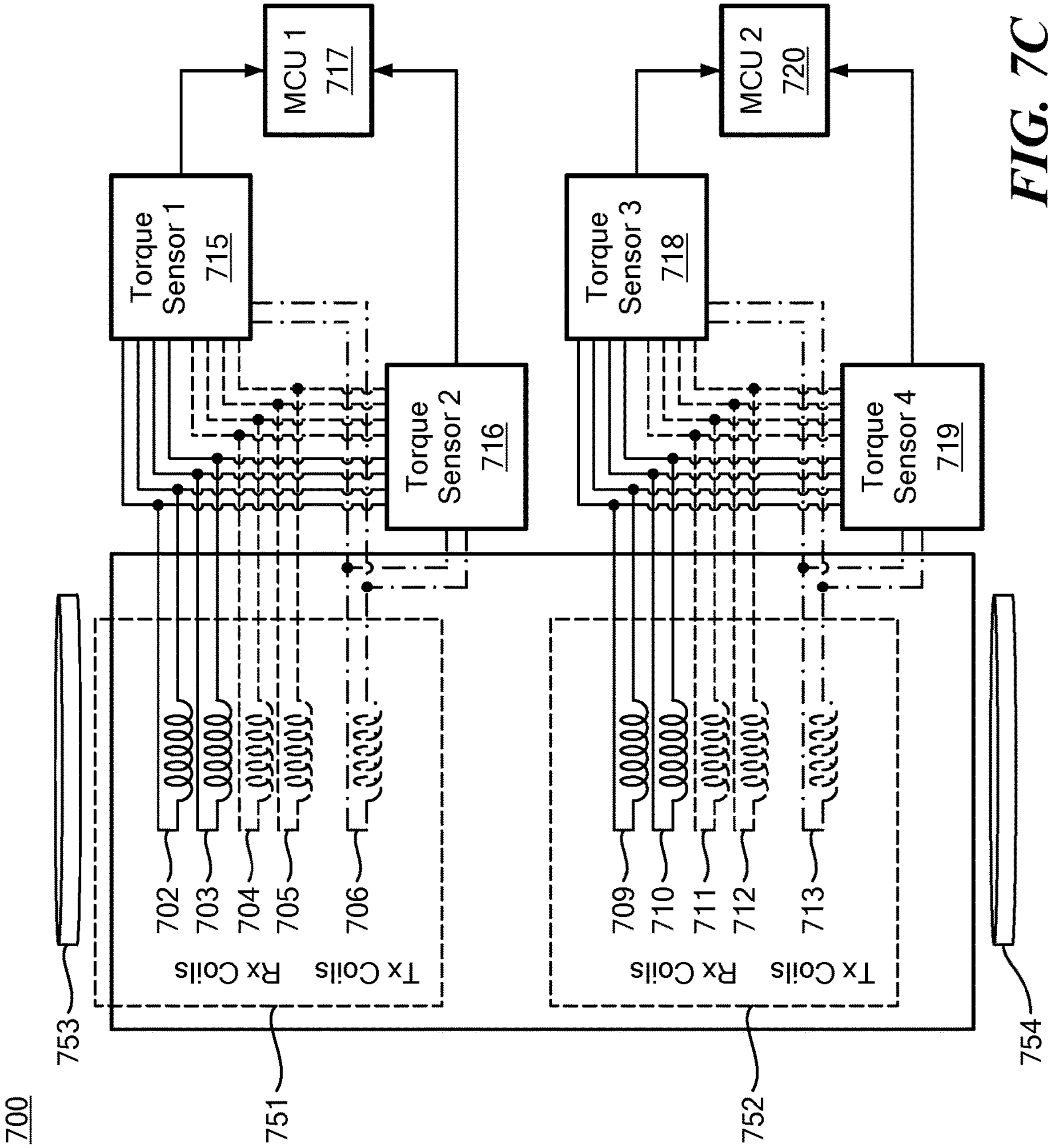
FIG. 7C is a diagram of an example of a system, according to aspects of the disclosure.

FIG. 7C is a diagram of another implementation of the system 700, according to aspects of the disclosure. Unlike the implementation shown in FIG. 7A, the implementation of system 700, which is presented in FIG. 7C, omits transmitting coil 707 from the coil set 751, such that coil set 751 includes only transmitting coil 706. Furthermore, unlike the implementation shown in FIG. 7A, the implementation of system 700, which is presented in FIG. 7C, omits transmitting coil 714 from the coil set 752, such that coil set 752 includes only transmitting coil 713. And still furthermore, unlike the implementation shown in FIG. 7A, in the implementation of system 700, which is presented in FIG. 7C, torque sensors 715 and 716 are both arranged to drive transmitting coil 706, and torque sensors 718 and 719 are both arranged to drive transmitting coil 713. In some implementations, the two sensors may be connected in parallel with a transmitting coil. Each sensor drives a current through the transmitting coil at the oscillation frequency. The resulting voltage across the transmitting coil is simultaneously observed by each sensor and used to synchronize the phase and frequency of their driving currents.

Figure 8:
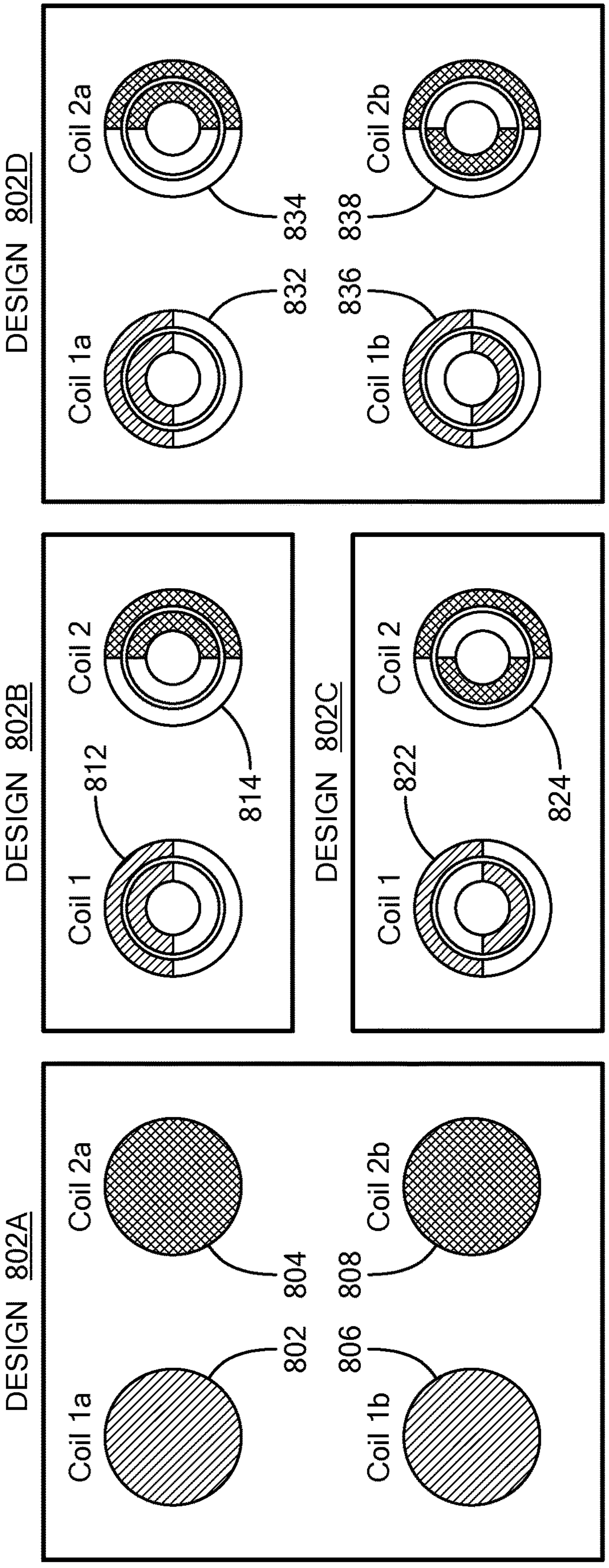
FIG. 8 is a diagram illustrating different transmitting coil designs, according to aspects of the disclosure.

FIG. 8 is a diagram illustrating examples of different transmitting coil designs, according to aspects of the disclosure. More particularly, FIG. 8 shows an example of transmitting coil designs 802A, 802B, 802C, and 802D. Design 802A includes transmitting coils 802, 804, 806, and 808 that each have a uniform polarity pattern. Design 802A may be used in the implementations of system 700 which are shown in FIGS. 7A and 7B, respectively. Design 802B includes transmitting coils 812 and 814 that each have a type-1 polarity pattern. Design 802B may be used in the implementation of system 700 which is shown in FIG. 7C. Design 802C includes transmitting coils 822 and 824 that each have a type-2 polarity pattern. Design 802C may be used in the implementation of system 700 which is shown FIG. 7C. Design 802D includes transmitting coils 832, 834, 834, and 836. Transmitting coils 832 and 834 may each have a type-1 polarity pattern and transmitting coils 836 and 838 may each have a type-2 polarity pattern. Design 802D may be used in the implementations of system 700 which are shown in FIGS. 7A and 7B, respectively. Furthermore, in some implementations, designs A and B may also be used in the implementation of the system 700.

Figure 9A:
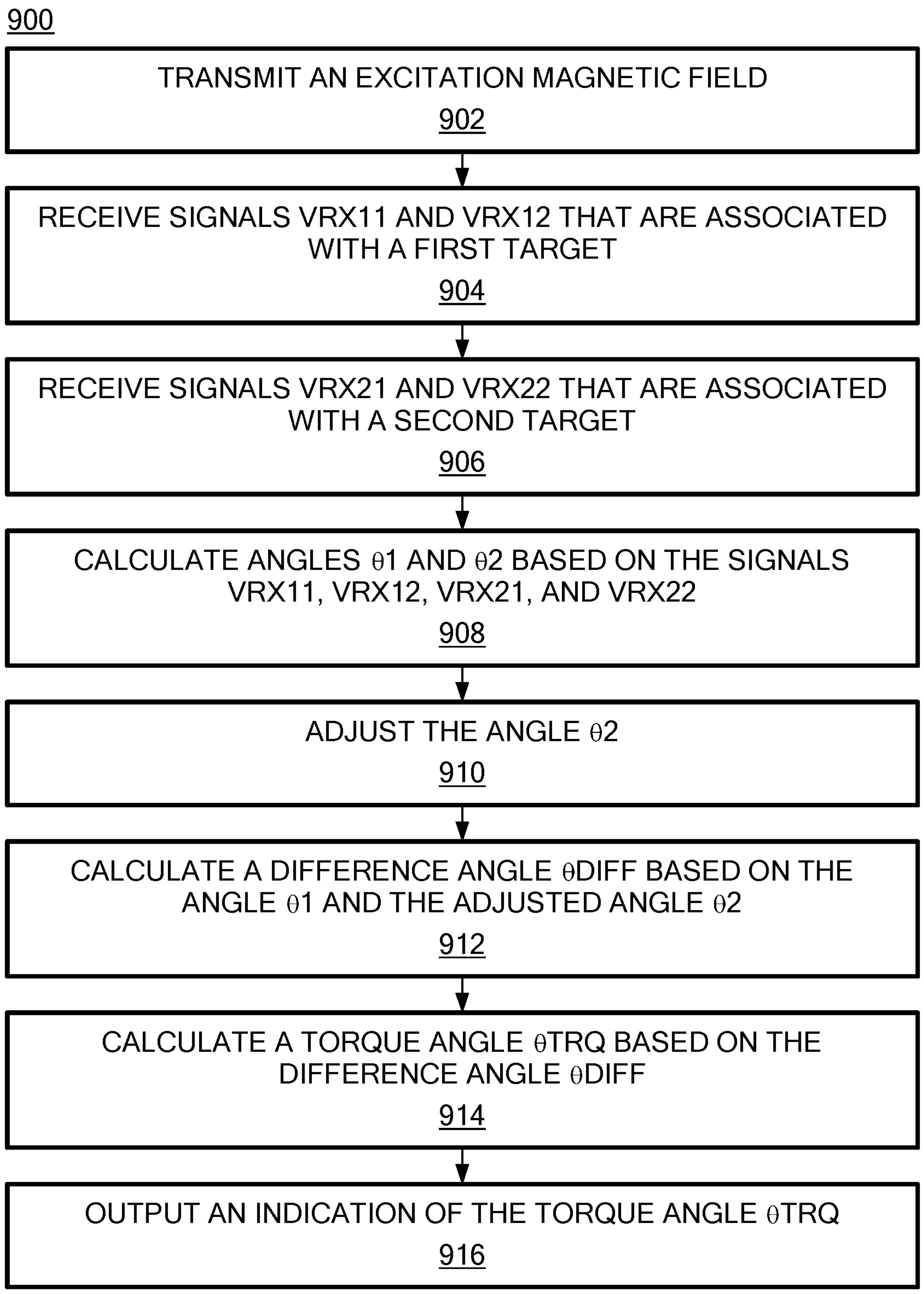
FIG. 9A is a flowchart of an example of a process, according to aspects of the disclosure.

FIG. 9A is a flowchart of an example of a process 900, according to aspects of the disclosure. According to the present example, the process 900 is performed by the processing circuitry of a torque sensor. However, the present disclosure is not limited to any specific entity performing the process 900. Importantly, the process 900 utilizes the assembly 400, which is discussed above with respect to FIGS. 4A-F, and which features non-concentric targets.

At step 902, the torque sensor transmits an excitation magnetic field. Specifically, the torque sensor causes the transmitting coil 404 of assembly 400 to transmit an excitation magnetic field.

Figure 9B:
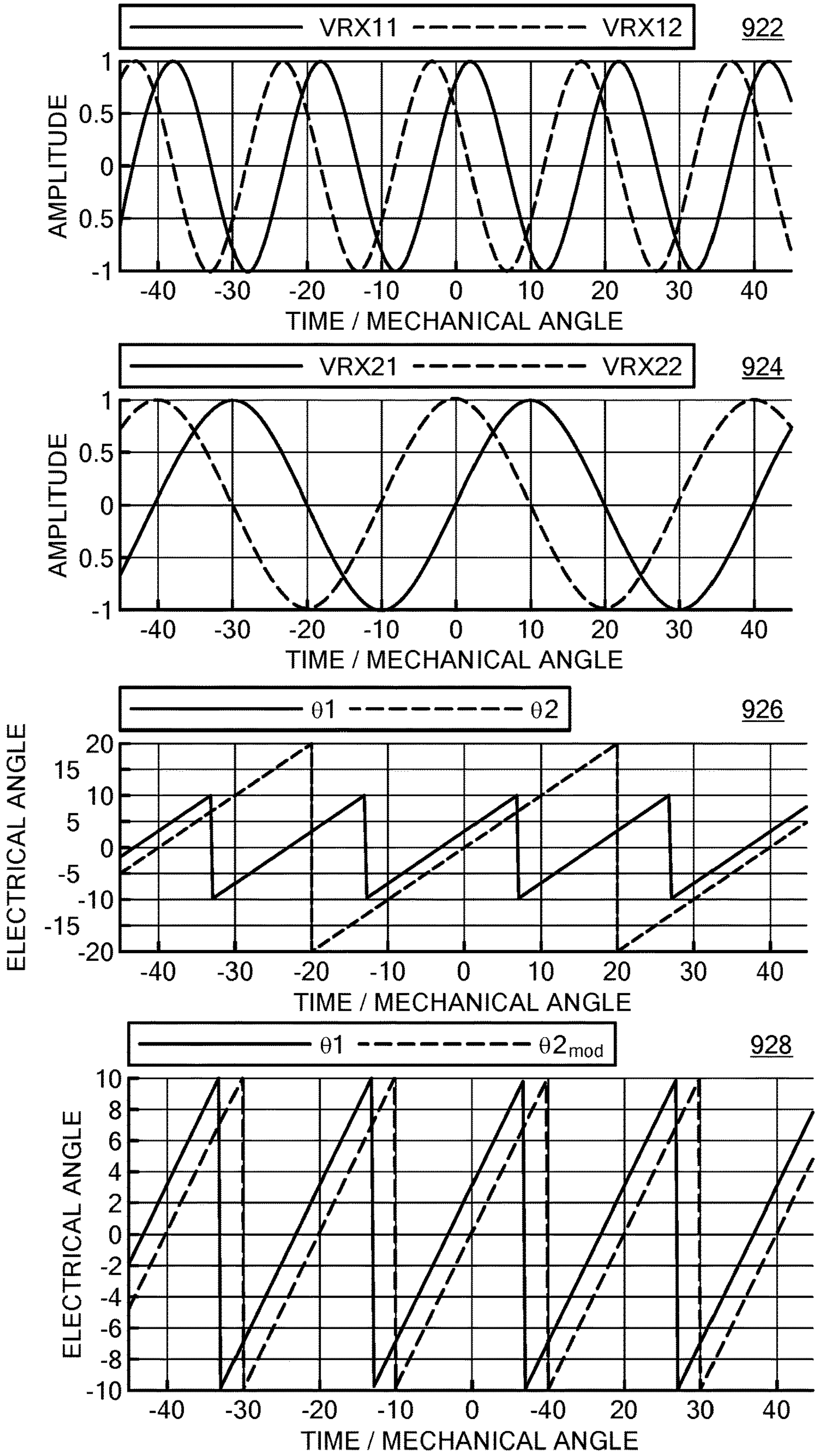
FIG. 9B shows graphs of different signals that are generated or used by the process of FIG. 9A, according to aspects of the disclosure.

At step 904, the torque sensor receives signals VRX11 and VRX12 that are generated in response to a reflected magnetic field, which is produced by target 402A. As noted above, the reflected magnetic field is produced in response to the excitation magnetic field that is transmitted at step 902. According to the present example, signal VRX11 is generated, at least in part, by receiving coil 406A and it has a sinusoidal envelope. Signal VRX12 is generated, at least in part, by receiving coil 406B and it has a co-sinusoidal envelope. In one example, the signal VRX11 may be a raw signal that is produced by the receiving coil 406A. In another example, the signal VRX11 may be produced by performing offset and/or gain adjustment (or another preprocessing, such as harmonic compensation or demodulation) on the raw signal that is output by the receiving coil 406A. In one example, the signal VRX12 may be a raw signal that is produced by the receiving coil 406B. In another example, the signal VRX12 may be produced by performing offset and/or gain adjustment (or another preprocessing, such as harmonic compensation or demolation) on the raw signal that is output by the receiving coil 406B. Stated succinctly, the signal VRX11 may be any signal that is at least in part generated by the receiving coil 406A, and the signal VRX12 may be any signal that is at least in part generated by the receiving coil 406B. Graph 922, which is provided in FIG. 9B, shows plots of signals VRX11 and VRX12. In the present example, target 402A has 2N teeth and receiving coils 402A-B each have 2N periods, where N is a positive integer greater than 1.

At step 906, the torque sensor receives signals VRX21 and VRX22 that are generated in response to a reflected magnetic field, which is produced by the target 402B. As noted above, the reflected magnetic field is produced in response to the excitation magnetic field that is transmitted at step 902. According to the present example, signal VRX21 is generated, at least in part, by receiving coil 406C and it has a sinusoidal envelope. Signal VRX22 is generated, at least in part, by receiving coil 406D and it has a co-sinusoidal envelope. In one example, the signal VRX21 may be a raw signal that is produced by the receiving coil 406C. In another example, the signal VRX21 may be produced by performing offset and/or gain adjustment (or another pre-processing, such as harmonic compensation or demodulation) on the raw signal that is output by the receiving coil 406C. In one example, the signal VRX22 may be a raw signal that is produced by the receiving coil 406D. In another example, the signal VRX22 may be produced by performing offset and/or gain adjustment (or another pre-processing, such as harmonic compensation or demodulation), on the raw signal that is output by the receiving coil 406D. Stated succinctly, the signal VRX21 may be any signal that is at least in part generated by the receiving coil 406C, and the signal VRX22 may be any signal that is at least in part generated by the receiving coil 406D. In the present example, target 402A has N teeth and receiving coils 402C-D each have N periods.

Graph 924, which is provided in FIG. 9B, shows plots of signals VRX21 and VRX22. Graphs 922 and 924 show that the signals VRX11 and VRX12 may have a higher frequency than the signals VRX21 and VRX22. This difference in frequency is attributable to the target 102A having a greater number of teeth than the target 402B.

At step 908, the torque sensor calculates angles θ1 and θ2. Angle θ1 is calculated based on the signals VRX11, VRX12, and it represents the angular position of target 402A. Angle θ1 is calculated based on the signals VRX21, and VRX22, and it represents the angular position of target 402B. According to the present example, angle θ1 and θ2 are calculated in accordance with equations 1 and 2 below:

$$\theta 1 = \left(\frac{180}{\pi * N_1}\right)\left(\tan^{-1}\left(\frac{VRX11}{VRX12}\right)\right) \tag{1}$$

$$\theta 2 = \left(\frac{180}{\pi * N_2}\right)\left(\tan^{-1}\left(\frac{VRX21}{VRX22}\right)\right) \tag{2}$$

where $N_1$ is the number of teeth in target 402A, $N_2$ is the number of teeth in target 402B, VRX11 is the value of signal VRX11, VRX12 is the value of signal VRX12, VRX21 is the value of signal VRX21, VRX22 is the value of signal VRX22. Throughout the disclosure, and when permitted by context, the terms "angle signal" and "angle" are used interchangeably.

Graph 926, which is provided in FIG. 9B, shows plots of angles θ1 and θ2. Graph 926 shows that angle θ1 has a higher frequency and a lower amplitude than angle θ2. The difference in frequency is attributable to the signals VRX11 and VRX12 having a higher frequency than the signals VRX21 and VRX22. The difference in amplitude is attributable to the wrapping of the angle on different period numbers.

At step 910, the torque sensor adjusts the angle θ2 to produce an adjusted angle signal $\theta 2_{mod}$. The adjusted angle $\theta 2_{mod}$ may be calculated by wrapping the angle θ2. Specifically, the adjusted angle $\theta 2_{mod}$ may be calculated in accordance with the following algorithm:

```
θ2_mod = θ2
if(θ2>180/N_1)
  θ2_mod = θ2 − 180/N_2
else if (θ2<-180/N_1)
  θ2_mod = θ2 + 180/N_2
```

As illustrated, the algorithm considers whether the value of angle θ2 is greater than a first quotient of 180 and the number $N_1$ of teeth in target 402A. If the value of angle θ2 is equal to the first quotient, the adjusted angle θ2*mod* is set to equal the value of angle θ2. If the value of angle θ2 is greater than the first quotient, the value of $\theta 2_{mod}$ is set to equal the difference between the value of angle θ2 and a second quotient of 180 and the number $N_2$ of teeth in the target 402B. If the value of the angle θ2 is smaller than the negative of the first quotient, $\theta 2_{mod}$ is set to equal the sum of θ2 and the second quotient.

Graph 928, which is provided in FIG. 9B, shows plots of angles θ1 and $\theta 2_{mod}$. As illustrated, the angle $\theta 2_{mod}$ may have a frequency and amplitude that is normalized to that of the angle θ1. In other words, the generation of the angle $\theta 2_{mod}$ from the θ2 may have the effect of normalizing the angle θ2 to the frequency and amplitude of the angle θ1.

At step 912, the torque sensor calculates a difference angle θdiff based on the angle θ1 and the angle $\theta 2_{mod}$. According to the present example, the difference angle θdiff is calculated in accordance with equation 3 below:

$$\theta_{diff} = \theta 1 - \theta 2_{mod} \tag{3}$$

At step 914, the torque sensor calculates a torque angle θtrq based on the difference angle θdiff. According to the present example, the torque angle θtrq is an indication of the torque of targets 402A-B. According to the present example, the torque angle θtrq is calculated by wrapping the difference angle θdiff. Specifically, in some implementations, the torque angle may be calculated by using the following algorithm:

```
θ_trq = θ_diff
if(θ_diff>180/N_1)
  θ_trq = θdiff − 360/N_1
else if (θ_diff<-180/N_1)
  θ_trq = θdiff + 360/N_1
```

As illustrated, the algorithm considers whether the value of angle θdiff is greater than a first quotient of 180 and the number $N_1$ of teeth in target 402A. If the value of angle θdiff is equal to the first quotient, the torque angle θtrq is set to equal the value of the difference angle θdiff. If the value of angle θdiff is greater than the first quotient, the value of θtrq is set to equal the difference between the value of angle θdiff and a second quotient of 360 and the number $N_1$ of teeth in the target 402A. If the value of the angle θdiff is smaller than the negative of the first quotient, the value of θtrq is set to equal the sum of θdiff and the second quotient.

Figure 9C:
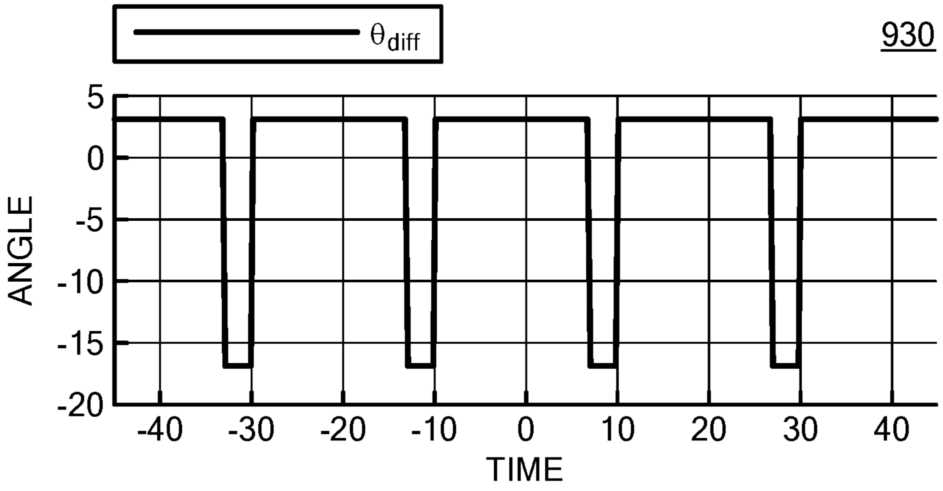
FIG. 9C shows graphs of different signals that are generated or used by the process of FIG. 9A, according to aspects of the disclosure.
Figure 9C:
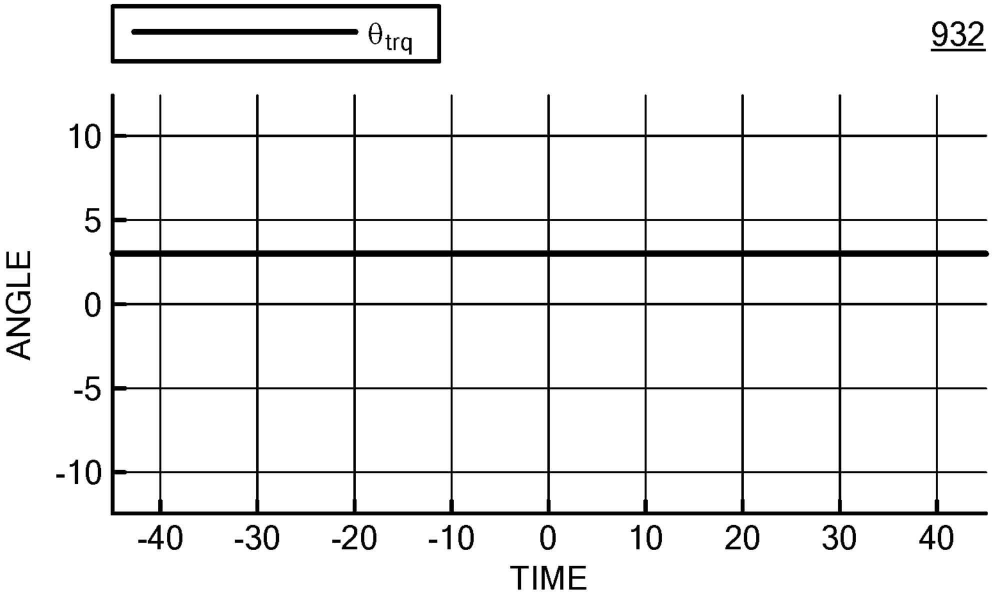

At step 916, an indication of the value of the torque angle θtrq is output by the torque sensor. The value of θtrq is indicative of the torque on targets 402A-B (i.e., the torque that is incident on an element or system to which the targets 402A-B are attached). As used throughout the disclosure, the phrase "outputting an indication of the value of the torque angle θtrq" may refer to one or more of: providing an indication of the value of the torque angle θtrq to an external device, storing an indication of the value of the torque angle θtrq in a predetermined memory location of the torque sensor (e.g., from where it can be retrieved by components of the torque sensor and processed further), displaying an indication of the value of the torque angle θtrq, or transmitting of the value of the torque angle θtrq over a data bus or communications link. FIG. 9C shows plots 930 and 932 of the difference angle θdiff and the torque angle θtrq.

Figure 10:
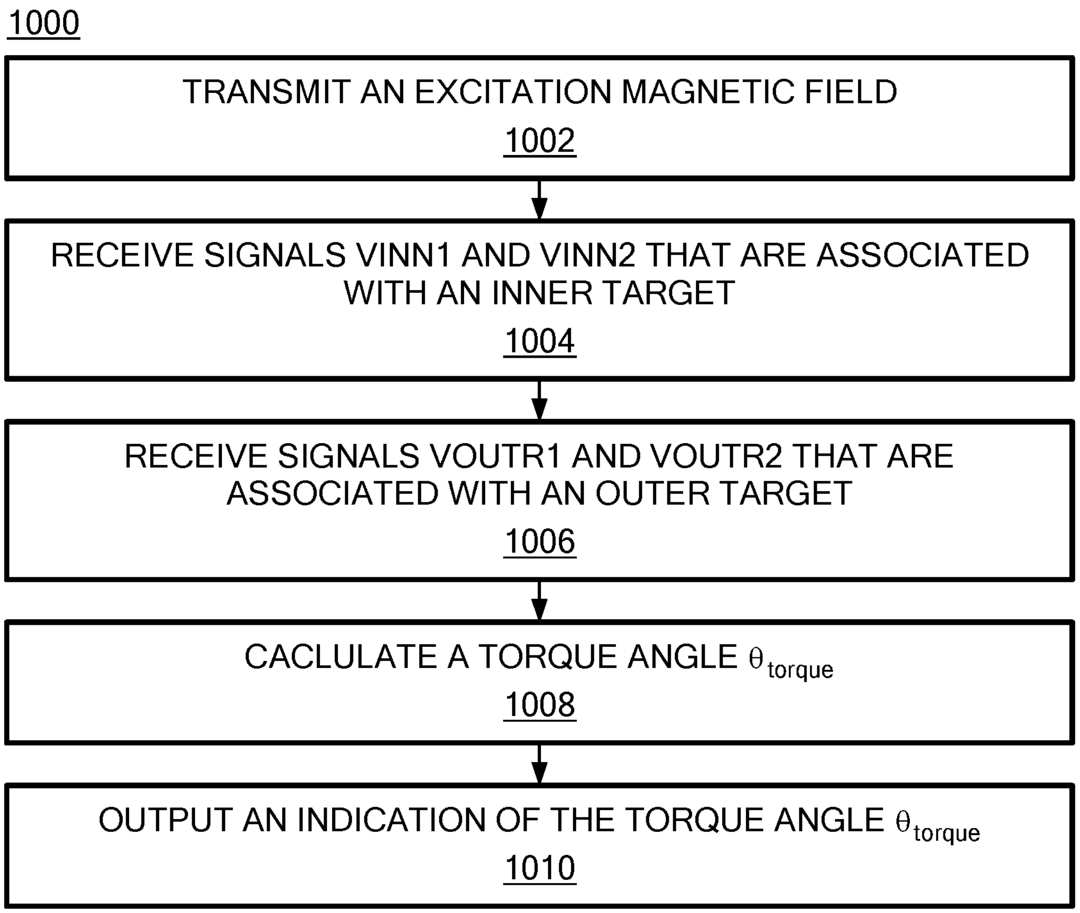
FIG. 10 is a flowchart of an example of a process, according to aspects of the disclosure.

FIG. 10 is a flowchart of an example of a process 1000, according to aspects of the disclosure. According to the present example, the process 1000 is performed by the processing circuitry of a torque sensor. However, the present disclosure is not limited to any specific entity performing the process 1000. Importantly, the process 1000 utilizes the assembly 300, which is discussed above with respect to FIGS. 3A-F, and which features concentric targets.

At step 1002, the torque sensor transmits an excitation magnetic field. Specifically, the torque sensor causes the transmitting coils 104A-B of assembly 300 to transmit an excitation magnetic field.

At step 1004, the torque sensor receives signals VINN1 and VINN2 that are generated in response to a reflected magnetic field, which is produced by the target 102B. As noted above, the reflected magnetic field is produced in response to the excitation magnetic field that is transmitted at step 1002. According to the present example, signal VINN1 is generated, at least in part, by receiving coil 106C and it has a sinusoidal envelope. Signal VINN2 is generated, at least in part, by receiving coil 106D and it has a co-sinusoidal envelope. In one example, the signal VINN1 may be a raw signal that is produced by the receiving coil 106C. In another example, the signal VINN1 may be produced by performing offset and/or gain adjustment (or another pre-processing, such as harmonic compensation or demodulation) on the raw signal that is output by the receiving coil 106C. In one example, the signal VINN2 may be a raw signal that is produced by the receiving coil 106D. In another example, the signal VINN2 may be produced by performing offset and/or gain adjustment (or another pre-processing, such as harmonic compensation or demodulation) on the raw signal that is output by the receiving coil 106D. Stated succinctly, the signal VINN1 may be any signal that is at least in part generated by the receiving coil 106C, and the signal VINN2 may be any signal that is at least in part generated by the receiving coil 106D.

At step 1006, the torque sensor receives signals VOUTR1 and VOUTR2 that are generated in response to a reflected magnetic field, which is produced by the target 102A. As noted above, the reflected magnetic field is produced in response to the excitation magnetic field that is transmitted at step 1002. According to the present example, signal VOUTR1 is generated, at least in part, by receiving coil 106A and it has a sinusoidal envelope. Signal VOUTR2 is generated, at least in part, by receiving coil 106B and it has a co-sinusoidal envelope. In one example, the signal VOUTR1 may be a raw signal that is produced by the receiving coil 106A. In another example, the signal VOUTR1 may be produced by performing offset and/or gain adjustment (or another preprocessing, such as harmonic compensation or demodulation) on the raw signal that is output by the receiving coil 106A. In one example, the signal VOUTR2 may be a raw signal that is produced by the receiving coil 106B. In another example, the signal VOUTR2 may be produced by performing offset and/or gain adjustment (or another preprocessing, such as harmonic compensation) on the raw signal that is output by the receiving coil 106B. Stated succinctly, the signal VOUTR1 may be any signal that is at least in part generated by the receiving coil 106A, and the signal VOUTR2 may be any signal that is at least in part generated by the receiving coil 106B.

At step 1008, the torque sensor calculates a torque angle $\theta_{torque}$ that is indicative of the torque of targets 102A-B. As noted above, each of targets 102A-B may be to a shaft, or different components of a mechanical device, such as a steering column. In this regard, the torque of targets 102A-B is the torque that is imparted on the shaft or mechanical device to which the targets 102A-B are coupled. According to the present example, the torque of targets 102A-B is calculated by solving equations 4-6 below based on the values of signals VINN1, VINN2, VOUTR1, and VOUTR2.

$$\cos(\theta_{inner}-\theta_{outer}) = VINN2*VOUTR2 + VINN1*VOUTR1 \quad (4)$$

$$\sin(\theta_{inner}-\theta_{outer}) = VINN1*VOUTR2 - VINN2*VOUTR1 \quad (5)$$

$$\theta_{torque} = \frac{\sin(\theta_{inner}-\theta_{outer})}{\cos(\theta_{inner}-\theta_{outer})} \quad (6)$$

where $\theta_{torque}$ is the torque angle or torque of targets 102A-B, $\theta_{outer}$ is an indication of the angular position of target 102A, and $\theta_{outer}$ is an indication of the angular position of target 102B.

At step 1010, an indication of the value of the torque angle θtorque is output by the torque sensor. Step 1010 may be performed in the same manner as step 916 of the process 900.

Process 1000 is just one example of how targets 102A and 120B (shown in FIG. 3B) might be used. In general, one or more transmitting coils may be used to cause target 102A to generate a first magnetic field and cause target 102B to generate a second magnetic field. One or more first transmitting coils may be used to detect the first magnetic field and one or more second transmitting coils may be used to detect the second field. The angular position of the target 102A may be determined based on one or more first signals that are generated by the one or more first receiving coils in response to the first magnetic field. The angular position of the target 102B may be determined based on one or more second signals that are generated by the second receiving coils in response to the second signal. The angular position of target 102A may be determined based on the one or more first signals (e.g., by counting (or keeping track of) the peaks in one of the first signals or taking the arctan of the quotient of two of the first signals). The angular position of target 102B may be determined based on the one or more second signals (e.g., by counting (or keeping track of) the peaks in one of the first signals or taking the arctan of the quotient of two of the first signals). The difference between the first angular position and the second angular position may be determined and used to infer (or indicate) torque that is incident on a mechanical coupling that connects (or couples) target 102A to target 102B. In other words, the difference may be used as a proxy for torque, or it may be used to calculate the torque provided that information about the mechanical characteristics of the coupling is available.

Figure 11A:
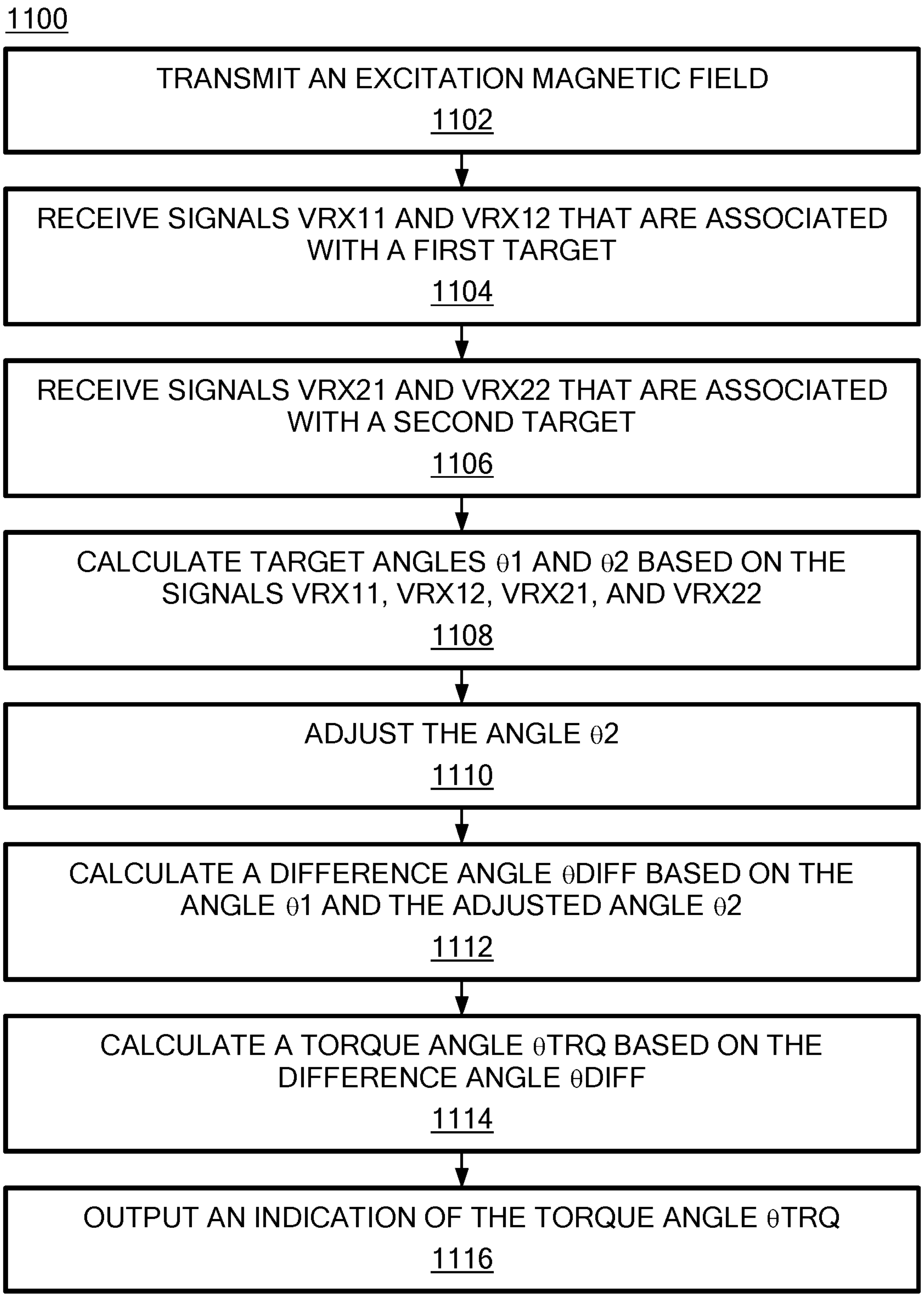
FIG. 11A is a flowchart of an example of a process, according to aspects of the disclosure.

FIG. 11A is a flowchart of an example of a process 1100, according to aspects of the disclosure. According to the present example, the process 1100 is performed by the processing circuitry of a torque sensor. However, the present disclosure is not limited to any specific entity performing the process 1100. Importantly, the process 1100 utilizes the assembly 400, which is discussed above with respect to FIGS. 4A-F, and which features non-concentric targets. The process 1100 is similar to the process 900, which is discussed above with respect to FIG. 9A.

Figure 11B:
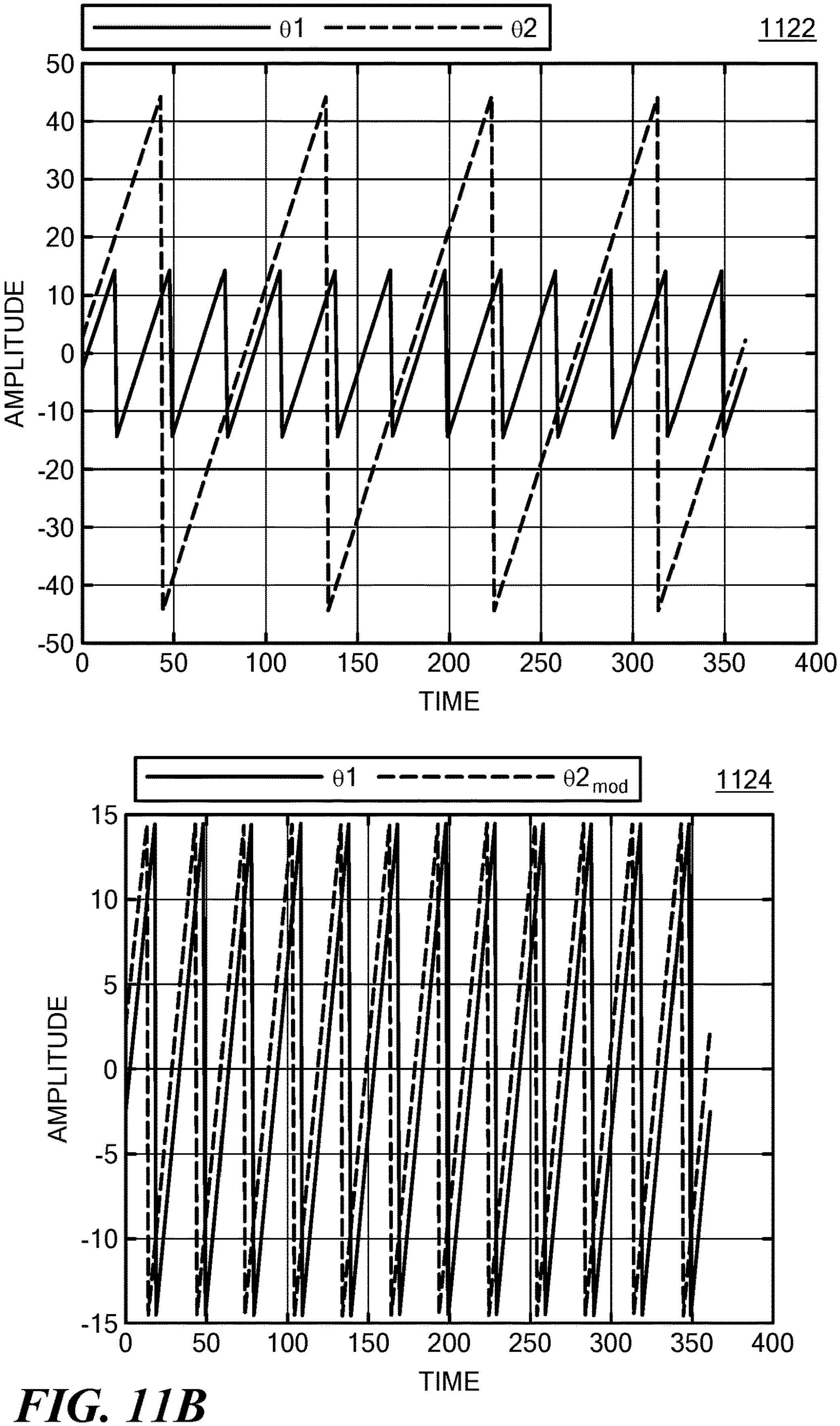
FIG. 11B shows graphs of different signals that are generated or used by the process of FIG. 11A, according to aspects of the disclosure.
Figure 11C:
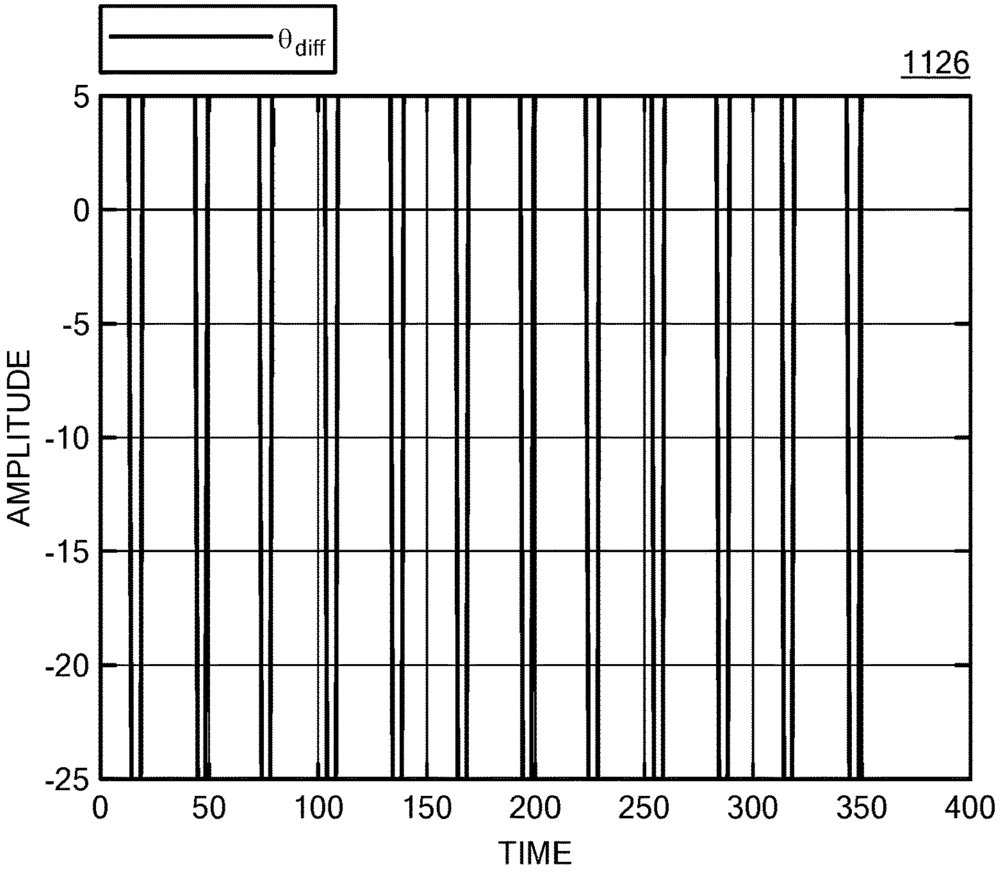
FIG. 11C shows graphs of different signals that are generated or used by the process of FIG. 11A, according to aspects of the disclosure.
Figure 11C:
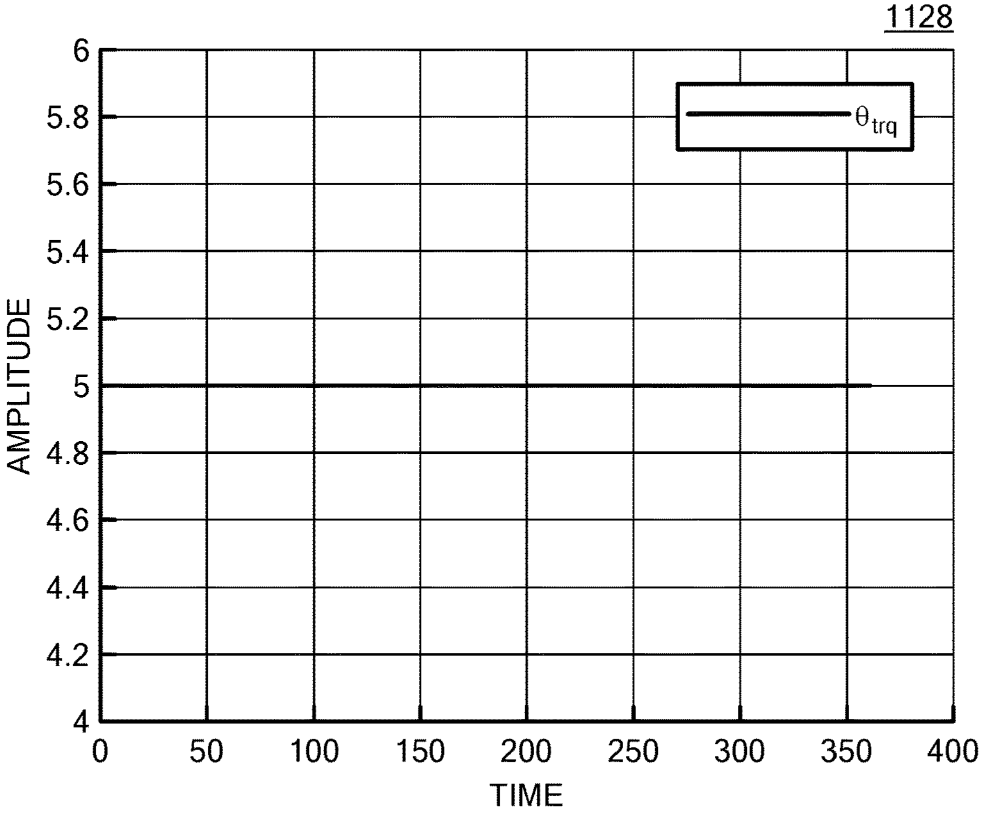

It will be recalled that in the example of FIG. 4, the number of teeth in target 402A is N1 and the number of teeth in target 402B is N2, where N1=2*N2. In other words, in the example of FIG. 9, the number of teeth in target 402A differs by a factor of two from the number of teeth in target 402B. The process 900 works with low error only when the number of teeth in targets 402A and 402B differ from each other by a factor of two. The process 1100 however, works when the number of teeth in target 402A differs from the number of teeth in target 402B by any factor that is greater than or equal to two, for as long as the factor is an integer. In other words, the example of FIG. 11 assumes that the number of teeth in target 402A is N1 and the number of teeth in target 402B is N2, where N1=a*N2, and where a is any positive integer greater than 2. FIGS. 11B-C provide examples of different signals that are produced or processed by the process 1100. The example of FIGS. 11B-C assumes that N2=4, a=3, and N1=12.

At step 1102, the torque sensor transmits an excitation magnetic field. Specifically, the torque sensor causes the transmitting coil 404 of assembly 400 to transmit an excitation magnetic field.

At step 1104, the torque sensor receives signals VRX11 and VRX12 that are generated in response to a reflected magnetic field, which is produced by target 402A. As noted above, the reflected magnetic field is produced in response to the excitation magnetic field that is transmitted at step 1102. According to the present example, signal VRX11 is generated, at least in part, by receiving coil 406A and it has a sinusoidal envelope. Signal VRX12 is generated, at least in part, by receiving coil 406B and it has a co-sinusoidal envelope. In one example, the signal VRX11 may be a raw signal that is produced by the receiving coil 406A. In another example, the signal VRX11 may be produced by performing offset and/or gain adjustment (or another preprocessing, such as harmonic compensation or demodulation) on the raw signal that is output by the receiving coil 406A. In one example, the signal VRX12 may be a raw signal that is produced by the receiving coil 406B. In another example, the signal VRX12 may be produced by performing offset and/or gain adjustment (or another preprocessing, such as harmonic compensation or demodulation) on the raw signal that is output by the receiving coil 406B. Stated succinctly, the signal VRX11 may be any signal that is at least in part generated by the receiving coil 406A, and the signal VRX12 may be any signal that is at least in part generated by the receiving coil 406B.

At step 1106, the torque sensor receives signals VRX21 and VRX22 that are generated in response to a reflected magnetic field, which is produced by the target 402B. As noted above, the reflected magnetic field is produced in response to the excitation magnetic field that is transmitted at step 902. According to the present example, signal VRX21 is generated, at least in part, by receiving coil 406C and it has a sinusoidal envelope. Signal VRX22 is generated, at least in part, by receiving coil 406D and it has a co-sinusoidal envelope. In one example, the signal VRX21 may be a raw signal that is produced by the receiving coil 406C. In another example, the signal VRX21 may be produced by performing offset and/or gain adjustment (or another preprocessing, such as harmonic compensation or demodulation) on the raw signal that is output by the receiving coil 406C. In one example, the signal VRX22 may be a raw signal that is produced by the receiving coil 406D. In another example, the signal VRX22 may be produced by performing offset and/or gain adjustment (or another preprocessing, such as harmonic compensation or demodulation), on the raw signal that is output by the receiving coil 406D. Stated succinctly, the signal VRX21 may be any signal that is at least in part generated by the receiving coil 406C, and the signal VRX22 may be any signal that is at least in part generated by the receiving coil 406D.

At step 1108, the torque sensor calculates angles θ1 and θ2. Angle θ1 is calculated based on the signals VRX11, VRX12, and it represents the angular position of target 402A. Angle θ1 is calculated based on the signals VRX21, and VRX22, and it represents the angular position of target 402B. According to the present example, angles θ1 and θ2 are calculated in accordance with equations 7 and 8 below:

$$\theta 1 = \left(\frac{180}{\pi * N_1}\right)\left(\tan^{-1}\left(\frac{VRX11}{VRX12}\right)\right) \tag{7}$$

$$\theta 2 = \left(\frac{180}{\pi * N_2}\right)\left(\tan^{-1}\left(\frac{VRX21}{VRX22}\right)\right) \tag{8}$$

where $N_1$ is the number of teeth in target 402A. $N_2$ is the number of teeth in target 402B, VRX11 is the value of signal VRX11, VRX12 is the value of signal VRX12, VRX21 is the value of signal VRX21, VRX22 is the value of signal VRX22.

Graph 1122, which is provided in FIG. 11B, shows plots of the angles (or angle signals) θ1 and θ2. Graph 1122 illustrates that angle θ1 has a higher frequency and lower amplitude than the angle θ2. The difference in frequency is attributable to the signals VRX11 and VRX12 having a higher frequency than the signals VRX21 and VRX22. The difference in amplitude is attributable to wrapping the angle on different period numbers.

At step 1110, the torque sensor adjusts the angle θ2 to produce an adjusted angle $\theta 2_{mod}$. The adjusted angle $\theta 2_{mod}$ may be calculated by wrapping the angle θ2. Specifically, the adjusted angle may be calculated in accordance with the following algorithm:

```
θ2mod = θ2
if(θ2>180/N1)
  θ2mod = θ2 − 180/(N1/a)
else if (θ2<-180/N1)
  θ2mod = θ2 + 180/(N1/a)
```

As illustrated, the algorithm considers whether the value of angle θ2 is greater than a first quotient of 180 and the number $N_1$ of teeth in target 402A. If the value of angle θ2 is equal to the first quotient, the adjusted angle θ2*mod* is set to equal the value of angle θ2. If the value of angle θ2 is greater than the first quotient, the value of $\theta 2_{mod}$ is set to equal the difference between the value of angle θ2 and a second quotient of 180 and the number $N_1$ of teeth in the target 402A divided by the factor a. If the value of the angle θ2 is smaller than the negative of the first quotient, $\theta 2_{mod}$ is set to equal the sum of θ2 and the second quotient.

Graph 1124, which is provided in FIG. 11B, shows plots of the angles θ1 and θ2, Graph 1124 illustrates that angle θ1 has the same frequency and amplitude as angle $\theta 2_{mod}$. In another aspect, graph 1124 illustrates that the calculation of angle $\theta 2_{mod}$ effectively amounts to normalizing the angle θ2 to the angle θ1.

At step 1112, the torque sensor calculates a difference angle θdiff based on the angle θ1 and the angle θ2*mod*. According to the present example, the difference angle θdiff is calculated in accordance with equation 3 below:

$$\theta_{diff} = \theta 1 - \theta 2_{mod}$$

Graph 1126, which is provided in FIG. 11C, shows a plot of the difference angle $\theta_{diff}$.

At step 1114, the torque sensor calculates a torque angle θtrq based on the difference angle θdiff. According to the present example, the torque angle θtrq is an indication of the torque of targets 402A-B. According to the present example, the torque angle θtrq is calculated by wrapping the difference angle θdiff. Specifically, in some implementations, the torque angle may be calculated by using the following algorithm:

```
θtrq = θdiff
if(θdiff>180/N1)
   θtrq = θdiff − 360/N1
else if (θdiff<-180/N1)
   θtrq = θdiff + 360/N1
```

As illustrated, the algorithm considers whether the value of angle θdiff is greater than a first quotient of 180 and the number $N_1$ of teeth in target 402A. If the value of angle θdiff is equal to the first quotient, the torque angle θtrq is set to equal the value of the difference angle θdiff. If the value of angle θdiff is greater than the first quotient, the value of θtrq is set to equal the difference between the value of angle θdiff and a second quotient of 360 and the number $N_1$ of teeth in the target 402A. If the value of the angle θdiff is smaller than the negative of the first quotient, the value of θtrq is set to equal the sum of θdiff and the second quotient. Graph 1128, which is provided in FIG. 11C, shows a plot of 1 $\theta_{trq}$.

At step 1116, an indication of the value of the torque angle θtrq is output by the torque sensor. Step 1116 may be performed in the same manner as step 916 of the process 900.

Throughout the disclosure, coil assemblies are provided that include multiple receiving and/or transmitting coils. In these assemblies, the receiving/transmitting coils are stacked. It will be understood that in any of the assemblies, the receiving/transmitting coils may be arranged in any order within the stack. Furthermore, it will be understood that one or more of the coils can be interweaved. As used herein, the phrase "portion A of coil B is aligned with portion C of coil D" shall mean that portion A is either directly above or below portion C. When two coils are interweaved, a first portion of a first coil may be disposed above a second portion of a second coil and a third portion of the first coil may be disposed below a fourth portion of the second coil.

The concepts and ideas described herein may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, or volatile memory. The term unit (e.g., an addition unit, a multiplication unit, etc.), as used throughout the disclosure may refer to hardware (e.g., an electronic circuit) that is configured to perform a function (e.g., addition or multiplication, etc.), software that is executed by at least one processor, and configured to perform the function, or a combination of hardware and software. As used throughout the disclosure, the term "substantially parallel" shall mean within +/−10 degrees of being exactly parallel.

As is known, some of the above-described electromagnetic flux sensing elements tend to have an axis of maximum sensitivity parallel to a substrate that supports the electromagnetic flux sensing element, and others of the above-described electromagnetic flux sensing elements tend to have an axis of maximum sensitivity perpendicular to a substrate that supports the electromagnetic flux sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. An apparatus, comprising:

a first transmitting coil including at least one first portion and at least one second portion, the first and second portions having different polarities; and a second transmitting coil that is disposed above or below the first transmitting coil, the second transmitting coil including at least one third portion and at least one fourth portion, the third and fourth portions having different polarities, wherein the first and second transmitting coils are configured so that, when the first transmitting coil is not driven and the second transmitting coil is driven, a net magnetic flux through the first portion is approximately zero, the net magnetic flux being a magnetic flux that is entirely attributable to the second transmitting coil, wherein configuring the first and second transmitting coils so that a respective flux through the first portion is approximately zero prevents or reduces a mutual inductance that is exerted on the second transmitting coil by the first transmitting coil in an event of a failure of the first transmitting coil.

2. The apparatus of claim 1, wherein the first transmitting coil is configured to generate a first magnetic field and the second transmitting coil is configured to generate a second magnetic field, the apparatus further comprising electronic circuitry configured to:

receive a first signal that is generated in response to a reflected magnetic field, the reflected magnetic field being generated by a target in response to at least one of the first magnetic field and the second magnetic field;

receive a second signal that is generated in response to the reflected magnetic field; and calculate a position of the target based on the first and second signals, wherein the first transmitting coil and the second transmitting coil are operated in a redundant configuration for increased fault-tolerance.

3. The apparatus of claim 1, wherein the first and second transmitting coils are configured so that, when the first transmitting coil is not driven and the second transmitting coil is driven, a net magnetic flux through the second portion is approximately zero.

4. The apparatus of claim 1, further comprising:

a receiving coil that is disposed above or below any of the first and second transmitting coils, wherein, the receiving coil includes at least one type-1 narrowed portion that is configured to change a polarity of the receiving coil, the type-1 narrowed portion being positioned at a boundary between adjacent first and second portions of the first transmitting coil, wherein, the receiving coil includes at least one type-2 narrowed portion that is configured to maintain a polarity of the receiving coil, the type-2 narrowed portion being positioned at a boundary between adjacent third and fourth portions of the second transmitting coil.

5. The apparatus of claim 1, further comprising:

a sinusoidal receiving coil that is disposed above, below, or in a same plane as any of the first and second transmitting coils; and a co-sinusoidal receiving coil that is disposed above, below, or in a same plane as any of the first and second transmitting coils and the sinusoidal receiving coil.

6. The apparatus of claim 1, wherein:

the first transmitting coil includes a respective inner segment and a respective outer segment, each of the inner segment of the first transmitting coil and the outer segment of the first transmitting coil including respective first and second portions;

the second transmitting coil includes a respective inner segment and a respective outer segment, each of the inner segment of the second transmitting coil and the outer segment of the second transmitting coil including respective third and fourth portions;

the respective inner segments of the first transmitting coil and the second transmitting coil are configured to excite a first target; and the respective outer segments of the first transmitting coil and the second transmitting coil are configured to excite a second target.

7. The apparatus of claim 6, further comprising:

an inner sinusoidal receiving coil that is disposed above, below or in a same plane as any of the first and second transmitting coils;

an inner co-sinusoidal receiving coil that is disposed above, below or in a same plane as any of the first and second transmitting coils and the inner sinusoidal receiving coil;

an outer sinusoidal receiving coil that is disposed above, below or in a same plane as any of the first and second transmitting coils; and an outer co-sinusoidal receiving coil that is disposed above, below or in a same plane as any of the first and second transmitting coils and the outer sinusoidal receiving coil, wherein any of the inner sinusoidal and co-sinusoidal receiving coils is disposed directly above, below or in a same plane as each of the respective inner segments of the first and second transmitting coils, and wherein any of the outer sinusoidal and co-sinusoidal receiving coils is disposed directly above, below or in a same plane as each of the respective outer segments of the first and second transmitting coils.

8. An apparatus, comprising:

a first transmitting coil including at least one first portion and at least one second portion, the first and second portions having different polarities, the first transmitting coil being disposed in a first plane; and a second transmitting coil including at least one third portion and at least one fourth portion, the third and fourth portions having different polarities, the second transmitting coil being rotated relative to the first transmitting coil by 90 degrees, the second transmitting coil being disposed in a second plane, the second plane being situated above or below the first plane, wherein the first and second transmitting coils are configured so that, when the first transmitting coil is not driven and the second transmitting coil is driven, a net magnetic flux through the first portion is approximately zero, the net magnetic flux being a magnetic flux that is entirely attributable to the second transmitting coil.

9. An apparatus, comprising:

a first receiving coil including a first narrowed portion that is disposed between at least two lobes of the first receiving coil, the first receiving coil being disposed in a first plane;

a second receiving coil including a second narrowed portion that is disposed between at least two lobes of the second receiving coil, the second receiving coil being disposed in a second plane, the second plane being situated above or below the first plane;

a transmitting coil including at least one first portion and at least one second portion, the first and second portions having different polarities, the transmitting coil being disposed in a third plane, the third plane being situated above or below the second plane, wherein each of the first narrowed portion wherein each of the first narrowed portion, the second narrowed portion is disposed directly above or below a respective first end of the first portion and a respective second end of the second portion in order to reduce an amount of offset associated with the first end and the second end that is picked up by the first receiving coil and the second receiving coil.

10. An apparatus, comprising:

a first transmitting coil including at least one first portion and at least one second portion, the first and second portions having different polarities, the first transmitting coil being disposed in a first plane; and a second transmitting coil including at least one third portion and at least one fourth portion, the third and fourth portions having different polarities, the second transmitting coil being rotated relative to the first transmitting coil, the second transmitting coil being disposed in a second plane, the second plane being situated above or below the first plane, wherein the first and second transmitting coils are configured so that, when the first transmitting coil is not driven and the second transmitting coil is driven, a net magnetic flux through the first portion is approximately zero, the net magnetic flux being a magnetic flux that is entirely attributable to the second transmitting coil, wherein each of the first, second, third, and fourth portions includes a first respective lobe and a second respective lobe that is nested inside the first respective lobe.

11. An apparatus, comprising:

a first transmitting coil including at least one first portion and at least one second portion, the first transmitting coil being disposed in a first plane; and a second transmitting coil including at least one third portion and at least one fourth portion, the second transmitting coil being rotated relative to the first transmitting coil, the second transmitting coil being disposed in a second plane, the second plane being situated above or below the first plane, wherein each of the first, second, third, and fourth portions is arch-shaped, wherein the first and second coil portions have opposite polarities, and the second third coil portions have opposite polarities, wherein the first transmitting coil further includes a fifth portion and a sixth portion that have opposite polarities and are nested inside the first portion and the second portion, and wherein the second transmitting coil further includes a seventh portion and an eighth portion that have opposite polarities and are nested inside the third portion and the fourth portion.

12. An apparatus, comprising:

a first transmitting coil including at least one first portion and at least one second portion, the first and second portions having different polarities, the first transmitting coil being disposed in a first plane; and a second transmitting coil including at least one third portion and at least one fourth portion, the third and fourth portions having different polarities, the second transmitting coil being disposed in a second plane, the second plane being situated above or below the first plane, wherein the first and second portions have opposite polarities, and the third and fourth portions have opposite polarities, and wherein the first portion and the second portion are disposed on a same side of the second transmitting coil, such that the first portion is disposed above or below both the third portion and the fourth portion, and the second portion is also disposed above or below both the third portion and the fourth portion.

13. An apparatus, comprising:

a first transmitting coil including at least one first portion and at least one second portion, the first and second portions having different polarities; and a second transmitting coil that is disposed above or below the first transmitting coil, the second transmitting coil including at least one third portion and at least one fourth portion, the third and fourth portions having different polarities, wherein the first and second transmitting coils are configured so that, when the first transmitting coil is not driven and the second transmitting coil is driven, a net magnetic flux through the first portion is approximately zero, the net magnetic flux being a magnetic flux that is entirely attributable to the second transmitting coil, wherein the first transmitting coil is further configured to generate a first magnetic field and the second transmitting coil is configured to generate a second magnetic field, the apparatus further comprising electronic circuitry configured to: receive first and second signals that are generated in response to a first reflected magnetic field, the first reflected magnetic field being a magnetic field that is generated by the first target in response to at least one of the first magnetic field and the second magnetic field; receive third and fourth signals that are generated in response to a second reflected magnetic field, the second reflected magnetic field being a magnetic field that is generated by the second target in response to at least one first magnetic field and the second magnetic field; and calculate a relative angular displacement of the first target and the second target based on the first, second, third, and fourth signals.

14. The apparatus of claim 13, wherein calculating the relative angular displacement includes calculating torque.

15. The apparatus of claim 13, wherein:

the electronic circuitry includes a first sensor and a second sensor;

the first sensor and the second sensor are each configured to calculate the relative angular displacement of the first target and the second target;

the first sensor is configured to drive the first transmitting coil; and the second sensor is configured to drive the second transmitting coil.

16. The apparatus of claim 13, wherein the electronic circuitry includes a first sensor and a second sensor, the apparatus further comprising a third sensor and a fourth sensor, wherein:

the first sensor is configured to receive the first, second, third, and fourth signals;

the second sensor is configured to receive the first, second, third, and fourth signals;

the first and second sensor are each configured to drive the first transmitting coil;

the first and second sensors are each configured to calculate the relative angular displacement of the first and second targets based on the first, second, third, and fourth signals; and the third and fourth sensor are each configured to drive the second transmitting coil.

17. The apparatus of claim 16, each of the third and fourth sensor is configured to:

receive fifth and sixth signals that are generated in response to the first reflected magnetic field;

receive seventh and eighth signals that are generated in response to the second reflected magnetic field; and calculate a relative angular displacement of the first target and the second target based on the fifth, sixth, seventh, and eighth signals, wherein the first signal is generated by a first receiving coil, the second signal is generated by a second receiving coil, the third signal is generated by a third receiving coil, the fourth signal is generated by a fourth receiving coil, the fifth signal is generated by a fifth receiving coil, the sixth signal is generated by a sixth receiving coil, the seventh signal is generated by a seventh receiving coil, and the eighth signal is generated by an eighth receiving coil.

18. The apparatus of claim 13, wherein the electronic circuitry includes a first sensor, the apparatus further comprising a second sensor, wherein:

the second sensor is configured to receive fifth, sixth, seventh, and eighth signals and calculate the relative displacement of the first target and the second target based on the fifth, sixth, seventh, and eighth signals;

the fifth and sixth signals that are generated in response to the first reflected magnetic field;

seventh and eighth signals that are generated in response to the second reflected magnetic field;

the first sensor is configured to drive the first transmitting coil; and the second sensor is configured to drive the second transmitting coil, and the first signal is generated by a first receiving coil, the second signal is generated by a second receiving coil, the third signal is generated by a third receiving coil, the fourth signal is generated by a fourth receiving coil, the fifth signal is generated by a fifth receiving coil, the sixth signal is generated by a sixth receiving coil, the seventh signal is generated by a seventh receiving coil, and the eighth signal is generated by an eighth receiving coil.

19. An apparatus, comprising:

a first transmitting coil including at least one first portion and at least one second portion, the first and second portions having different polarities; and a first receiving coil that is disposed above or below the first transmitting coil, the first receiving coil including at least one of a type-1 narrowed portion that is configured to change a polarity of the first receiving coil, the type-1 narrowed portion being disposed directly above or below a boundary between the first portion and the second portion, and a second receiving coil including at least one first type-2 narrowed portion that is configured to maintain a polarity of the receiving coil, the first type-2 narrowed portion being disposed directly above or below a boundary between the first portion and the second portion.

20. The apparatus of claim 19, wherein:

the second transmitting coil that is disposed above or below the first transmitting coil, the second transmitting coil includes at least one third portion and at least one fourth portion, the third and fourth portions having different polarities, wherein the first receiving coil includes at least one second type-2 narrowed portion, the second type-2 narrowed portion being disposed directly above or below a boundary between one of the third portions and one of the fourth portions, the second type-2 narrowed portion being configured to maintain a polarity of the first receiving coil.

21. The apparatus of claim 19, wherein:

the second transmitting coil is disposed inside the first transmitting coil, and the second transmitting coil includes at least one third portion and at least one fourth portion, the third and fourth portions having different polarities, wherein the first and second transmitting coils are configured so that, when the first transmitting coil is not driven and the second transmitting coil is driven, a net magnetic flux through the first portion is approximately zero, the net magnetic flux being a magnetic flux that is entirely attributable to the second transmitting coil.

22. The apparatus of claim 19, wherein the first receiving coil includes at least a first lobe and a second lobe that are coupled to the type-1 narrowed portion, and the type-1 narrowed portion has a smaller width than the first lobe and the second lobe.

23. The apparatus of claim 22, wherein the first lobe is a half-lobe, and the second lobe is a half-lobe.

24. The apparatus of claim 19, wherein the first receiving coil includes at least a first lobe and a second lobe that are coupled to the type-1 narrowed portion, and the type-1 narrowed portion has a smaller surface area than the first lobe and the second lobe.

25. The apparatus of claim 24, wherein the first lobe is a half-lobe, and the second lobe is a half-lobe.

26. The apparatus of claim 19, wherein the second receiving coil includes at least a first lobe and a second lobe that are coupled to the first type-2 narrowed portion, and the first type-2 narrowed portion has a smaller width than the first lobe and the second lobe.

27. The apparatus of claim 26, wherein the first lobe is a half-lobe, and the second lobe is a half-lobe.

28. The apparatus of claim 19, wherein the second receiving coil includes at least a first lobe and a second lobe that are coupled to the first type-2 narrowed portion, and the first type-2 narrowed portion has a smaller surface area than the first lobe and the second lobe.

29. The apparatus of claim 28, wherein the first lobe is a half-lobe, and the second lobe is a half-lobe.

* * * * *